US006993120B2

(12) United States Patent
Brown et al.

(10) Patent No.: US 6,993,120 B2
(45) Date of Patent: Jan. 31, 2006

(54) SYSTEM AND METHOD FOR COPYING AND TRANSMITTING TELEPHONY CONVERSATIONS

(75) Inventors: Michael Wayne Brown, Georgetown, TX (US); Joseph Herbert McIntyre, Austin, TX (US); Victor S. Moore, Boynton Beach, FL (US); Michael A. Paolini, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 10/279,690

(22) Filed: Oct. 23, 2002

(65) Prior Publication Data

US 2004/0081295 A1 Apr. 29, 2004

(51) Int. Cl.
*H04M 1/64* (2006.01)
*H04M 3/42* (2006.01)

(52) U.S. Cl. ............... 379/88.13; 379/67.1; 379/88.12; 379/88.14; 379/88.17; 379/88.18; 379/201.01; 379/202.01; 379/221.08

(58) Field of Classification Search ................ 379/52, 379/67.1, 88.11, 88.12, 88.13, 88.14, 88.17, 379/88.18, 201.01, 202.01, 221.08
See application file for complete search history.

(56) References Cited

U.S. PATENT DOCUMENTS

| 5,353,351 A | 10/1994 | Bartoli et al. ................. 380/33 |
| 5,440,624 A | 8/1995 | Schoof, II .............. 379/202.01 |
| 5,548,335 A | 8/1996 | Mitsuhashi et al. ......... 348/373 |
| 5,627,936 A | 5/1997 | Prasad et al. .................. 386/96 |
| 5,668,863 A | 9/1997 | Bieselin et al. ......... 379/202.01 |
| 5,692,213 A | 11/1997 | Goldberg et al. ......... 715/500.1 |
| 5,778,053 A * | 7/1998 | Skarbo et al. ............ 379/93.21 |
| 5,799,063 A | 8/1998 | Krane ........................ 379/67 |
| 6,035,352 A | 3/2000 | Alonso et al. .............. 710/100 |
| 6,067,516 A | 5/2000 | Levay et al. ................. 704/244 |
| 6,125,177 A | 9/2000 | Whittaker .................... 379/243 |
| 6,163,692 A | 12/2000 | Chakrabarti et al. ......... 455/416 |
| 6,212,522 B1 | 4/2001 | Himmel et al. ................ 707/10 |
| 6,222,909 B1 * | 4/2001 | Qua et al. ................. 379/88.22 |
| 6,246,983 B1 | 6/2001 | Zou et al. .................... 704/260 |
| 6,343,313 B1 * | 1/2002 | Salesky et al. ............. 709/204 |
| 6,363,145 B1 | 3/2002 | Shaffer et al. ......... 379/265.02 |

(Continued)

OTHER PUBLICATIONS

U.S. Appl. No. 09/240,962, filed Jan. 29, 1999, Rodriguez et al.

*Primary Examiner*—Allan Hoosain
(74) *Attorney, Agent, or Firm*—VanLeeuwen & VanLeeuwen; Mark S. Walker

(57) ABSTRACT

A system and method for copying and transmitting telephony recordings during a conference call. A user can forward a portion of the recording to a third party during the conference call. A user issues a command using a telephony device and optionally indicates the beginning and end of the portion to be sent. The user provides recipient information, such as an email address. A user can issue these commands by voice or by sending data (for example, text) through the user's device. The commands may also be issued by software running on the user's device. The user can choose to send the selected portion in audio format, textual format, or both. The selected portion can be sent through the internet using email, instant messaging, or FTP, for example. The marked portion can also be sent over a telephone, a computer network, or the like.

21 Claims, 50 Drawing Sheets

U.S. PATENT DOCUMENTS

| | | |
|---|---|---|
| 6,389,114 B1 * | 5/2002 | Dowens et al. ............... 379/52 |
| 6,407,988 B1 | 6/2002 | Agraharam et al. ........ 370/328 |
| 6,477,366 B1 | 11/2002 | Valentine et al. ........... 455/416 |
| 6,529,875 B1 | 3/2003 | Nakajima et al. ........... 704/275 |
| 6,563,914 B2 | 5/2003 | Sammon et al. ....... 379/202.01 |
| 6,661,879 B1 | 12/2003 | Schwartz et al. ........ 379/88.25 |
| 6,674,842 B2 * | 1/2004 | Weinman, Jr. ........... 379/88.13 |
| 6,823,350 B1 | 11/2004 | Mansour et al. ......... 715/501.1 |
| 6,859,448 B1 | 2/2005 | Roy ........................... 370/338 |
| 2001/0033644 A1 * | 10/2001 | Offer |
| 2002/0089901 A1 | 7/2002 | Morohoshi et al. ...... 369/30.11 |
| 2003/0227540 A1 | 12/2003 | Monroe .................. 348/14.02 |

* cited by examiner

SYSTEM AND METHOD FOR COPYING AND TRANSMITTING TELEPHONY CONVERSATIONS

BACKGROUND OF THE INVENTION

1. Technical Field

The present invention relates in general to a system and method for providing personal telephony recorder services. More particularly, the present invention relates to a system and method for copying and transmitting telephony recordings during a conference call.

2. Description of the Related Art

Voice communication is the most common and one of the oldest forms of real-time remote communications. Real-time remote forms of communications are very good alternatives to face-to-face meetings, in which real-time communication is an important aspect. Voice communications are used for casual conversations, to conduct business, to summon for help in an emergency, to access special services (such as banking, retrieving messages), etc.

There are numerous types of devices operating over numerous types of networks to facilitate voice communications. Most of the voice-capable networks are also capable of transmitting data. The most common voice communication device is the traditional telephone operating over the Public Switched Telephone System (PSTN), also known as the Plain Old Telephone System (POTS). Through the PSTN, telephones are linked using complex switching systems at central offices or exchanges that establish a pathway for voice to be transmitted and received between one or more of the telephones. With appropriate devices, such as modems, for examples, the PSTN can be used for the transmission of data. The PSTN is still one of the most reliable networks for voice communication.

Voice communication can also be facilitated over the Internet or other such networks. Computers connected to the Internet first convert the voice into digital information and then convert the information into data packets. The packets are created according to the Transmission Control Protocol (TCP), a set of rules used with the Internet Protocol (IP) to send data in the form of packets between computers over the Internet. IP handles the actual delivery of the data while TCP keeps track of the individual data packets, into which the voice or other data is divided, for efficient routing through the Internet. The process of transmitting voice over the Internet or other such networks is called voice-over-IP. Voice communication through the Internet is not as reliable as it is through the PSTN. Internet-type networks were designed for data transmission where "real-time" transmissions are not necessary. The speed with which the packets move from one user to the other is very dependent on the type of connection each user establishes to the Internet, the type of computers/communication lines that exist between the two users, the amount of traffic through the internet, etc.

Mobile phones and the wireless mobile network provide yet another method for voice communication. Through shortwave analog or digital transmissions, a user establishes a wireless connection from a mobile telephone to a nearby transmitter. Generally, mobile telephone service is available in urban areas and along major highways. As the mobile telephone user moves from one cell or area of coverage to another, the mobile telephone is transferred from one transmitter to the next. Today, the mobile network may be accessed not only by traditional personal mobile phones but also by Personal Data Assistants (PDAs), notebook computers with special communications cards, combination devices, etc. Many of these networks are capable of also transmitting through a number of existing protocols. Voice communication through the mobile network is also not as reliable as voice communication through the PSTN. Depending on the geography, certain areas may have better receptions than others. In large cities, for example, reception may be affected, for example, by big buildings, etc. A user who moves into a no-reception "pocket" can be "dropped" from the call. A user may also be dropped while being transferred from one transmitter to the next. For example, a transmitter may be at full capacity and thus not be able to handle additional users.

Satellites provide another medium through which voice can be transmitted. A satellite is a specialized wireless receiver/transmitter launched by a rocket and placed in orbit around the earth. There are hundreds of satellites currently in operation. Geostationary satellites, the most common type of satellite, orbit the earth directly over the equator remaining over the same spot at all times. A geostationary satellite can be accessed using an antenna aimed at the spot in the sky where the satellite hovers. A low-earth-orbit (LEO) system employs a large fleet of satellites in a circular orbit at a constant altitude of a few hundred miles over the geographic poles. An LEO satellite system operates similarly to a mobile phone network where users are transferred from satellite to satellite. As with any other wireless system of communication, reliability is a concern. The connection to the satellite may be affected by such things as weather, obstacles between the user and the satellite (such as being inside a building).

These and other types of networks through which voice may be transmitted are linked with one another to facilitate voice communication across all of the networks. For example, a mobile phone user may establish a telephone call with a user connected through the PSTN, a user having a satellite phone, a user connected through the Internet, etc. In addition, communication may be established between more than two users. Some telephone devices and services are "three-way" capable and establish communication between three users. Certain devices and services have the capability to conference three or more users. A telephone conference allows multiple parties to talk to each other in real time.

Typically, a conference leader contacts a telecommunications service provider and reserves a conference bridge, a computer-controlled device for interconnecting callers. The user may reserve a certain number of telephone lines at a specific date and time. The conference leader may provide each user with an access number and/or password/access code. The users may dial in from any type of voice-capable communications device that can access the bridge. The leader may also select dial-out service for some or all of the other users, where the leader provides bridge with the users' phone numbers, and the bridge either automatically or through an operator dials each user's telephone number at the scheduled time of the conference to connect the user to the conference bridge.

As the number of users increases, it becomes increasingly difficult to carry out the conference efficiently. At times, certain users may not be able to initially join the conference or a user may be dropped from a conference. The user, for example, may not be able to connect to (or may lose connection to) the conference due to problems with the user's handset or device, due to problems with one or more of the networks or due to too high network traffic, etc. In addition, the user may not be able to connect because of unexpected circumstances or because the user's handset is not functioning. When a user joins late or after having been dropped, the other users must interrupt the conference to "brief" the user or the user must join the conference without the benefit of the missed information. A user may also require briefing simply because the user did not clearly hear some of the information (for example, due to a bad connection), or because the user was absentminded, or because the user heard the conversation but simply did not understand it.

What is desired, therefore, is a method and system that can provide individual telephone users with one or more ways to review information relating to the conversation. Further, a method and system are desired that can perform the review of the information in real time subsequently allowing the user to return back to the live conference. The users should also be able to control the review process through voice commands over regular telephones and through specialized devices. Finally, it would be desirable for a user to be able to forward a portion or all of the recorded data to a third party, in either a voice or textual format.

SUMMARY

It has been discovered that a personal telephony recording (PTR) system can record a telephone conference and can replay the recording after the end of the conference or while the telephone conference is still taking place. The PTR is capable of establishing a telephone conference between two or more users that connect to the PTR from a variety of networks. One user may, for example, be connected through the mobile network, another may connect via satellite, and another may connect through the internet. Each of the user devices may have one or more lines of communication with the PTR of one or more type. For example, a PDA may have a voice line and a data line connecting the PDA to the PTR.

The PTR is also capable of recording the conference in audio format, text format (obtained by converting the audio format to text), or both. If text is recorded in real time, the users will have the option of recalling the textual information in addition to recalling recorded audio. Other information-such as time and other user information-may also be recorded in addition to audio and text. In addition, both text and audio may be compressed in real time to save storage space.

The PTR is further capable of marking and sending a portion of the recorded conversation to a third party. A user first issues a command indicating the beginning of the portion to be sent and another indicating the end. A third command is then issued providing recipient information. A user may issue these commands by voice or by sending data (for example, text) through the user's device. The commands may also be issued by software running on the user's device. The commands are only received by the PTR and are not transmitted to the other users in the conference.

The user may choose to send the marked portion in audio format, textual format, or both. The marked portion may be sent through the internet using email, instant messaging, or FTP, for example. The marked portion may also be sent over a telephone, printed and sent trough regular mail, etc. The user may provide the recipient's address or the PTR may provide the user with a list of recipients from which the user can choose. The user may also setup "shortcuts" that are associated with a particular user, method of transmission, etc. A nickname just indicating the recipient may also be set up. A special command may also be reserved with which the user can indicate the whole recording as the portion to send.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
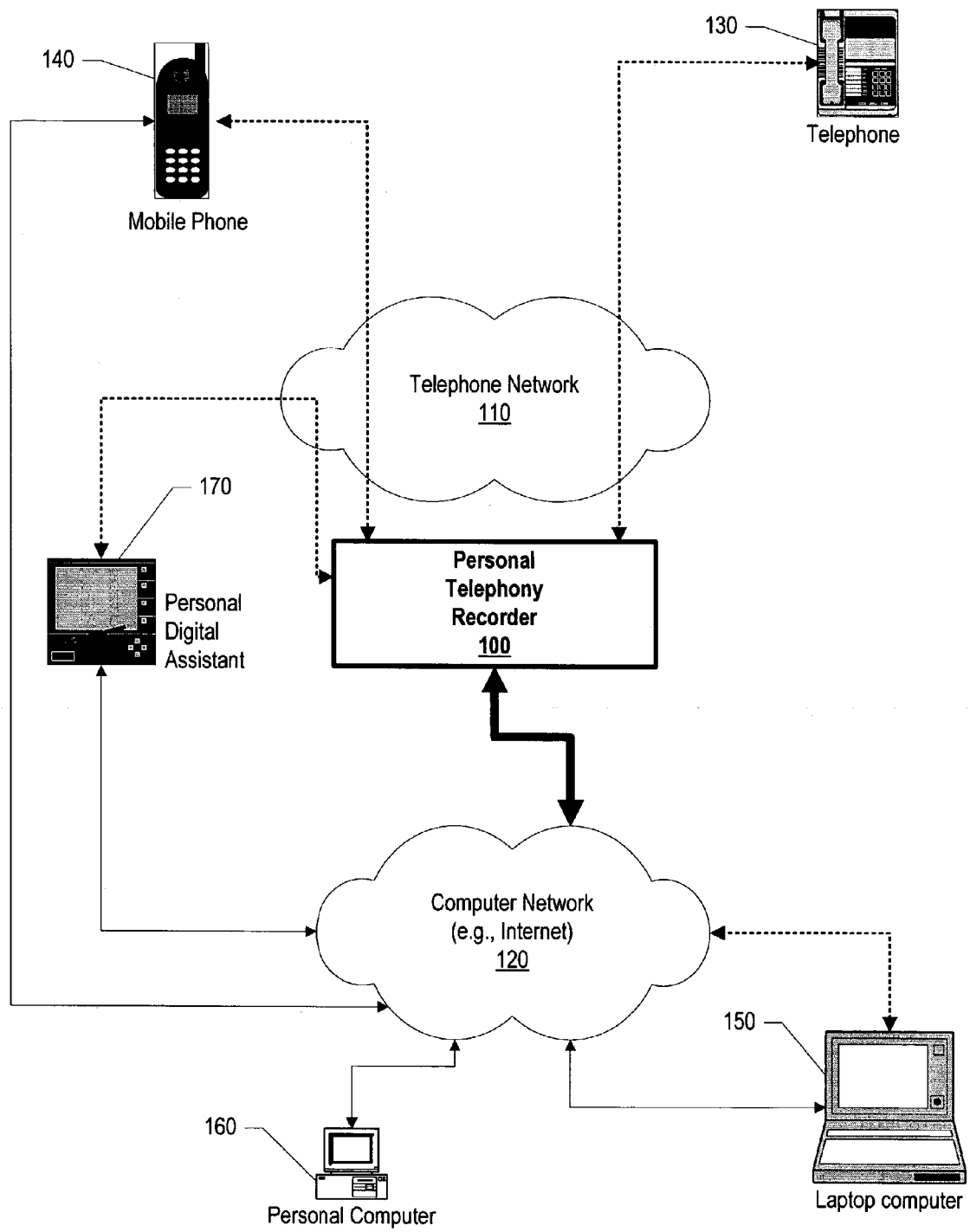
FIG. 1 is a high level network diagram of a personal telephony recorder system.

FIG. 1 is a high level network diagram of a personal telephony recorder system. Personal telephony recorder 100 is used to record telephone data to various users and to provide the users with information. This information can include previously recorded call data which can be retrieved either during a telephone call or after a telephone call. In addition, personal telephony recorder 100 can receive information from computer network 115. One example of such a computer network is the Internet. Data received from the computer network can include voice data received from network connected telephony devices as well as non-voice information, such as the results of a search that the user requested. Personal telephony recorder 100 also provides services to participants engaged in a teleconference. For example, if one of the participants is dropped from the conference call, the personal telephony recorder informs the other participants of the drop. When the user reconnects to the personal telephony recorder, the device provides the reconnected participant with the ability to listen to the portion of the call that was missed.

Personal telephony recorder 100 can be a client-centric or network-centric device. In a client-centric application, the personal telephony recorder is connected to the user's computer or telephone system. Conversely, in a network-centric application, the personal telephony recorder is connected to a network, such as telephone network 110 or computer network 120, and clients access the personal telephony recorder by logging into the personal telephony recorder or by being connected to the personal telephony recorder through a telephone call. In a network-centric application, therefore, the personal telephony recorder is available to the user regardless of the telephone currently being used.

Different devices connect to personal telephony recorder 100 in a variety of ways. Traditional telephone connects to a call being managed by a personal telephony recorder through telephone network 100, such as a public switched telephone network (PSTN).

Mobile telephone 140 and personal digital assistant (PDA) 170 can connect to either telephone network 110 or computer network 120. A gateway can be used to connect these devices from a wireless network to either the telephone network or the computer network.

Computer systems, such as personal computer 160 and laptop computer 150 typically connect to computer network 120. However, these devices are also capable of utilizing telephone network 110 using peripherals such as a modem.

Figure 2:
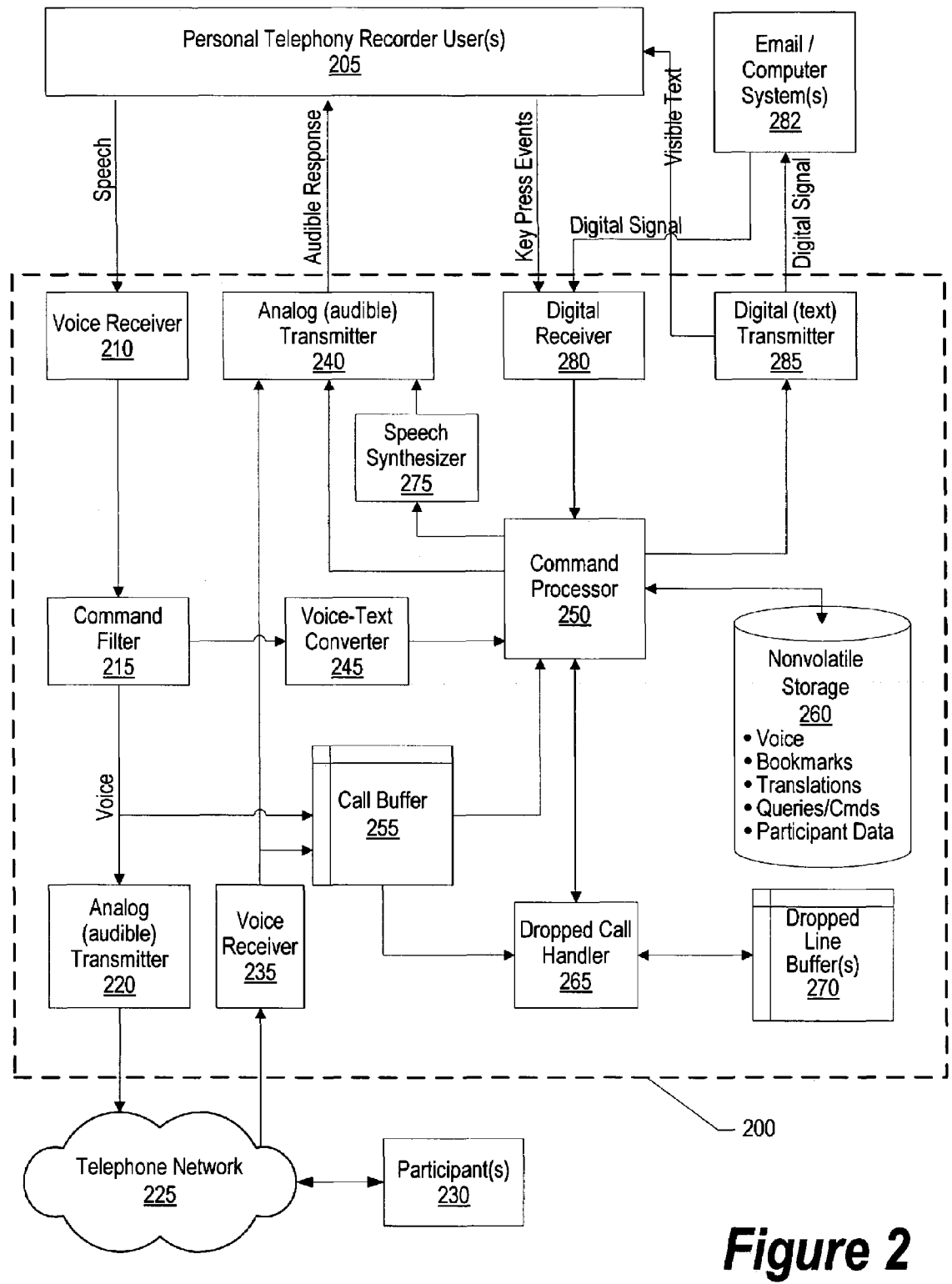
FIG. 2 is a is a block diagram of a personal telephony recorder system.

FIG. 2 is a is a block diagram of a personal telephony recorder system. Personal telephony recorder 200 includes a number of components used to record call data and to provide services to users both during and after a telephone call. Personal telephony recorder users 205 speak into a microphone, such as the microphone provided on a telephone or a microphone connected to a computer system. Voice receiver component 210 receives analog speech from the user and sends the analog speech signal to command filter 215. Command filter 215 uses voice recognition software to recognize voice commands that might be included in the analog speech. When a command is identified, command filter 215 sends the analog speech to voice to text converter 245 which converts the command and words surrounding the command into a textual form. Voice to text converter 245, in turn, sends the textual form of the command and words surrounding the command (parameters) to command processor 250 for processing. In addition, a copy of the voice signal is stored in call buffer 255 so that the voice signal is able to be retrieved and processed at a later time (e.g., in response to a query request).

Returning to command filter 215, if the speech received from the user is not a command, command filter 215 passes the analog voice signal to analog transmitter 220. Analog transmitter 220 transmits the user's analog voice signal through network 225 to one or more participants 230. Network 225 may include a telephone network, such as a public switched telephone network (PSTN), and may include a computer network, such as the Internet.

Voice receiver 235 receives analog voice data from participants 230 through network 225. A copy of the received voice data is stored in call buffer 255. In one embodiment, participants other than the personal telephony recorder users are permitted to issue voice commands. In this embodiment, the voice signal received from the participants also passes through command filter 215 so that commands received from the participants can be identified and processed. Voice data is sent from voice receiver 235 to analog transmitter 240 which, in turn, transmits the analog voice data to personal telephony recorder users 205.

Returning to command processor 250, the command processor receives voice commands from voice to text converter 245. In addition, command processor 250 receives digital command signals from digital receiver 280. Digital commands can be received from a personal telephony recorder user using traditional telephone equipment (e.g., pressing various keys on the keypad, etc.). Digital commands can also be received from a computer system, or computer network, connected to the personal telephony recorder, such as computer system 282.

Command processor 250 retrieves call data from call buffer 255 in order to process some commands. The command processor may also use voice to text converter 245 and speech synthesizer 275. Voice to text converter 245 is used to convert analog call data to textual data which can then be processed or sent to computer systems using digital transmitter 285. In addition, the command processor can be programmed to receive all voice, including both voice data and voice commands, and convert the voice data to text using voice to text converter 245. Voice data that is not a command can be displayed, in a near real-time fashion, using digital transmitter 285 and either email/computer system 282 or a personal telephony recorder system that has a display device. In this manner, the personal telephony recorder user can follow the conference call by reading the data displayed on the display device. Command processor also stores additional data in nonvolatile storage area 260. Nonvolatile storage area can be nonvolatile memory, optical, magnetic storage, or any memory able to retain data value in a non-powered state. In addition, memory can be used in place of the nonvolatile storage, typically offering faster access and retrieval, but lacking the ability to retain values when power is interrupted.

Nonvolatile storage 260 is used to store voice data, bookmark data (marking places within the voice data), translation data (digital forms of the analog voice data), queries and command that have been requested, and data regarding participants of the calls, such as the participants' names, companies, telephone numbers, and the like.

Command processor 250 also interfaces with dropped line handler 265 to notify call participants when a participant gets dropped from a teleconference. Dropped line handler 265 also uses dropped line buffer 270 to set bookmarks corresponding to when a participant is dropped and rejoins a teleconference as well as data regarding the playback of voice data that was missed by the caller before he or she rejoined the call. For example, when a dropped participant rejoins a teleconference, dropped call handler will retrieve the voice data that transpired while the participant was not connected and allow the participant to listen to the missed voice data.

Figure 3:
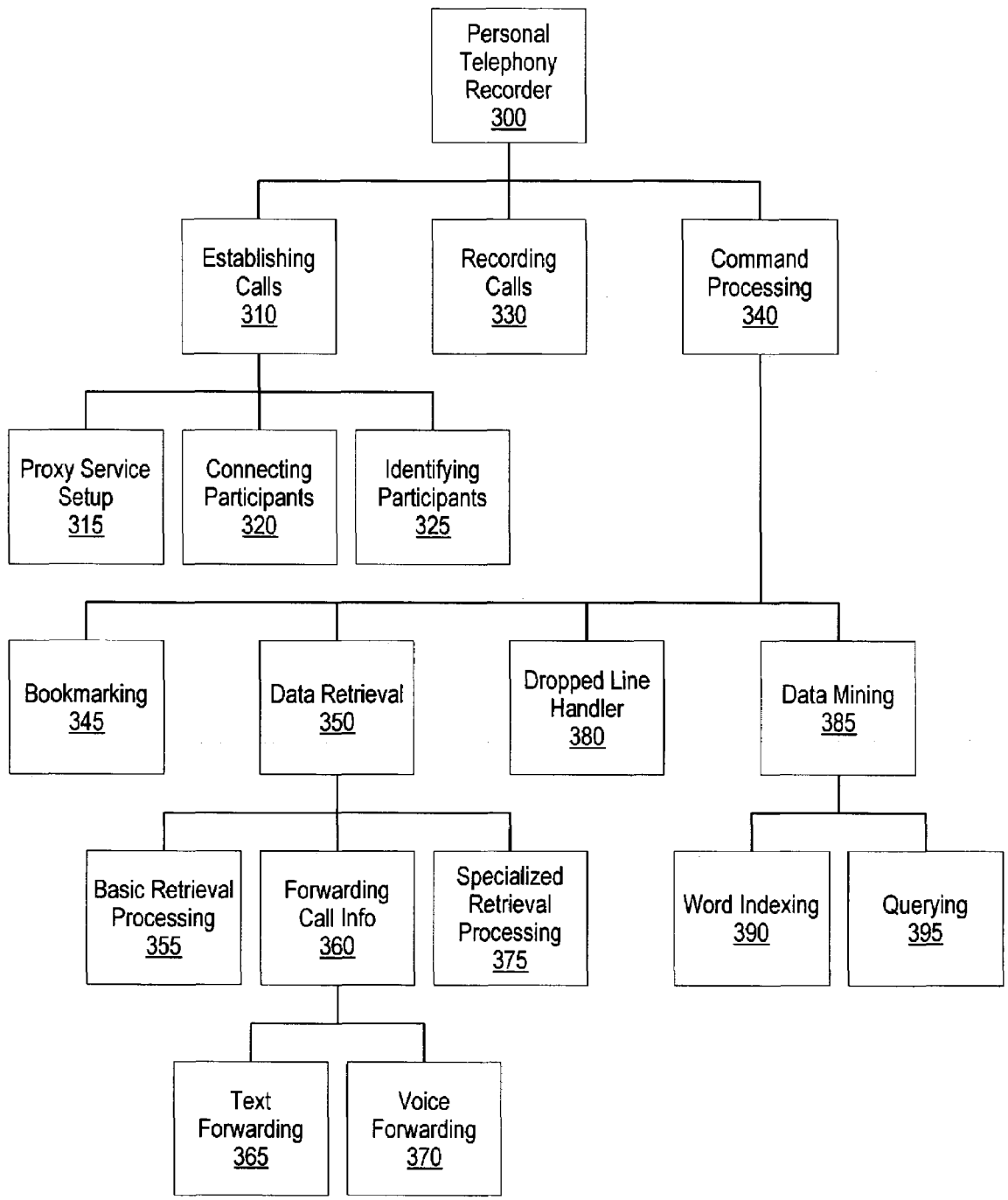
FIG. 3 is a is a hierarchy diagram of components used in a personal telephony recorder system.

FIG. 3 is a is a hierarchy diagram of components used in a personal telephony recorder system. Personal telephony recorder 300 includes establish calls component 310 for establishing a telephone call or teleconference. This is performed somewhat differently depending on whether the personal telephony recorder is acting in a proxy role (connected to a network rather than any one specific participant) or is connected to a particular participant. Establish calls component 310 includes subcomponents to setup service in a proxy environment 315, components to connect participants to one another 320, and components to identify individual participants 325.

Another personal telephony recorder component is record calls component 330 for recording voice data transmitted during a telephone or conference call. Command processing component 340 includes a number of subcomponents for responding to requests and commands received by the personal telephony recorder from participants and users. These subcomponents include bookmarking, data retrieval, dropped line handling, and data mining.

Bookmarking component 345 is used to allow the personal telephony recorder user the ability to set bookmarks identifying where in a telephone call a certain topic was discussed. In addition, bookmarks are used to retrieve a portion of a recorded telephone call for forwarding the portion. Bookmarks are also automatically generated when a participant is dropped from a conference call (marking the point at which the participant was dropped) as well as used for marking the point at which the user rejoined a conference call.

Data retrieval component 350 is used to retrieve various types of call data and perform various functions with the retrieved data. Further subcomponents provide this functionality. These subcomponents include basic retrieval component 355, call forwarding component 360, and specialized retrieval component 375. Of these subcomponents, the forwarding component includes two subcomponents—text forwarding subcomponent 365 and voice forwarding component 370.

Another command processing component is dropped line handling component 380. The dropped line handling component detects when a teleconference participant is dropped from a telephone call and, upon the dropped participant rejoining the call, allows the participant the ability to listen to the portion of the call that the participant missed.

Data mining component 385 is used to cull information from the call data. The call data information is used by data mining subcomponents for creating reports (subcomponent 390) and processing ad hoc queries (subcomponent 395).

Figure 4:
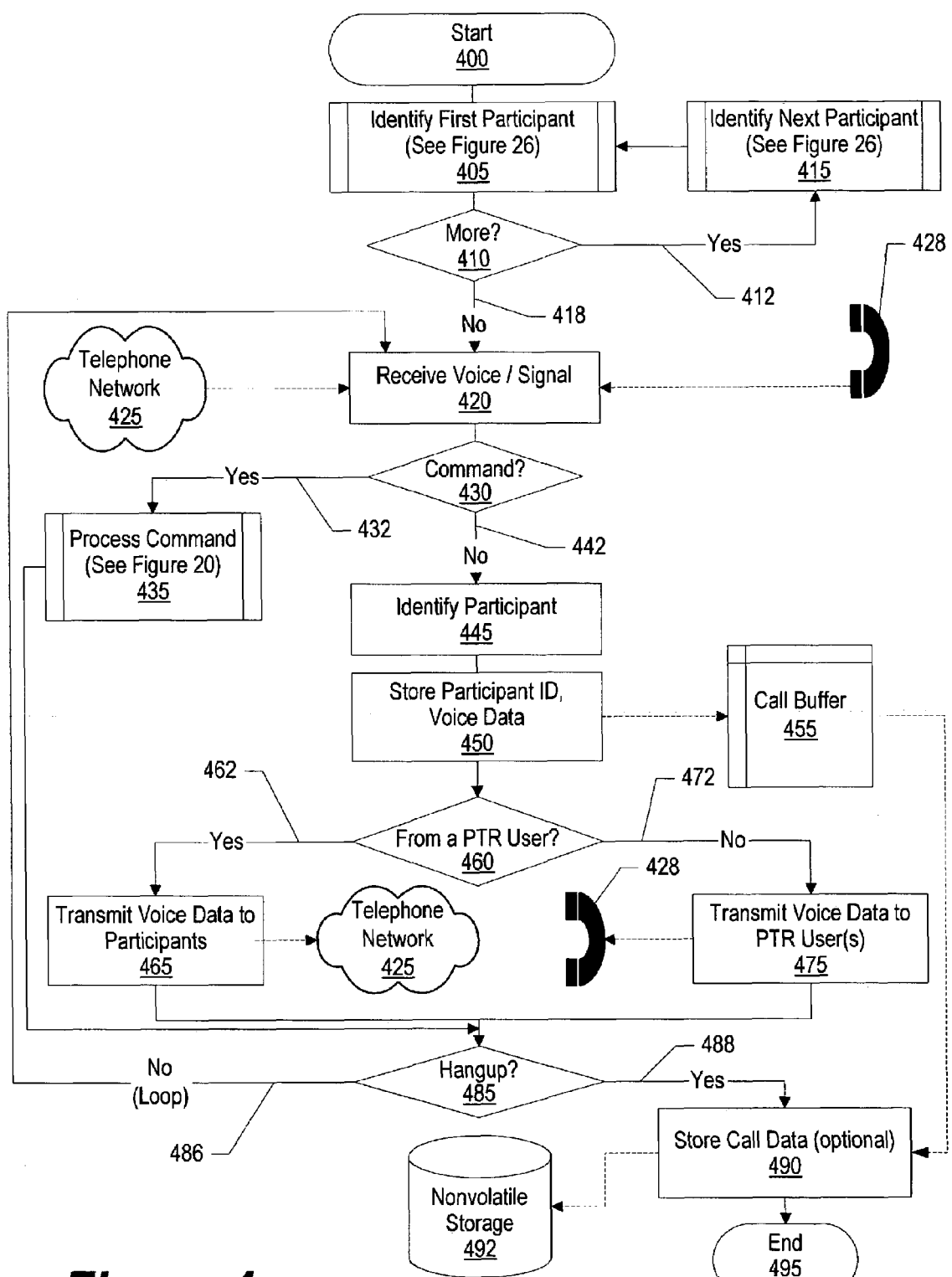
FIG. 4 is a high level flowchart of adding participants to a telephone conference utilizing a personal telephony recorder system.

FIG. 4 is a high level flowchart of adding participants to a telephone conference utilizing a personal telephony recorder system. Processing commences at 400 whereupon the first participant in the telephone call is identified (predefined process 405, see FIG. 26 for processing details). A determination is made as to whether there are more participants to identify (decision 410). If there are more participants, decision 410 branches to "yes" branch 412 which loops back to identify the next participant (predefined process 415, see FIG. 26 for processing details). This looping continues until there are no more participants to identify, at which point decision 410 branches to "no" branch 418.

Voice data and signals are received (step 420) from telephone network 425 (for those participants that are remote from the personal telephony recorder) and from telephone(s) 428 (for those participants that are directly connected to the personal telephony recorder). A determination is made as to whether the received voice and/or signal data includes a personal telephony recorder command (decision 430). If a command was received, decision 430 branches to "yes" branch 432 whereupon the personal telephony recorder processes the received command (predefined process 435, see FIG. 20 for processing details). On the other hand, if a command was not received (i.e., normal voice traffic was received), decision 430 branches to "no" branch 442 whereupon the participant from whom the voice data was received is identified (step 445). This identification can be based upon the line from which the data was received or may be made by analyzing the vocal characteristics of the participants voice. An identifier corresponding to the participant and the received voice data is stored (step 450) in call buffer memory area 455.

A determination is made as to whether the received voice data was from a locally connected personal telephony recorder user or from another participant connected to the personal telephony recorder through a telephone network (decision 460). If the voice data was received from a locally connected personal telephony recorder user, decision 460 branches to "yes" branch 462 whereupon the voice data is transmitted to the other participants (step 465) through telephone network 425. On the other hand, if the voice data was received from the telephone network, decision 460 branches to "no" branch 472 whereupon the voice data is transmitted to the locally connected personal telephony recorder user (step 475) through locally attached telephone speaker 428.

After receiving the last command or voice data, a determination is made as to whether the participants have ended the telephone call (decision 485). If the call has not ended, decision 485 branches to "no" branch 486 which loops back to process the next command or voice data. This looping continues until the call has ended, at which point decision 485 branches to "yes" branch 488 whereupon the call data stored in buffer 455 is stored (step 490) on nonvolatile storage device 492 in order to retain the call data indefinitely. Processing thereafter ends at 495.

Figure 5:
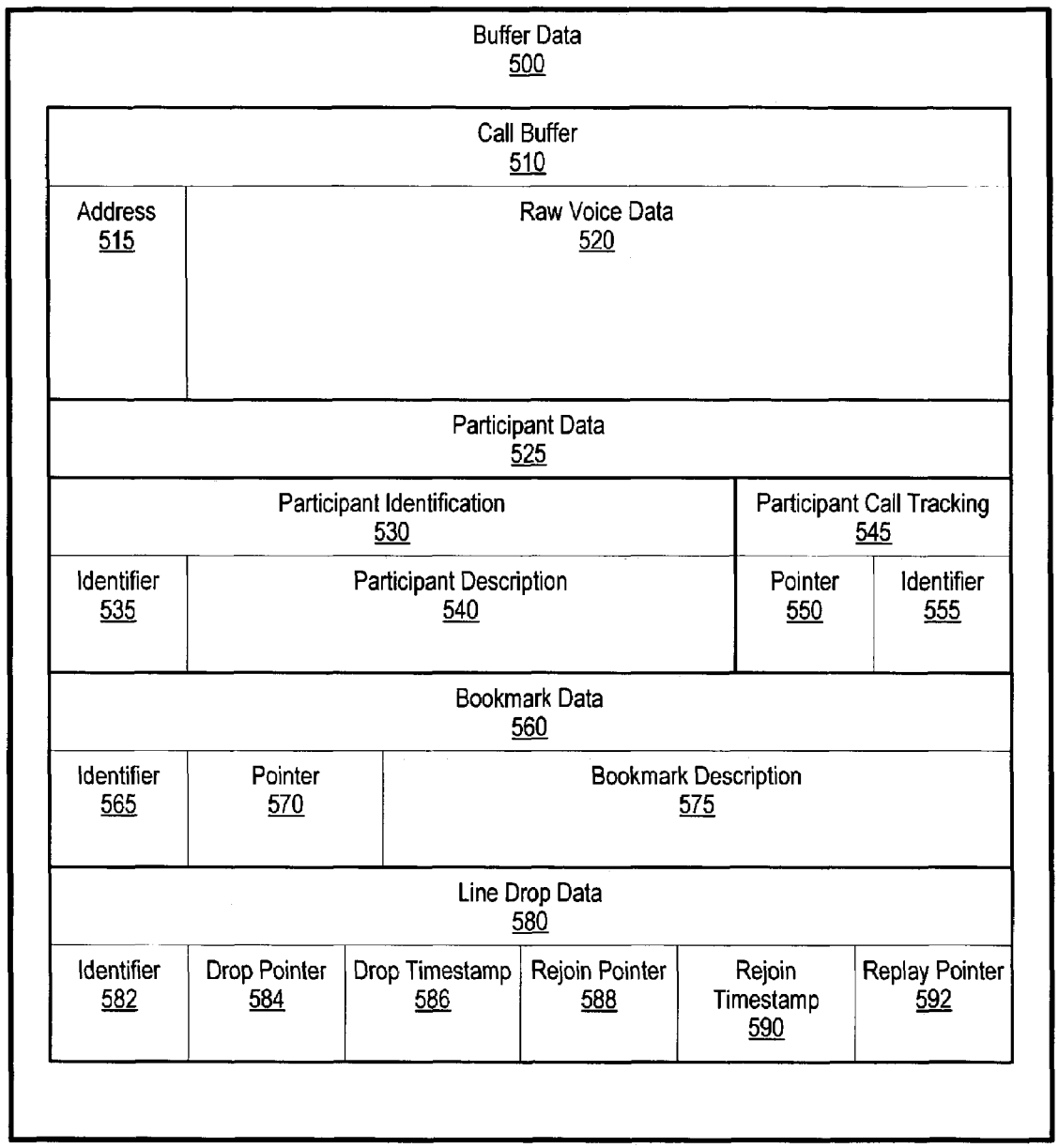
FIG. 5 is a data diagram of data maintained by a personal telephony recorder system.

FIG. 5 is a data diagram of data maintained by a personal telephony recorder system. Buffer data 500 includes a variety of information maintained by the personal telephony recorder. Call buffer 510 includes voice data received during the course of a telephone call. The call buffer includes addresses 515 and raw (analog) voice data 520 that was received. The analog voice data is stored sequentially so that the first voice data stored is stored towards the top of the call buffer while later retrieved voice data is stored towards the bottom of the buffer.

Participant data 525 includes information regarding the participants. Participants are assigned a unique identifier 535 so that the participant's identity can be tracked during the course of a telephone call. Participant data also includes descriptive information 540 regarding the participant. Descriptive information can include participants' names, telephone numbers, company names, addresses and the like. Descriptive information can also include voice signature data used to identify the participant using voice recognition software.

Participant data 525 also includes participant call tracking data 545 that tracks contributions made to a telephone call by the various participants. Tracking data 545 includes a pointer (550) to the address within the voice data where a contribution was made as well as the participant's unique identifier 555. In addition, a second pointer can be maintained tracking when the participant finished talking and another participant began talking.

Bookmark data 560 is used to mark places within the voice data. For example, during a lengthy conference call, a personal telephony recorder user may wish to bookmark where in the call specific terms were discussed. In this manner, the user can return to the portion of the call at a later time without having to scan through the other portions of the call and without having to take time consuming and lengthy notes during the call. Bookmark data 560 includes bookmark identifier 565 that is assigned to uniquely identify the bookmark, pointer 570 used to mark the location of the bookmark (i.e., the address) within call buffer 510. Bookmark data 560 also includes an optional bookmark description 575 which is used by the user to store a description of the bookmark. In the example above, a bookmark description may be "discussion of terms."

Line drop data 580 is used to store data regarding participants that are dropped from a conference call. Line drop data 580 includes a line drop identifier which uniquely identifies the line drop event. Drop pointer 584 which indicates the location, or address, within the call buffer when the participant was dropped. Drop timestamp 586 stores the time at which the participant was dropped. Rejoin pointer 588 indicates the position of the call buffer when the participant rejoined the conference call. Thus, playing the data that was stored in the call buffer between drop pointer 584 and rejoin pointer 588 would play the portion of the call that was missed by the participant from the time the participant was dropped to the time the participant rejoined the call. Rejoin timestamp 590 stores the time at which the participant rejoined the call. Replay pointer 592 is used to keep track of how much of the call buffer missed by the participant has been replayed to the participant.

Figure 6:
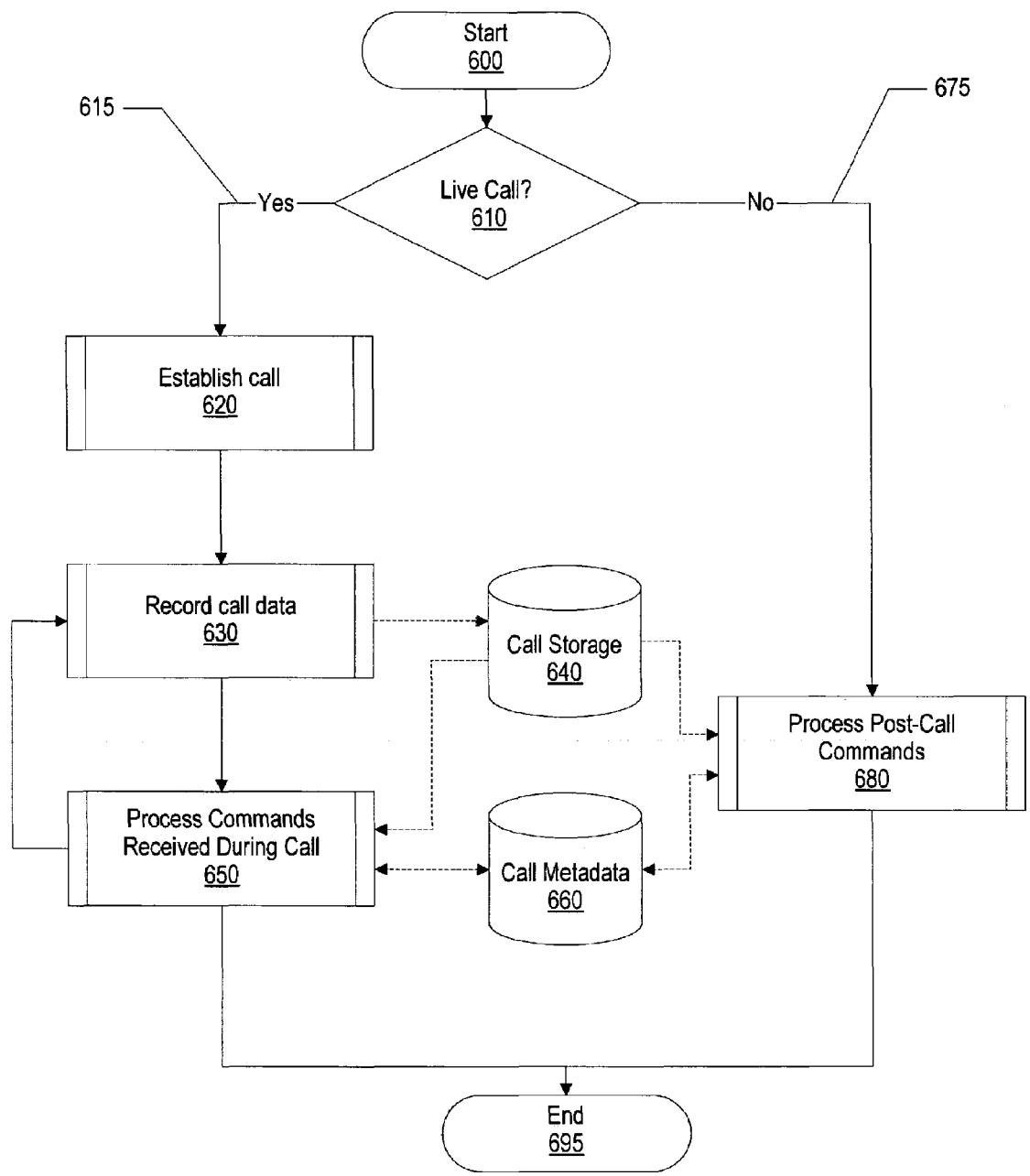
FIG. 6 is high level flowchart of a personal telephony recorder system.

FIG. 6 is high level flowchart of a personal telephony recorder system. Processing commences at 600 whereupon A determination is made as to whether the user is engaging in a new (live) telephone call or is requesting data regarding previously recorded telephone calls (decision 610). If the user is engaging in a new, or live, call, decision 610 branches to "yes" branch 615 whereupon a call is established either using a locally connected personal telephony recorder device or a network accessible (proxy) personal telephony recorder device (predefined process 620). During the telephone call, the call data is stored (predefined process 630) in call storage 640. Commands received by personal telephony recorder users during the call are processed (predefined process 650) using previously recorded call data 640 as well as call metadata 660 which includes data regarding the telephone call (e.g., the participants).

On the other hand, if the user is requesting data regarding previously recorded telephone calls, decision 610 branches to "no" branch 675 whereupon post-call commands and requests are received by the user and processed (predefined process 680) using previously recorded call data 640 as well as call metadata 660.

After processing the telephone call or the user's post-call commands, processing ends at 695.

Figure 7A:
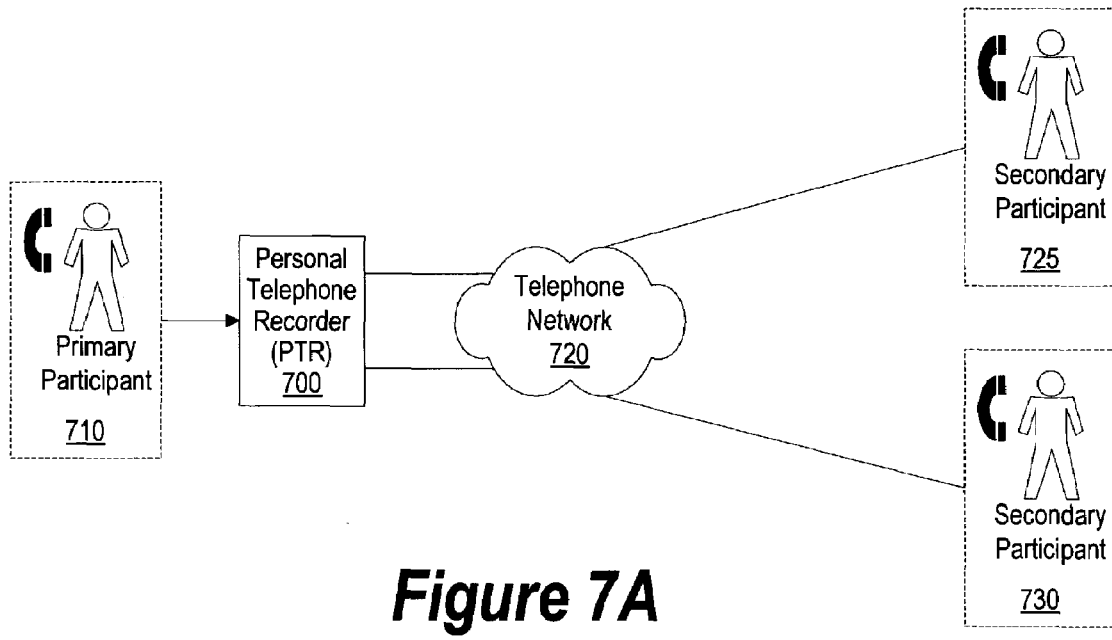
FIG. 7A is a system diagram of a client-based personal telephony recorder used by a primary user.

FIG. 7A is a system diagram of a client-based personal telephony recorder used by a primary user. In this environment, personal telephony recorder 700 is attached to telephony equipment controlled by primary participant 710. The personal telephony recorder records call data and manages calls between the primary user and secondary participants 725 and 730 connected to one another through telephone network 720.

Figure 7B:
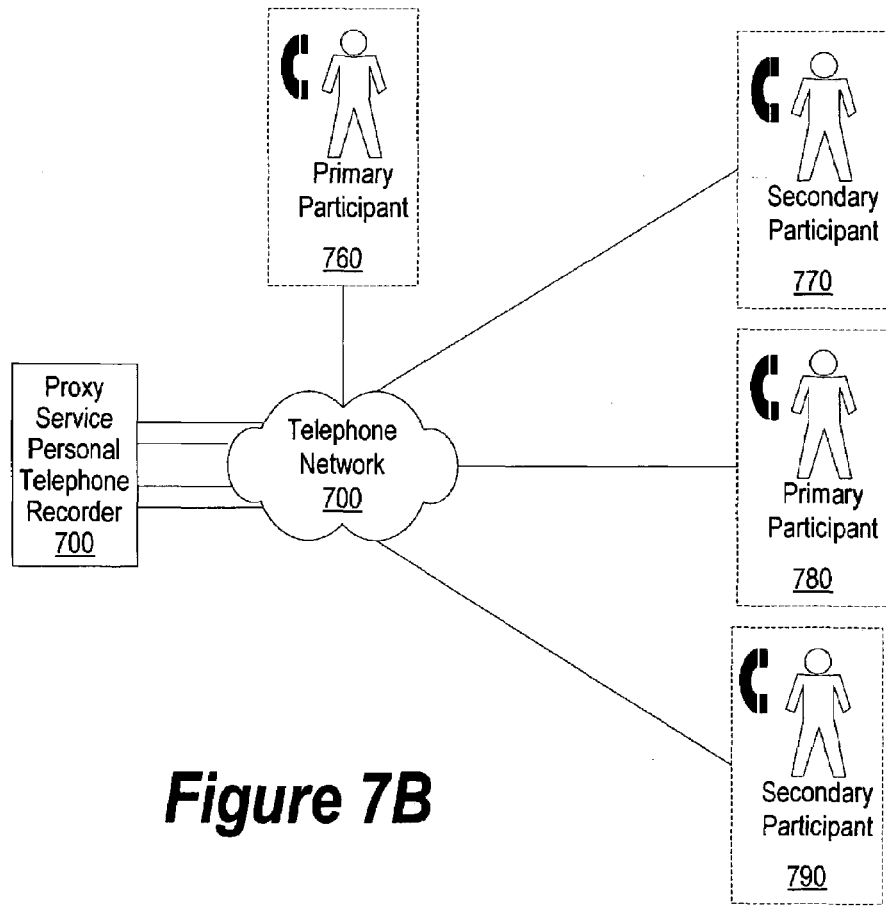
FIG. 7B is a system diagram of a network-based proxy used by primary and secondary users to provide personal telephony recorder services.

FIG. 7B is a system diagram of a network-based proxy used by primary and secondary users to provide personal telephony recorder services. In this environment, in contrast to the environment shown in FIG. 7A, personal telephony recorder 740 is network based being connected to telephone network 750. In this manner, the network based personal telephony recorder can provide proxy services to primary and secondary users connected to the personal telephony recorder through the telephone network. The network based personal telephony recorder can call participants to join a conference call. In addition, the participants can call into the personal telephony recorder to set up and join conference calls. The network based personal telephony recorder can bill participants based upon the services used by the users. Multiple primary participants can subscribe to the service, such as primary participants 760 and 780. Guests, or secondary participants (770 and 790) can also be included in conference calls. Guests can use those personal telephony recorder commands as designated by the primary participants that set up the conference call.

Figure 8:
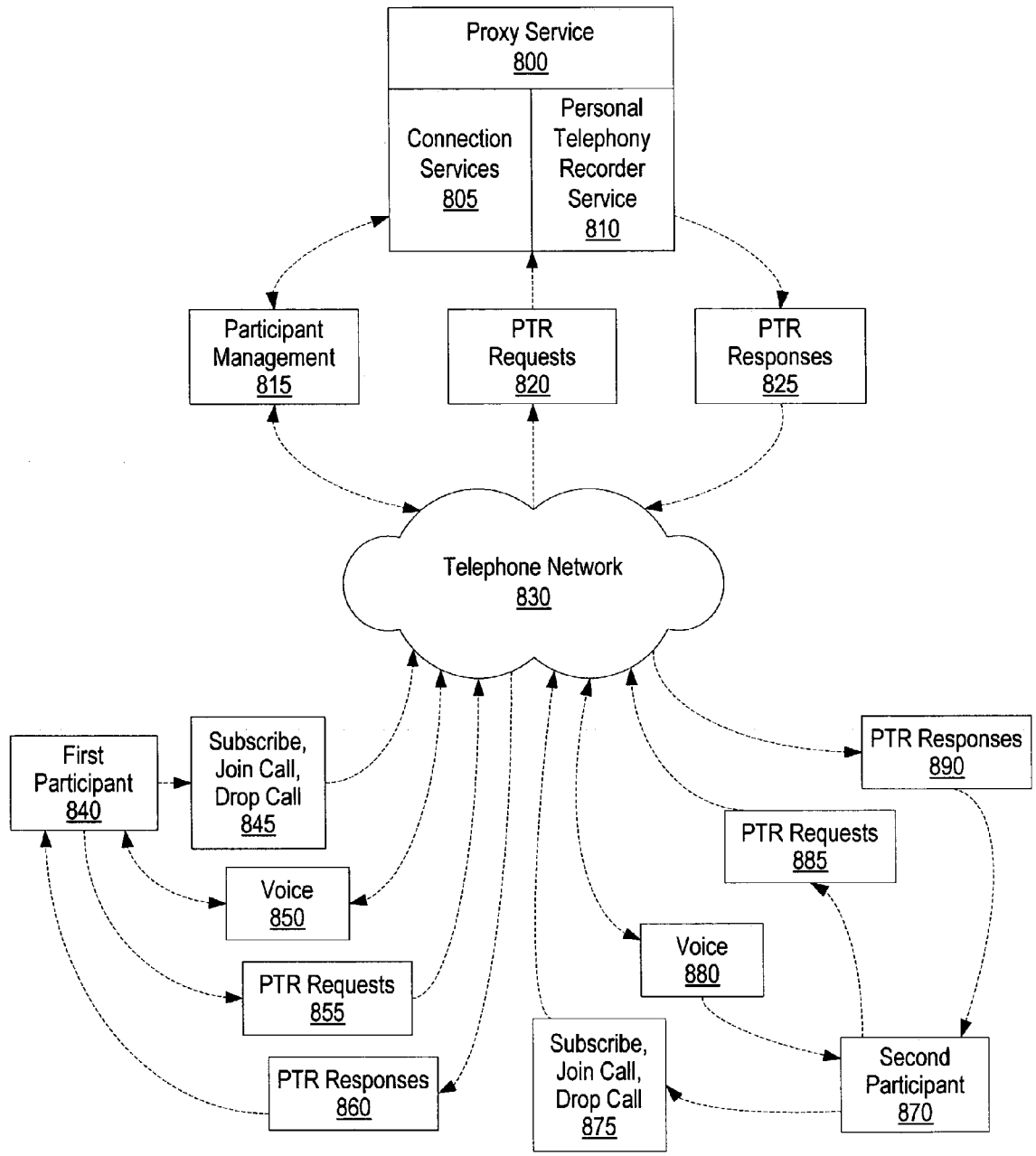
FIG. 8 is a high level system diagram of a personal telephony recorder proxy system.

FIG. 8 is a high level system diagram of a personal telephony recorder proxy system. Personal telephony recorder proxy service 800 is connected to telephone network 830 and available to participants through the network.

Personal telephony recorder proxy service 800 includes connection services 805 for managing conference calls between participants and managing subscribers' accounts. Subscribers of the proxy service can setup conference calls and have the proxy service call the participants. In addition, participants can call the proxy service and log in using a PIN code or password. First participant 840 and second participant 870 send management requests 845 and 875, respectively, to proxy service 800 through telephone network 830. These proxy requests are received by proxy service 800 as participant management requests 815.

In addition, the first and second participants send voice data, 850 and 880, respectively, to one another through proxy service 800. While the proxy service's connection services manages connecting the participants, the service's personal telephony recorder service 810 manages recording the call and responding to telephony requests received from the participants. Participants can be segmented so that certain participants can perform certain functions, for example searching through a call log for data, while another participant is not permitted to perform the function. For example, first participant may be a paid subscriber of proxy service 800 so he is able to perform a variety of personal telephony recorder functions, while second participant 870 may simply be a guest and, therefore, not allowed to use the personal telephony recorder functions unless granted additional privileges.

Personal telephony recorder requests are sent from participants (requests 855 with regard to the first participant and requests 886 with regard to the second participant). These requests are transmitted through telephone network 830 and are received at proxy service 800 as personal telephony recorder requests 820. The proxy's personal telephony recorder service 810 handles the requests and provides response data 825 back to the participant that made the request. The requests are transmitted back through telephone network 830 where they are received by the first and second participants as responses 860 and 890, respectively.

Figure 9:
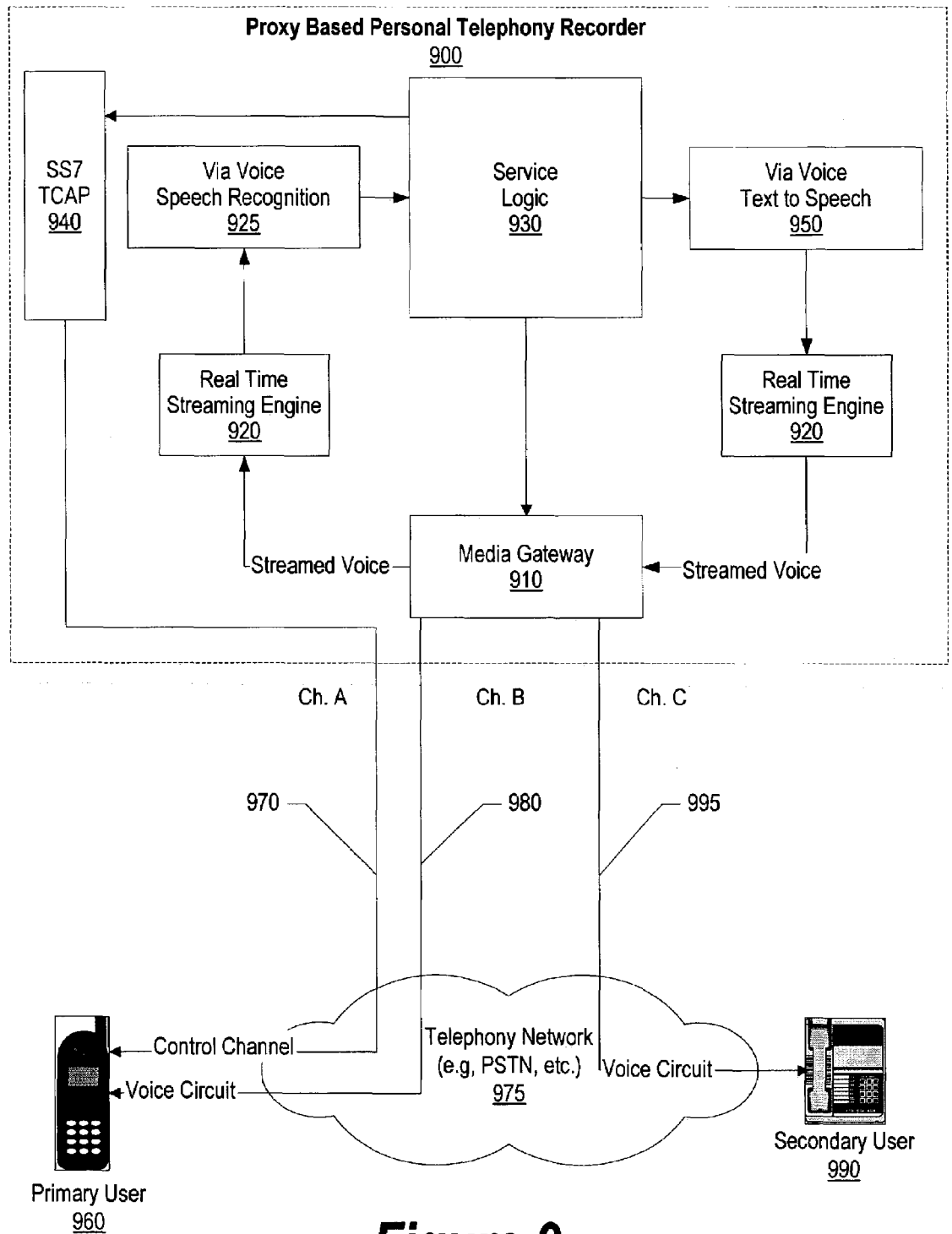
FIG. 9 is a network diagram of a personal telephony recorder proxy system using proxy dialing with PSTN-centric telephones.

FIG. 9 is a network diagram of a personal telephony recorder proxy system using proxy dialing with PSTN-centric telephones. Network based personal telephony recorder 900 includes a number of components for receiving and processing telephone traffic from a public switched telephone network (PSTN 975). In the example shown in FIG. 9, primary user 960 has two connections connecting his telephone device to personal telephony recorder 900—control channel 970 for sending and receiving digital data to SS7 TCAP component 940 within personal telephony recorder 900, and voice circuit 980 for sending and receiving voice (analog) data. Secondary user 990 uses voice circuit 995 to send and receive voice (analog) data with personal telephony recorder 900.

SS7 is short for Signaling System 7, a telecommunications protocol defined by the International Telecommunication Union (ITU) as a way to offload PSTN data traffic congestion onto a wireless or wireline digital broadband network. SS7 is characterized by high-speed circuit switching and out-of-band signaling using Service Switching (SSPs), Signal Transfer Points (STPs), and Service Control Points (SCPs) (collectively referred to as signaling points, or SS7 nodes). Out-of-band signaling is signaling that does not take place over the same path as the data transfer (or conversation)—a separate digital channel is created (called a signaling link), where messages are exchanged between network elements at 56 or 64 kilobit per second. SS7 architecture is set up in a way so that any node could exchange signaling with any other SS7-capable node, not just signaling between switches that are directly connected. The SS7 protocol is used for basic call setup and management, wireless services such as personal communications services (PCS), wireless roaming, and mobile subscriber authentication, local number portability (LNP), toll-free wireline services, and enhanced call features. These call features include personal telephony recorder provided functions such as call forwarding, data mining and call searching functions, bookmarking, call data retrieval, dropped line signaling, call data playback, and participant identification. These functions are provided by service logic component which sends the data through SS7 TCAP component 940. The SS7 TCAP component then sends the information to primary user's telephone device 960 through control channel 970.

Analog data is received by the personal telephony recorder's media gateway component 910. The media gateway provides streamed voice to real-time streaming engine 920 which feeds the data through speech recognition unit 925, such as IBM's Via Voice™ software, which converts the analog speech to text. The text is then processed by service logic component 930. Commands included in the text are processed by service logic component 930, such as call data forwarding, data mining and call searching functions, bookmarking, call data retrieval, dropped line signaling, call data playback, and participant identification. The results are sent to speech synthesizer 950 to convert the text back to audible speech. The audible speech is then streamed by real time streaming engine 920 which sends the data back to the participant through media gateway 910. In the case of primary participant 960 the data is returned through voice circuit 980, and in the case of secondary participant 990 the data is returned through voice circuit 995.

Figure 10:
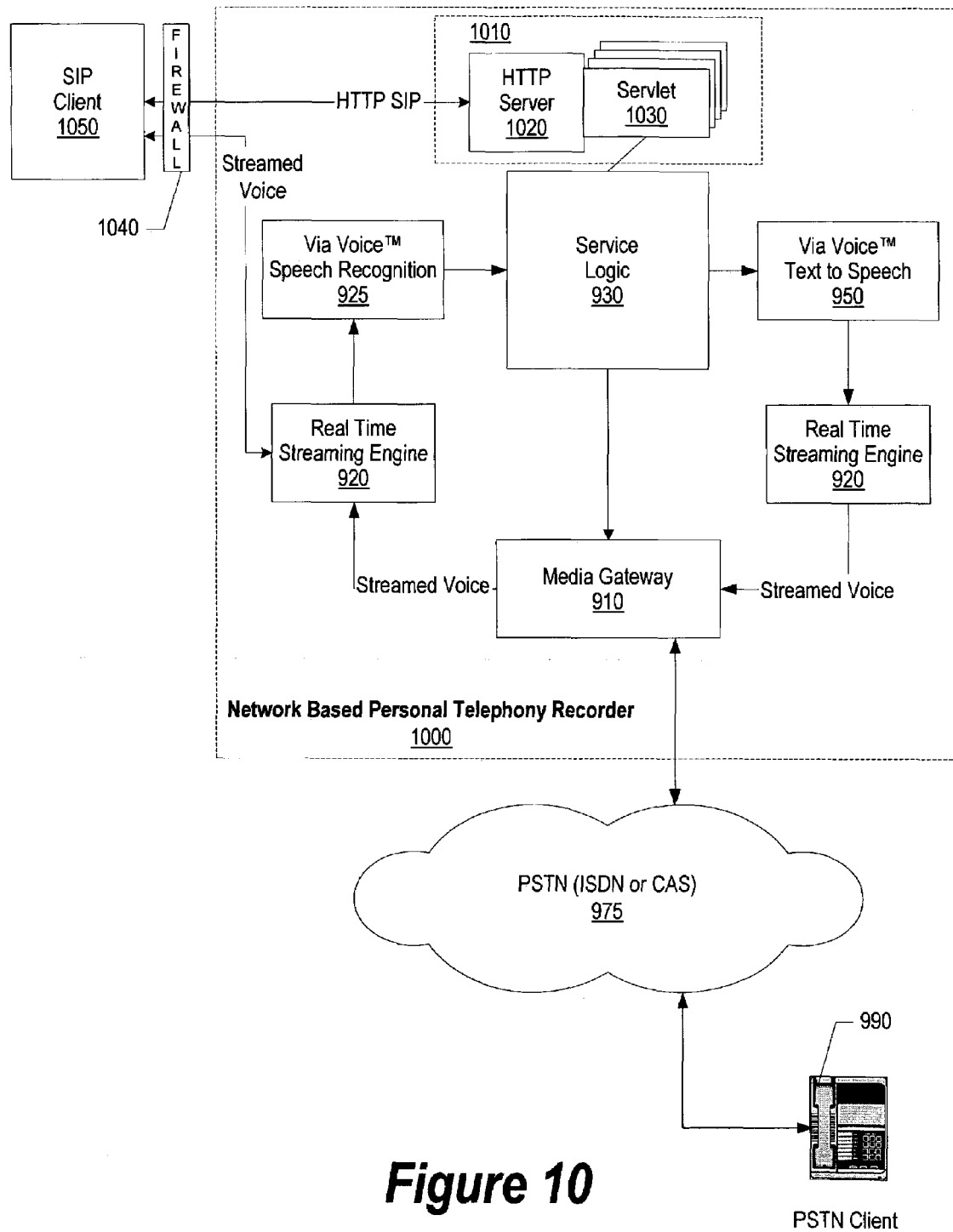
FIG. 10 is a network diagram of a personal telephony recorder proxy system using proxy dialing with PSTN-centric telephones as well as a Session Initiation Protocol (SIP) based telephone.

FIG. 10 is a network diagram of a personal telephony recorder proxy system using proxy dialing with PSTN-centric telephones as well as a Session Initiation Protocol (SIP) based telephone. Session Initiated Protocol, or Session Initiation Protocol, is a signaling protocol for Internet conferencing, telephony, presence, events notification and instant messaging. The protocol initiates call setup, routing, authentication and other feature messages to endpoints within an IP domain.

Personal telephony recorder 1000 shown in FIG. 10 is similar to the personal telephony recorder shown in FIG. 9, however the personal telephony recorder shown in FIG. 10 includes additional functionality for communicating with SIP-based clients, such as client 1050. SIP client 1050 sends and receives streamed voice through firewall 1040 to real time streaming engine 920. Personal telephony recorder commands are sent in an HTTP SIP message by SIP-client through firewall 1040 to Web server 1010 which is included in or connected to personal telephony recorder 1000. Web server 1000 includes HTTP server 1020 and one or more servlets. A servlet is an applet that runs on a server. The term usually refers to a Java applet that runs within a Web server environment. This is analogous to a Java applet that runs within a Web browser environment. A Java servlet is persistent so that it stays in memory and can fulfill multiple requests. The persistence of Java applets and servlets increases throughput and efficiency because the process does not need to be repeatedly set up and torn down.

Requests processed by Web server included in the text are processed by Web server 1020, such as call data forwarding, data mining and call searching functions, bookmarking, call data retrieval, dropped line signaling, call data playback, and participant identification. Individual servlets that provide personal telephony recorder functionality interface with service logic 930. In this manner, responses can be sent back to SIP client 1050 as either HTTP responses, or the textual responses can be converted to speech and the speech can be streamed to the SIP client and played on a speaker attached to the SIP client. Streamed voice data received from SIP client 1050 is transmitted through media gateway 910 to PSTN client 990 through telephone network 975. Likewise, voice data can be streamed and sent to other SIP clients connected to the personal telephony recorder through a computer network, such as the Internet.

Figure 11:
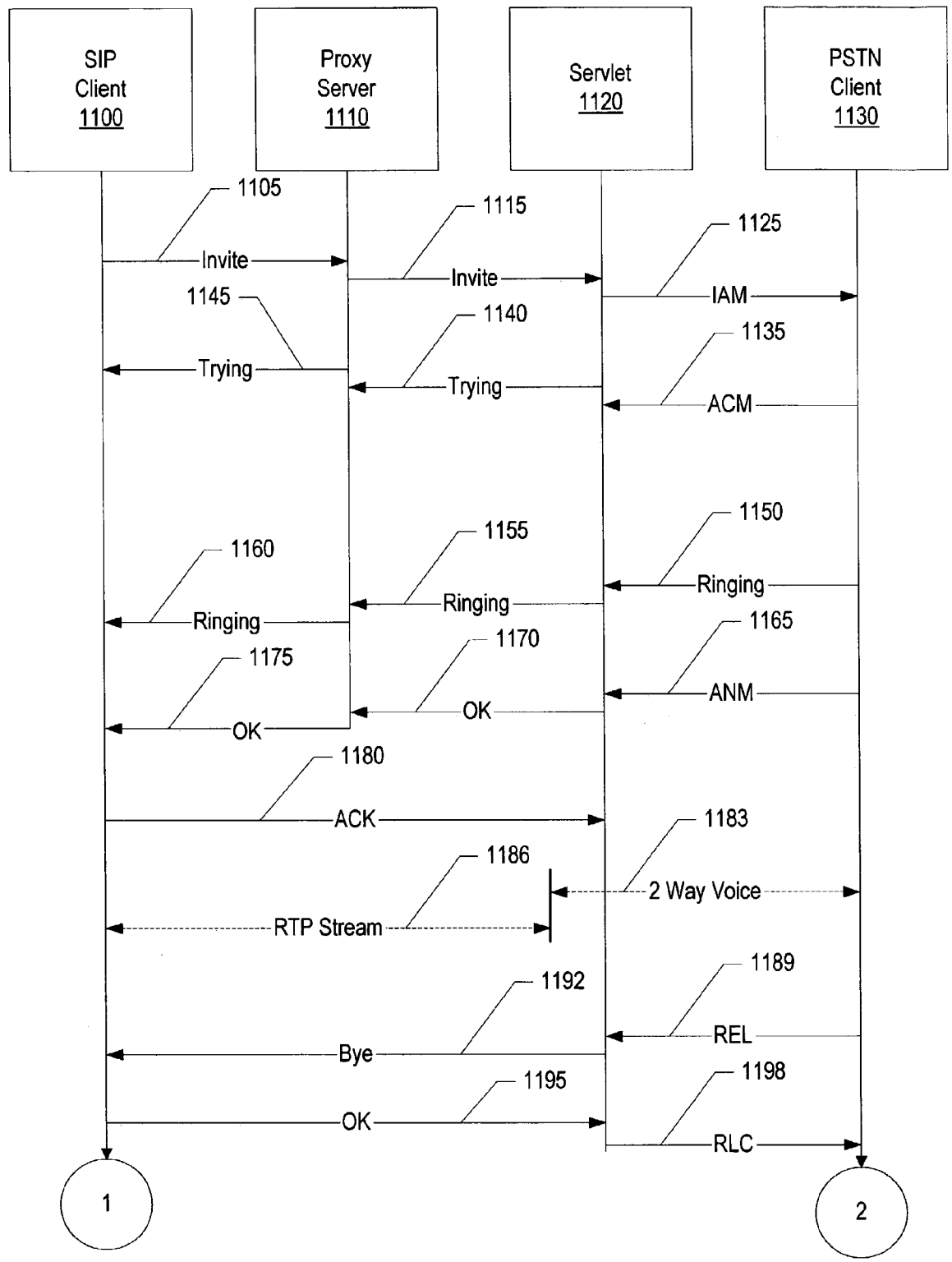
FIG. 11 is a signal diagram of a personal telephony recorder proxy system using proxy dialing with PSTN-centric telephones as well as a Session Initiation Protocol (SIP) based telephone.

FIG. 11 is a signal diagram of a personal telephony recorder proxy system using proxy dialing with PSTN-centric telephones as well as a Session Initiation Protocol (SIP) based telephone. SIP client 1100 initiates the call by sending invitation signal 1105 to proxy server 1110 as an HTTP SIP request. Proxy server 1110 passes the request to a servlet to handle in signal 1115. The servlet provides an Initial Address Message (IAM) signal 1125 to PSTN client 1130 over a Public Switched Telephone Network (PSTN). The PSTN replies with Address Complete Message (ACM) signal 1135 which is sent back to servlet 1120. The servlet, in turn, sends out a message indicating that the number is being "tried" (signal 1140) which is sent from proxy server 1110 back to SIP client 1100 as signal 1145.

When the PSTN client's phone is signaled and rings, the PSTN client sends "ring" signal 1150 through the PSTN back to servlet 1120. The servlet, in turn, sends message 1155 indicating that the client's phone is ringing which is sent by the proxy server back to the SIP client as signal 1160.

When the PSTN answers the PSTN-based telephone, an Answer Message (ANM) is transmitted from the PSTN to the servlet. The servlet responds by sending an "OK" message through the proxy server (signal 1170) which is received by the SIP client in signal 1175. The SIP client responds with an HTTP Acknowledgement (ACK) which is sent to the servlet.

Two way voice communication commences between the SIP client and the PSTN client. Analog voice 1183 received from the PSTN client is converted by the proxy server to RTP stream 1186 which is sent to the SIP-based client. RTP is short for Real-Time Transport Protocol, an Internet protocol for transmitting real-time data such as audio and video. When voice data is received from the SIP-based client in RTP stream 1186, the voice data is converted to analog voice data 1183 by the proxy server and transmitted over the PSTN to the PSTN-based client. This continues until the participants hang up and end the call.

When the participants hang up the phones, Release Message (REL) is received as signal 1189 by the servlet from the PSTN-based client. The servlet, in turn, sends "bye" message 1192 to the SIP-based client. The SIP-based client responds with "OK" message 1195 that is received by the servlet and transmitted over the PSTN to the PSTN client as Release Complete (RLC) signal 1198.

Figure 12:
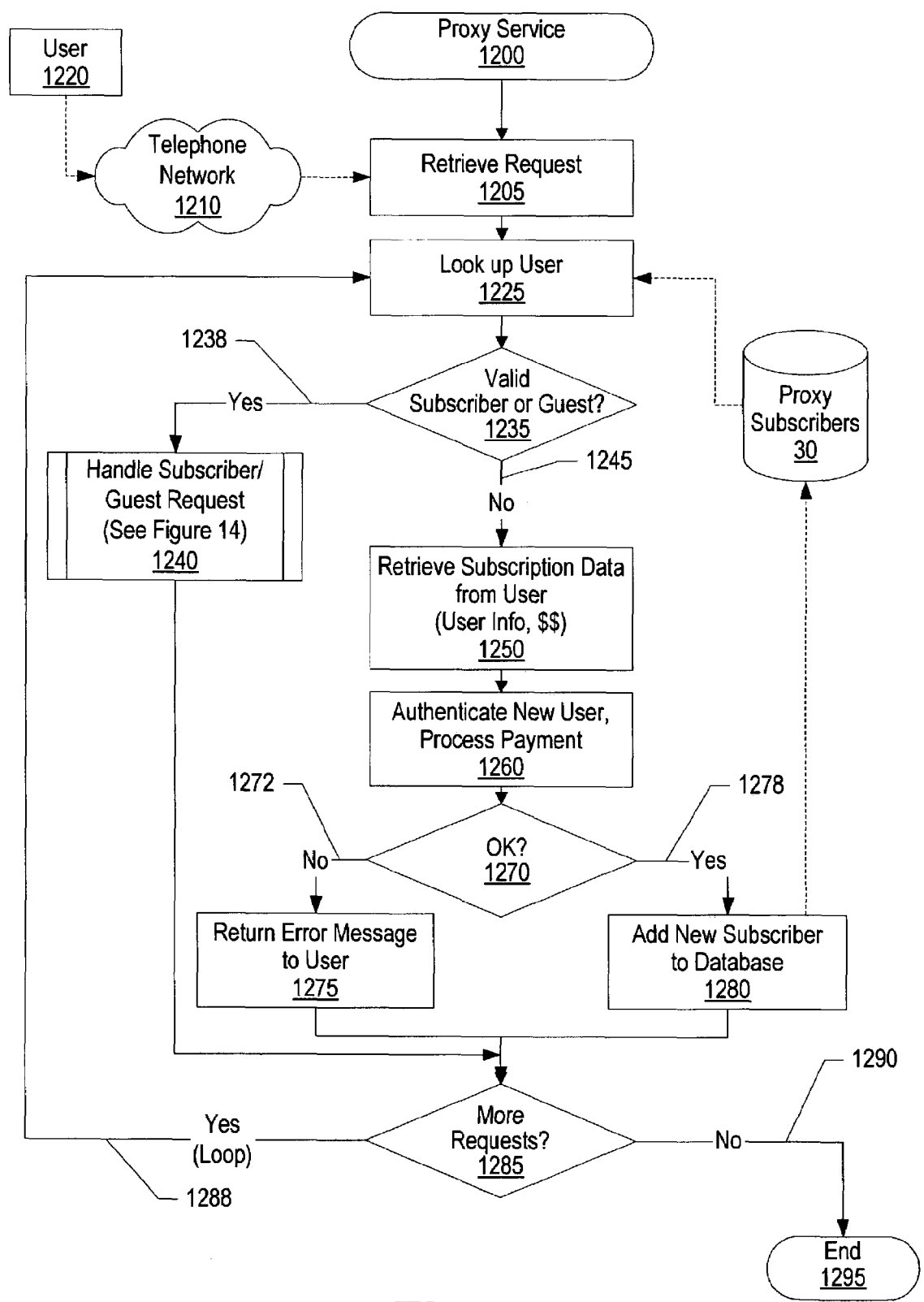
FIG. 12 is a high level flowchart of a personal telephony recorder proxy service handling requests from users.

FIG. 12 is a high level flowchart of a personal telephony recorder proxy service handling requests from users. Processing commences at 1200 whereupon a request is received (step 1205) through telephone network 1210 from user 1220. The user is looked up (step 1225) by matching information provided by the user (e.g., user identifier and pin code or password) with information stored in proxy subscribers data store 1230.

In response to looking up the user information, A determination is made as to whether the user is a valid subscriber or guest to the proxy personal telephony recorder system (decision 1235). If the user is a valid subscriber or guest, decision 1235 branches to "yes" branch 1238 whereupon the subscriber or guest request is processed (predefined process 1240, see FIG. 14 for processing details).

On the other hand, if the user is not a valid subscriber or guest, decision 1235 branches to "no" branch 1245 whereupon new subscription data is received from the user (step 1250). The new subscription data includes information about the user (e.g., name, phone number, etc.) as well as payment data such as credit or debit card information. The new user information and the payment information is processed (step 1260). A determination is made as to whether the payment information was successfully processed (decision 1270). If the payment information was not successfully processed, decision 1270 branches to "no" branch 1272 whereupon an error is returned to the user (step 1275). On the other hand, if the payment information was successfully processed, decision 1270 branches to "yes" branch 1278 whereupon the new subscriber's information is added to proxy subscribers data store 1230 (step 1280).

A determination is made as to whether there are more requests to process from other users received over the telephone network (decision 1285). If there are additional requests to process, decision 1285 branches to "yes" branch 1288 which loops back to process the next request. This looping continues until there are no more requests to process (i.e., the proxy service is shutdown) at which point decision 1285 branches to "no" branch 1290 and processing ends at 1295.

Figure 13:
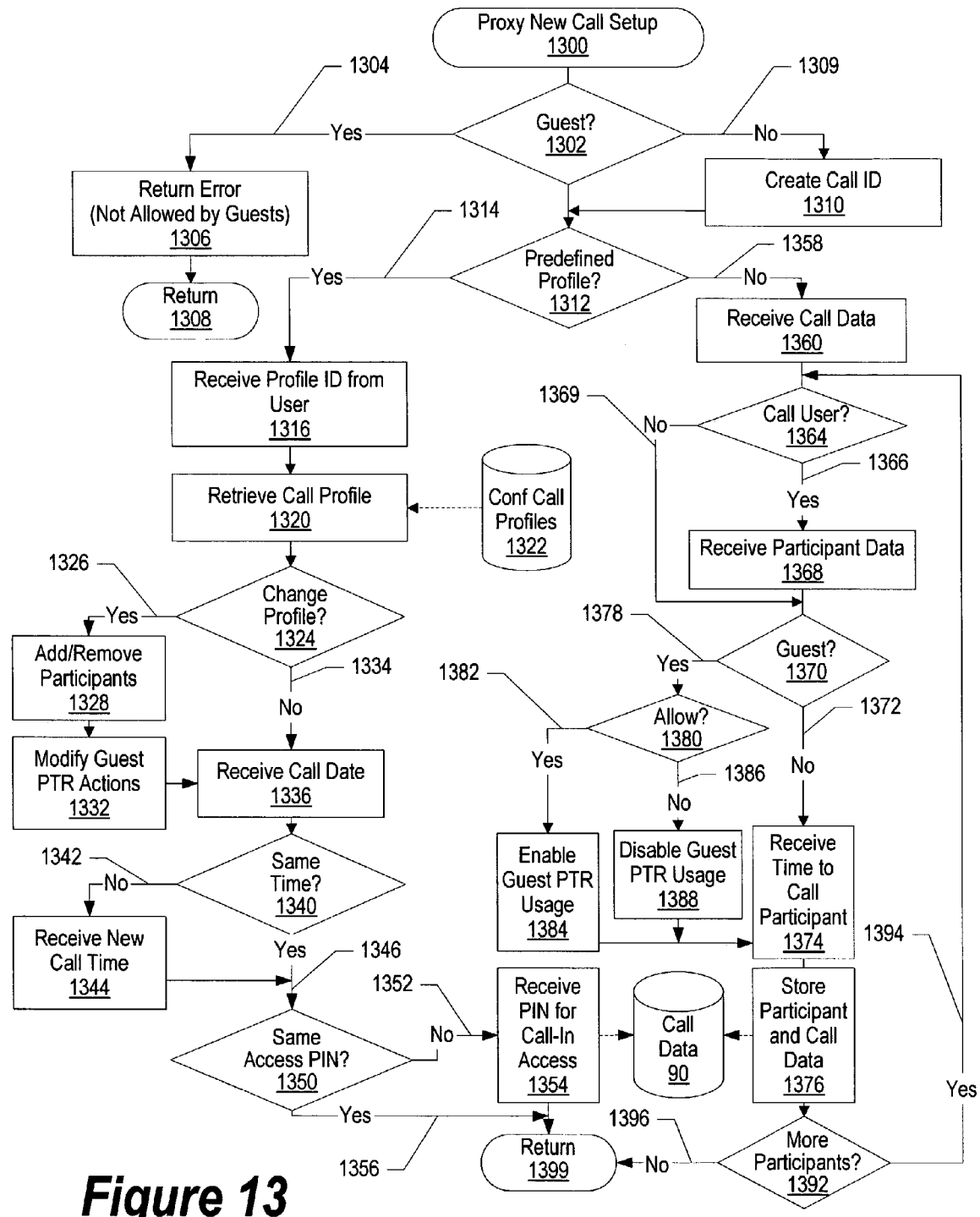
FIG. 13 is a flowchart showing steps taken in setting up a new conference call using a personal telephony recorder proxy service.

FIG. 13 is a flowchart showing steps taken in setting up a new conference call using a personal telephony recorder proxy service. Processing commences at 1300 whereupon a determination is made as to whether the user is a guest of the proxy personal telephony recorder system or is a subscriber (decision 1302). If the requestor is a guest, decision 1302 branches to "yes" branch 1304 whereupon an error is returned to the guest (step 1306) and processing returns at 1308.

On the other hand, if the user is a subscriber, decision 1302 branches to "no" branch 1309 whereupon a unique identifier is assigned to the new call (step 1310). A determination is made as to whether the user is using a predefined profile to setup the teleconference with the proxy personal telephony recorder (decision 1312). A predefined profile allows a user to set up a recurring type of conference call, such as a weekly conference call between colleagues in an organization. If the user is using a predefined profile, decision 1312 branches to "yes" branch 1314 whereupon a predefined profile identifier is received from the user (step 1316) and the corresponding profile is retrieved (step 1320) from conference call profile data store 1322.

A determination is made as to whether the user wishes to change items in the profile (decision 1324). If the user wishes to change the profile, decision 1324 branches to "yes" branch 1326 whereupon the user is able to add and remove participants (step 1328) and modify personal telephony recorder actions that guests (non-subscribers) are allowed to take during the teleconference (step 1332). On the other hand, if the user is not changing the profile, decision 1324 branches to "no" branch 1334 bypassing steps 1328 and 1332.

The date of the conference call is received from the user (step 1336). A determination is made as to whether the conference call is at the same time as found in the profile (decision 1340). If the call is not at the same time as found in the profile, decision 1340 branches to "no" branch 1342 whereupon the new time for the conference call is received from the user (step 1344). On the other hand, if the call is at the same time (e.g., a recurring call that takes place at 12:00 noon), then decision 1340 branches to "yes" branch 1346 bypassing step 1344.

A determination is made as to whether the same password or PIN code is used to access the conference call (decision 1350). An access PIN code or password is used by participants to join a call when the participants call the proxy server. In addition, the proxy server can be programmed to call participants at predetermined times and join the participants to the conference call. If the same PIN code or password is not being used, decision 1350 branches to "no" branch 1352 whereupon the new PIN code or password is received from the user (step 1354) and stored in nonvolatile data store 1390. On the other hand, if the same PIN code or password is being used, decision 1350 branches to "yes" branch 1356 bypassing step 1354. Processing then returns at 1399.

Returning to decision 1312, if a predefined profile is not being used, decision 1312 branches to "no" branch 1358 whereupon the date of the conference call is received from the user (step 1360). In addition, PIN code or password can be supplied by the user. The PIN code or password will be used by participants calling the proxy server to join the conference call. A determination is made as to whether the system will call participant or whether the participant will call the proxy in order to be connected to the conference call (decision 1364). If the personal telephony recorder proxy server will call the participant, decision 1364 branches to "yes" branch 1366 whereupon the participant data is received from the user (step 1368). The participant data includes the telephone number that the proxy server will call in order to connect the participant. On the other hand, if the participant will not be called by the proxy server (i.e., the participants will call the proxy server and enter an access code such as a PIN code), then decision 1364 branches to "no" branch 1369 bypassing step 1368.

A determination is made as to whether the participant is a guest or a subscriber of the personal telephony recorder proxy service (decision 1370). If the participant is not a guest (i.e., the participant is a subscriber), then decision 1370 branches to "no" branch 1372 whereupon, in the case of the proxy server calling the participant, a time to call the participant is received from the user (step 1374) and the participant and call data is stored (step 1376) in nonvolatile data store 1390.

On the other hand, if the participant is a guest, decision 1370 branches to "yes" branch 1378 whereupon a determination is made as to whether to allow the guest to perform personal telephony recorder functions (decision 1380). In some environments, the subscriber may incur additional charges for allowing conference call guests to perform personal telephony recorder functions. In addition, some functions may be disabled while allowing guests to use other functions. If the guest will be allowed to perform personal telephony recorder functions, decision 1380 branches to "yes" branch 1382 whereupon personal telephony recorder functions that the user wishes to allow the guest to use are enabled (step 1384). On the other hand, if the guest will not be allowed to perform personal telephony recorder functions, decision 1380 branches to "no" branch 1386 whereupon guest personal telephony recorder functions are disabled for the guest participant. In the case of the proxy server calling the guest participant, a time to call the participant is received from the user (step 1374) and the guest participant's data and call data is stored (step 1376) in nonvolatile data store 1390.

A determination is made as to whether there are more participants to add to the conference call (decision 1392). If there are more participants to add, decision 1392 branches to "yes" branch 1394 which loops back to receive information regarding the next participant. This looping continues until there are no more participants to add, at which point decision 1392 branches to "no" branch 1396 and processing ends at 1399.

Figure 14:
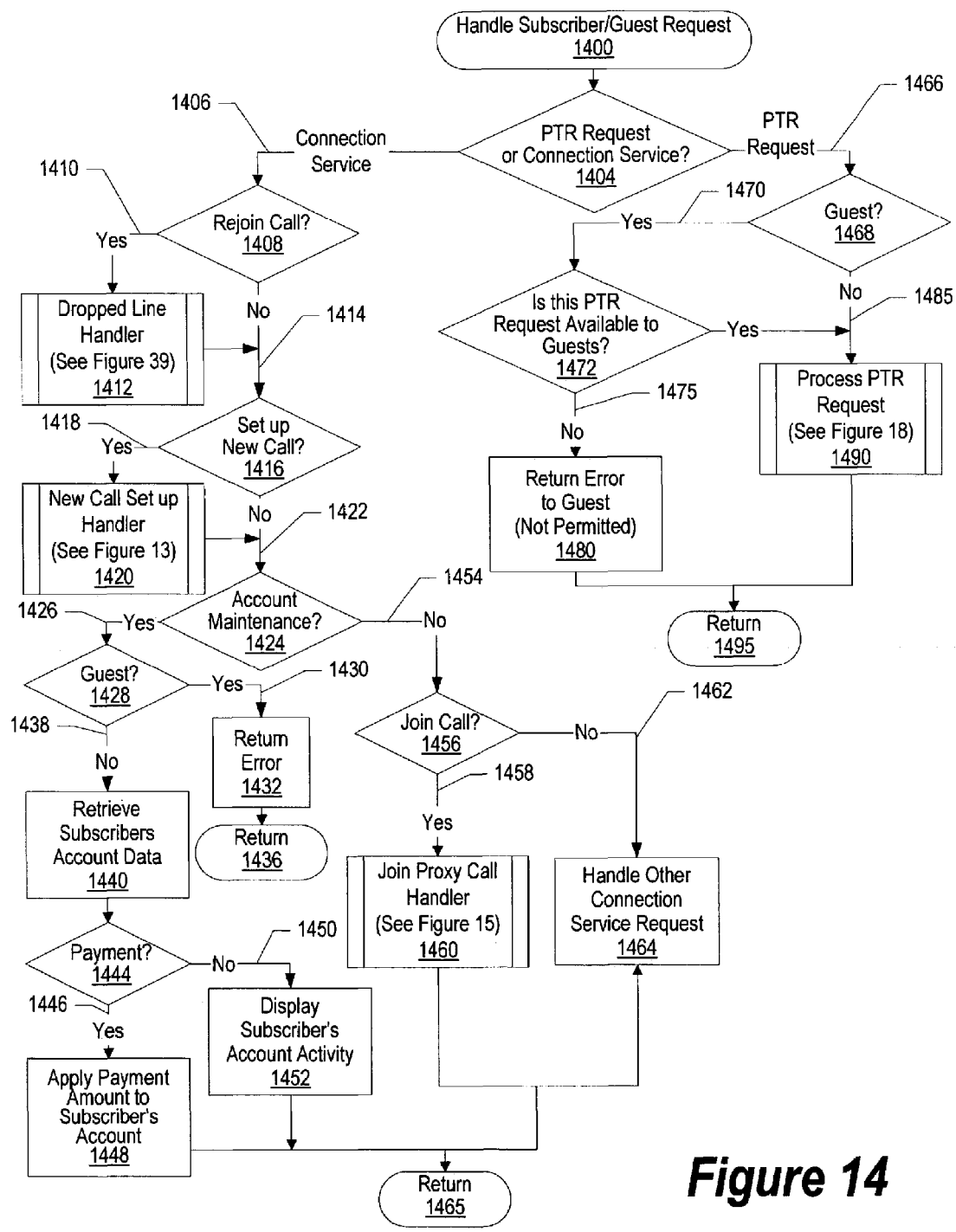
FIG. 14 is a flowchart showing the handling of user requests received at a personal telephony recorder proxy service.

FIG. 14 is a flowchart showing the handling of user requests received at a personal telephony recorder proxy service. Processing commences at 1400 whereupon a determination is made as to whether the request is a personal telephony recorder request or a connection service request (decision 1404). If the request is a connection service request, decision 1404 branches to branch 1406 whereupon a determination is made as to whether the user is rejoining a telephone conference call (decision 1408). If the user is rejoining a call, decision 1408 branches to "yes" branch 1410 whereupon dropped line handler reconnects the user and allows the user to listen to the portion of the call that was missed (predefined process 1412, see FIG. 39 for processing details).

On the other hand, if the user is not rejoining a call decision 1408 branches to "no" branch 1414 whereupon a determination is made as to whether the user is requesting to setup a new conference call with the proxy server (decision

1416). If the user is requesting to setup a new conference call, decision 1416 branches to "yes" branch 1418 whereupon the new call is setup (predefined process 1420, see FIG. 13 for processing details).

On the other hand, if the user is not requesting to setup a new conference call, decision 1416 branches to "no" branch 1422 whereupon a determination is made as to whether the user is requesting an account maintenance function (decision 1424). If the user is requesting an account maintenance function, decision 1424 branches to "yes" branch 1426 whereupon a determination is made as to whether the user is a guest or a subscriber (decision 1428). If the user is a guest, decision 1428 branches to "yes" branch 1430 whereupon an error is returned (step 1432) to the user (guests do not have accounts to maintain) and processing returns at 1436.

If the user is a subscriber, decision 1428 branches to "no" branch 1438 whereupon the subscriber's account information is retrieved (step 1440). A determination is made as to whether the user is applying a payment to the account, such as with a credit card (decision 1444). If the user is applying a payment, decision 1444 branches to "yes" branch 1446 whereupon the payment is applied to the subscriber's account (1448). If the user is not applying a payment, decision 1444 branches to "no" branch 1450 whereupon the subscriber's account activity is displayed to the user (step 1452).

Returning to decision 1424, if the user is not an account maintenance request, decision 1424 branches to "no" branch 1454 whereupon a determination is made as to whether the user is requesting to join a conference call (decision 1456). If the user is requesting to join a conference call being managed by the proxy server, decision 1456 branches to "yes" branch 1458 whereupon the proxy server handles the join call request (predefined process 1460, see FIG. 15 for processing details). On the other hand, if the request is not a join call request, decision 1456 branches to "no" branch 1462 whereupon another type of connection service request is processed (step 1464). Processing thereafter returns at 1465.

Returning to decision 1404, if the request is a personal telephony recorder request, decision 1404 branches to branch 1466 whereupon a determination is made as to whether the user is a guest or a subscriber (decision 1468). If the user is a guest, decision 1468 branches to "yes" branch 1470 whereupon a determination is made as to whether this guest has been given the ability to request the personal telephony recorder function (decision 1472). If the guest has not been granted such ability, decision 1472 branches to "no" branch 1475 whereupon an error is returned to the guest and processing returns at 1495. On the other hand, if the user is a subscriber (decision 1468 branching to "no" branch 1485) or if the guest has been granted the right to use the requested personal telephony recorder function (decision 1472 branching to "yes" branch 1488), then the requested personal telephony recorder function is processed (predefined process 1490, see FIG. 18 for processing details) Processing thereafter returns at 1495.

Figure 15:
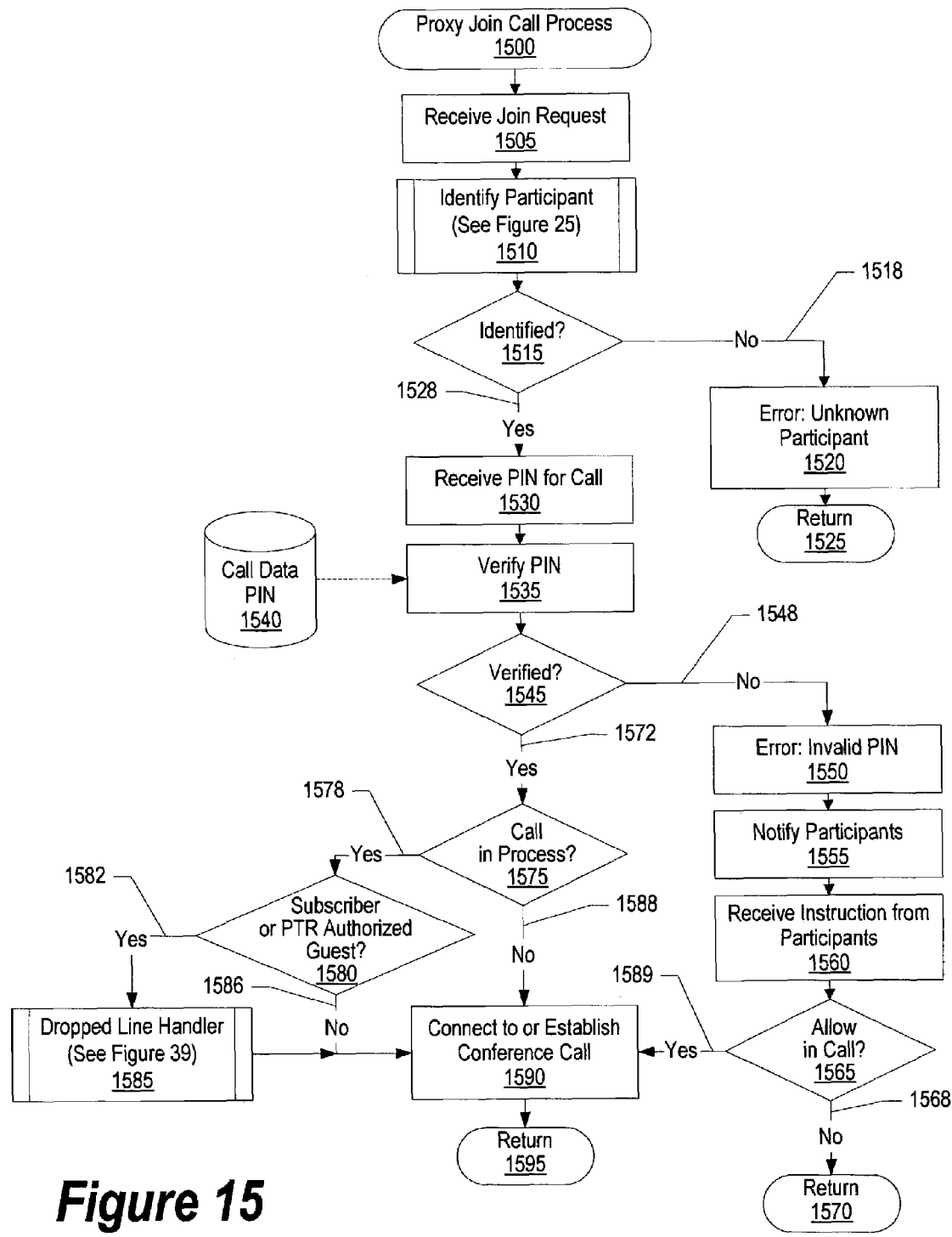
FIG. 15 is a flowchart showing steps taken in joining a call to a teleconference being managed by a personal telephony recorder proxy service.

FIG. 15 is a flowchart showing steps taken in joining a call to a teleconference being managed by a personal telephony recorder proxy service. Processing commences at 1500 whereupon the proxy server receives a join request (step 1505). The identity of the requester is determined (predefined process 1510, see FIG. 25 for processing details).

A determination is made as to whether the requester was identified (decision 1515). If the user was not identified, decision 1515 branches to "no" branch 1518 whereupon an error is returned to the requester (step 1520) and processing returns at 1525.

On the other hand, if the user was identified, decision 1515 branches to "yes" branch 1528 whereupon a password or PIN code is received from the requester (step 1530). The password or PIN code is verified (step 1535) by retrieving the correct PIN code from data store 1540. A determination is made as to whether the PIN code or password entered is valid (decision 1545). If the PIN code or password is incorrect, decision 1545 branches to "no" branch 1548 whereupon an error is returned to the requester (step 1550) and the participants currently engaged in the conference call are notified of the requestor's request to join the call (step 1555). The participants can instruct the personal telephony recorder to allow the requester to join the call or to deny the request (step 1560). A determination is made as to whether the participants wish to allow the requester to join the call (decision 1565). If the participants do not wish to allow the requester to join the call, decision 1565 branches to "no" branch 1568 whereupon processing returns at 1568. On the other hand, if the participants choose to allow the requester to join the call, decision 1565 branches to "yes" branch 1589 whereupon the requester is connected to the conference call (step 1590).

Returning to decision 1545, if the password or PIN code entered by the requester is verified, then decision 1545 branches to "yes" branch 1572 whereupon a determination is made as to whether a conference call is currently in progress (decision 1575). If the conference call is already in progress, decision 1575 branches to "yes" branch 1578 whereupon a determination is made as to whether the user is a subscriber or a guest that has been granted the ability to use personal telephony recorder functions (decision 1580). If the user is a subscriber or a guest that has been granted the ability to use personal telephony recorder functions, decision 1580 branches to "yes" branch 1582 whereupon the dropped line handler allows the user to replay the portion of the conference call that was missed (predefined process 1585, see FIG. 39 for processing details). If either the user is not a subscriber or a guest that has been granted the ability to use personal telephony recorder functions (decision 1580 branching to "no" branch 1586) or the call is not yet in progress (decision 1575 branching to "no" branch 1588), or after the user has used the dropped line handler (predefined process 1585), then the user is connected to the conference call or a new conference call is established if the user is the first participant (step 1590). Processing thereafter ends at 1595.

Figure 16:
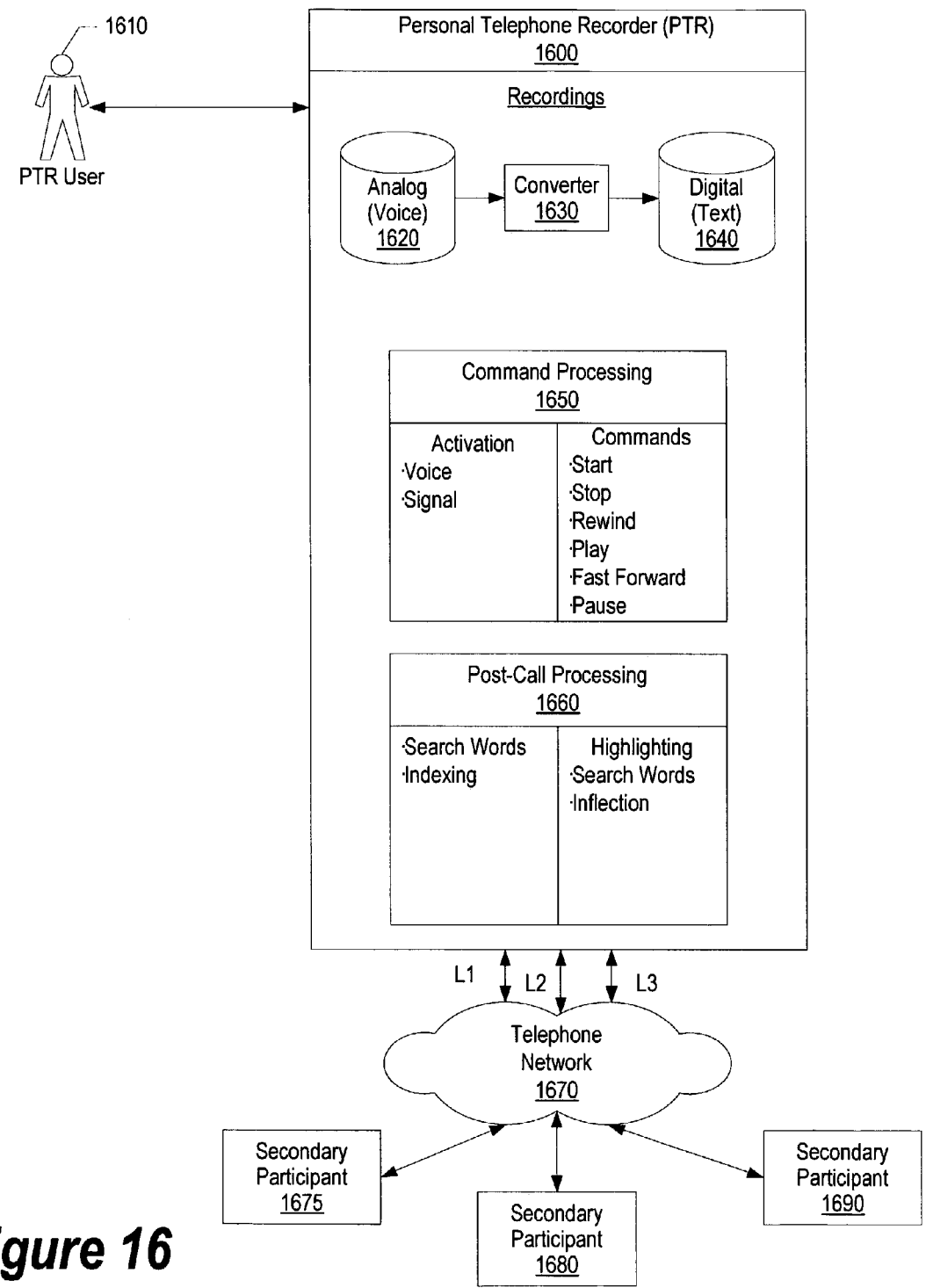
FIG. 16 is a high level network diagram for personal telephony recorder services.

FIG. 16 is a high level network diagram for personal telephony recorder services. Personal telephony recorder system 1600 is accessed by user 1610 using a computer with telephony capabilities or using a telephone.

The personal telephony recorder is used to provide enhanced telephony capabilities and recording for the user when communicating with participants (1675, 1680, and 1690) through telephone network 1670. In the example shown, the user's personal telephony recorder device maintains three connections with telephone network 1670 (L1, L2, and L3) during the conference call.

Personal telephony recorder 1600 records analog voice 1620 in a memory area or on a nonvolatile storage device. The personal telephony recorder also includes voice-to-text converter 1630 for creating text version of call data 1640. The text version of the call data can be used for searching, reporting, and data mining.

Command processing components 1650 included with personal telephony recorder 1600 include components to identify commands through voice or signal processing as well as components to perform functions such as starting a call, stopping a playback, rewinding stored call data, playing stored call data, fast forwarding through call data, and pausing a playback.

Post-call processing 1660 is typically performed after a call has ended and includes functions for searching call data for words and phases and indexing words found in call data. In addition, results returned by the personal telephony recorder can highlight the search words as well as the voice inflection that normally is not captured using traditional systems.

Figure 17:
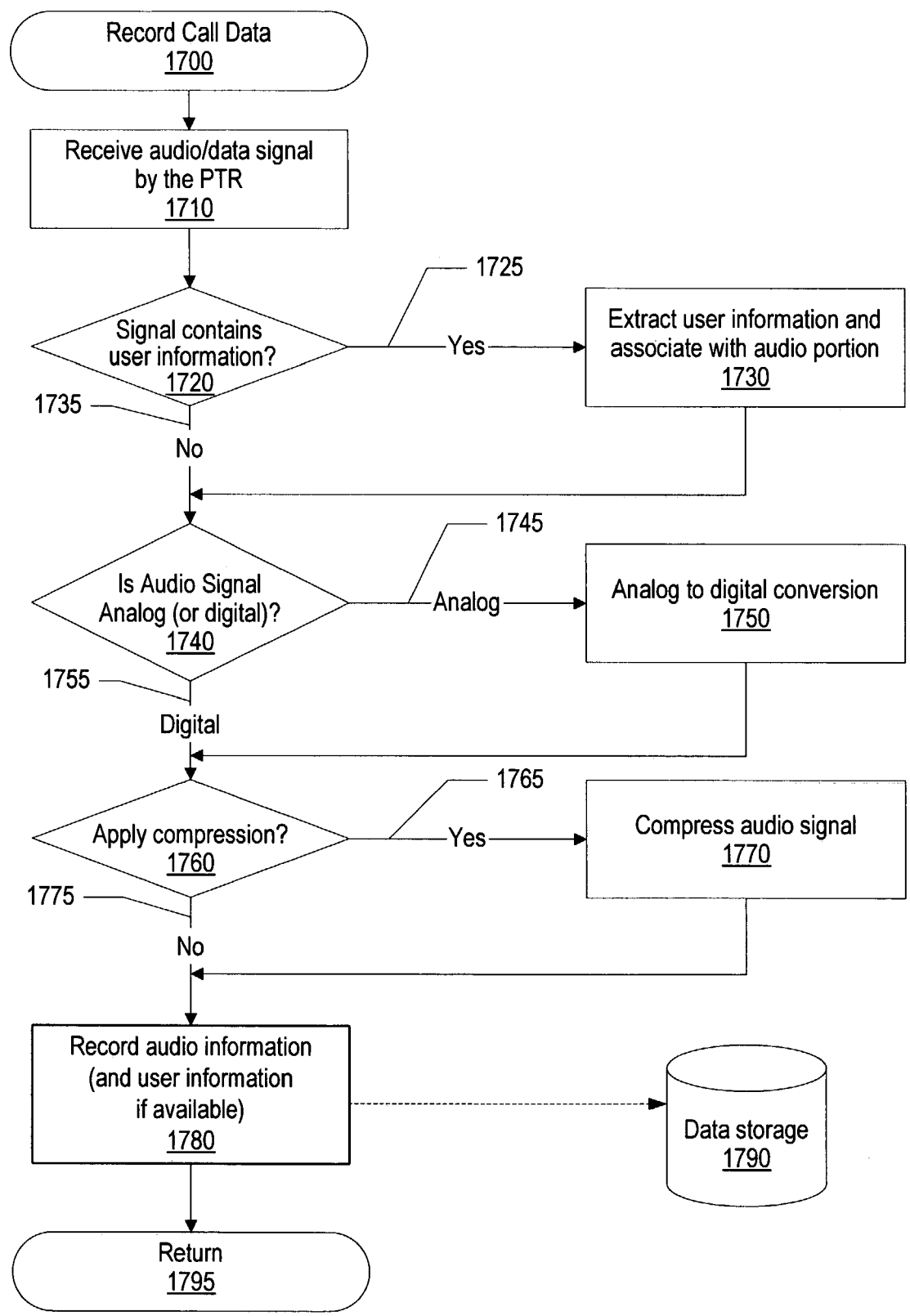
FIG. 17 is a flowchart showing steps taken in recording a call using a personal telephony recorder.

FIG. 17 is a flowchart showing steps taken in recording a call using a personal telephony recorder. Processing commences at 1700 whereupon an audio or data signal is received by the personal telephony recorder (step 1710). A determination is made as to whether the signal includes identifying information about the user (decision 1720). If the signal includes user information, decision 1720 branches to "yes" branch 1725 whereupon the user information is extracted from the signal and associated with the audio portion of the data (step 1730). On the other hand, if the signal does not include user information, decision 1720 branches to "no" branch 1735 bypassing step 1730.

A determination is made as to whether the audio signal is an analog or digital signal (decision 1740). If the signal is an analog signal, decision 1740 branches to branch 1745 whereupon the analog signal is converted to a digital signal (step 1750). On the other hand, if the signal is digital, decision 1740 branches to branch 1755 bypassing step 1750.

A determination is made as to whether compression should be applied to the digital signal in order to conserve storage space (decision 1760). If compression is used, decision 1760 branches to "yes" branch 1765 whereupon compression is applied to the digital signal (step 1770). On the other hand, if compression is not applied, decision 1760 branches to "no" branch 1775 bypassing step 1770. The audio information (and any corresponding user information) is stored (step 1780) in storage area 1790. Storage area 1790 can be a volatile storage area, such as a memory buffer, or can be a nonvolatile storage area, such as a disk drive or a nonvolatile memory. Processing thereafter returns at 1795.

Figure 18:
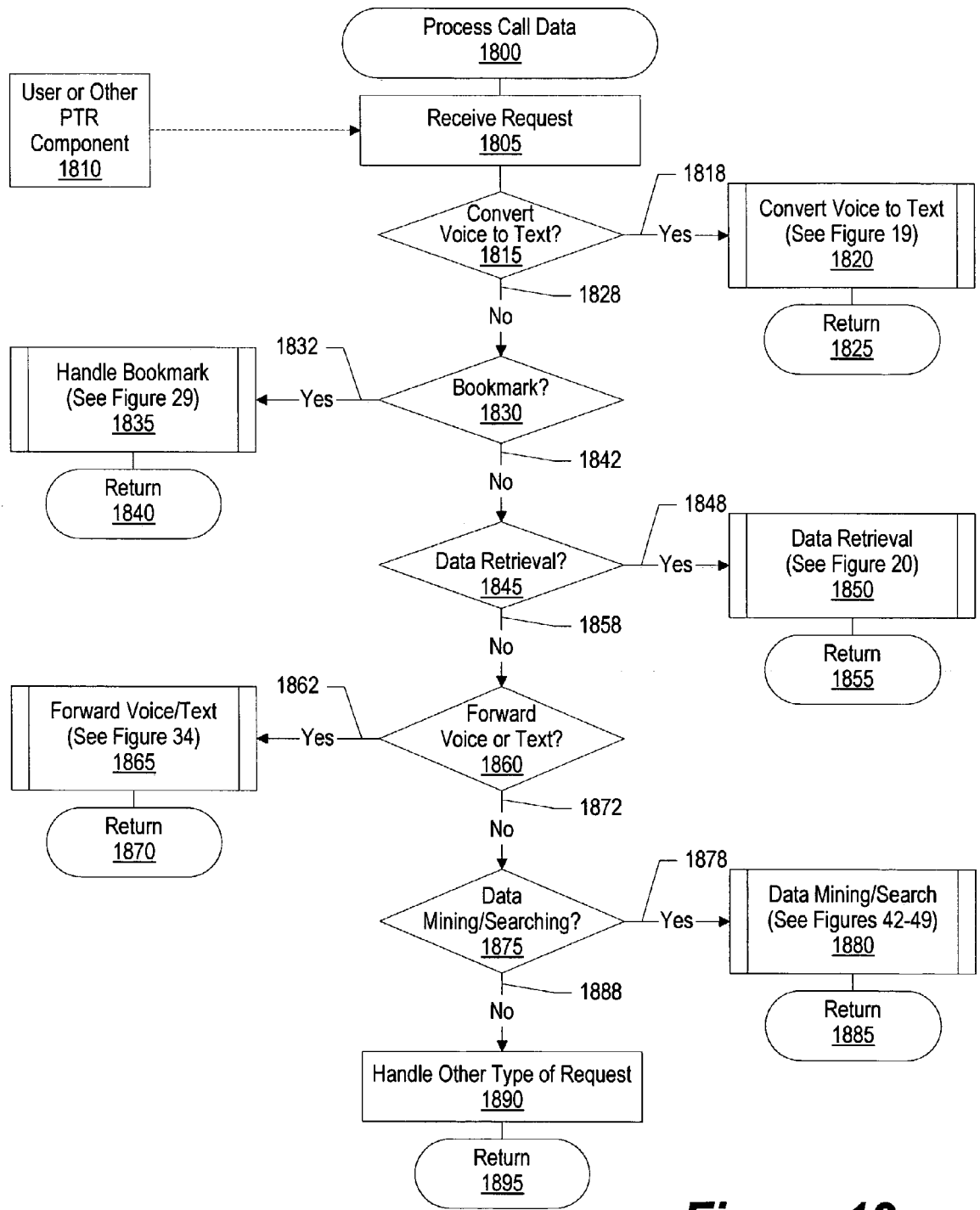
FIG. 18 is a flowchart showing steps taken in processing user requests received at a personal telephony recorder.

FIG. 18 is a flowchart showing steps taken in processing user requests received at a personal telephony recorder. Processing commences at 1800 whereupon a personal telephony recorder request is received (step 1805) from a user or another personal telephony recorder component (1810). A determination is made as to whether the request is to convert voice data to text (decision 1815). If the request is to convert voice to text, decision 1815 branches to "yes" branch 1818 whereupon voice data is converted to text data (predefined process 1820, see FIG. 19 for processing details) and processing returns at 1825.

On the other hand, if the request is not to convert voice to text, decision 1815 branches to "no" branch 1828 whereupon a determination is made as to whether the request is to set or modify a bookmark (decision 1830). If the request is a bookmark request, decision 1830 branches to "yes" branch 1832 whereupon the bookmark request is processed (predefined process 1835, see FIG. 29 for processing details) and processing returns at 1840.

If the request is not a bookmark request, decision 1830 branches to "no" branch 1842 whereupon a determination is made as to whether the request is a data retrieval request (decision 1845). If the request is a data retrieval request, decision 1845 branches to "yes" branch 1848 whereupon the data retrieval processing is performed (predefined process 1850, see FIG. 20 for processing details) and processing returns at 1855.

If the request is not a data retrieval request, decision 1845 branches to "no" branch 1858 whereupon a determination is made as to whether the request is to forward voice or text data (decision 1860). If the request is a forwarding request, decision 1860 branches to "yes" branch 1862 whereupon the text and voice forwarding processing is performed (predefined process 1865, see FIG. 34 for processing details) and processing returns at 1870.

If the request is not a forwarding request, decision 1860 branches to "no" branch 1872 whereupon a determination is made as to whether the request is a data mining or search request (decision 1875). If the request is a data mining or search request, decision 1875 branches to "yes" branch 1878 whereupon the data mining or searching process is performed (predefined process 1880, see FIGS. 42 through 49 for processing details) and processing returns at 1885.

If the request is not a data mining or searching request, decision 1875 branches to "no" branch 1888 whereupon a different type of request is processed (step 1890) and processing returns at 1895.

Figure 19:
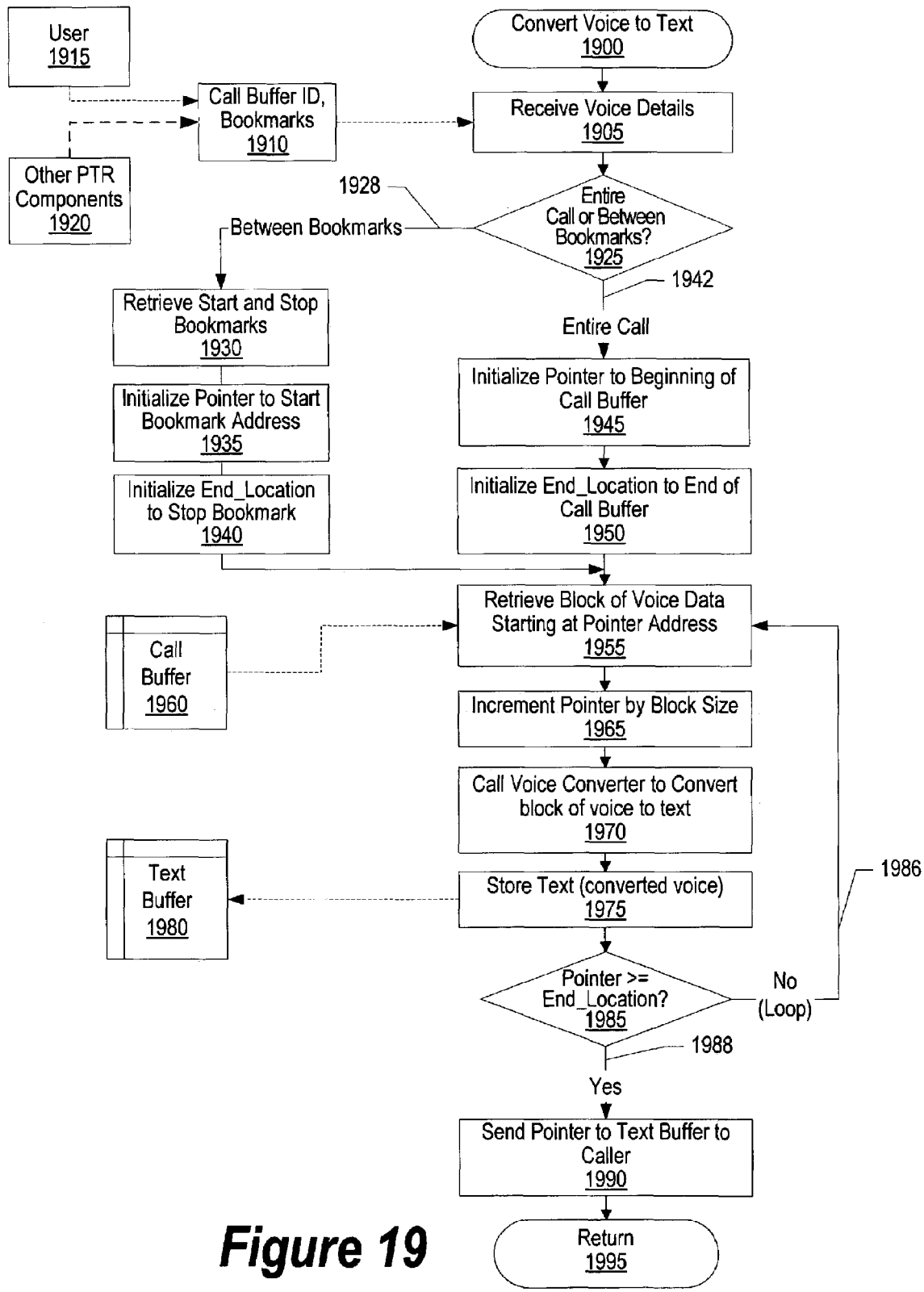
FIG. 19 is a flowchart showing steps taken to convert stored voice data to textual data.

FIG. 19 is a flowchart showing steps taken to convert stored voice data to textual data. Processing commences at 1900 whereupon voice details are received (step 1905) from user 1915 or other personal telephony recorder components 1920 which send request 1910 that includes the call buffer identifier and optional bookmarks which, if present, indicate which portion of the voice data to convert to text.

A determination is made as to whether the entire call is being converted to text or only a portion of the call between a pair of bookmarks (decision 1925). If a portion of the call is being converted, decision 1925 branches to branch 1928 whereupon stop and start bookmarks are retrieved from the request (step 1930). A pointer is initialized to the starting bookmark address (step 1935) and a variable is set to the ending bookmark address (step 1940).

On the other hand, if the entire call is being converted, decision 1925 branches to branch 1942 whereupon the pointer is initialized to the beginning of the call buffer (step 1945) and the ending variable is set to the end of the call buffer (step 1950).

After the pointer and end variable have been established, a block of voice (analog) data is retrieved (step 1955) from call buffer 1960 starting at the pointer address. The pointer is then incremented by the block size (step 1965). A voice conversion routine, such as that found in the IBM Via Voice™ software product, is called to convert the retrieved block of analog voice data into text (step 1970). The converted text is stored (step 1975) in text buffer 1980.

A determination is made as to whether the incremented pointer is equal to or greater than the location identified by the ending variable (decision 1985). If the pointer has not reached the end of the buffer or the portion being converted, decision 1985 branches to "no" branch 1986 which loops back to convert the next block of voice data to text. This looping continues until the end of the buffer or portion has been reached, at which point decision 1985 branches to "yes" branch 1988.

A pointer to the text buffer is returned to the calling routine (step 1990) so that the calling routine can use the text buffer or display the text to the user. Processing thereafter returns at 1995.

Figure 20:
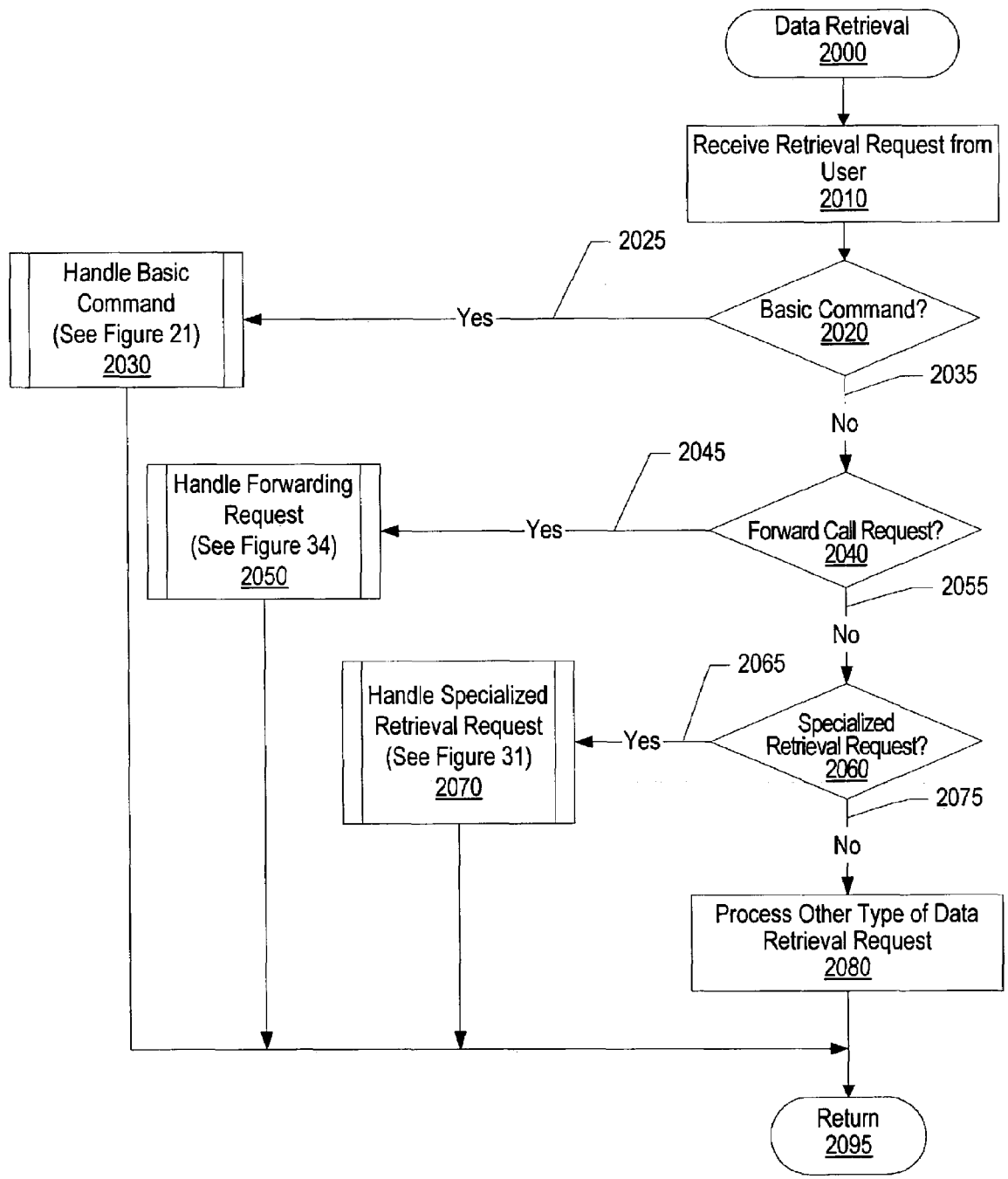
FIG. 20 is a flowchart showing high level steps taken to process a user's data retrieval request.

FIG. 20 is a flowchart showing high level steps taken to process a user's data retrieval request. Processing commences at 2000 whereupon a data retrieval request is received from the user (step 2010). A determination is made as to whether the request is for a basic retrieval process (decision 2020). If the request is for a basic command, decision 2020 branches to "yes" branch 2025 whereupon the basic command is processed (predefined process 2030, see FIG. 21 for processing details).

If the request is not for a basic command, decision 2020 branches to "no" branch 2035 whereupon a determination is made as to whether the request is a request to forward call data (decision 2040). If the request is to forward call data, decision 2040 branches to "yes" branch 2045 whereupon the forwarding request is processed (predefined process 2050, see FIG. 34 for processing details).

If the request is not a request to forward call data, decision 2040 branches to "no" branch 2055 whereupon a determination is made as to whether the request is for specialized retrieval options (decision 2060). If the user is requesting specialized retrieval options, decision 2060 branches to "yes" branch 2065 whereupon the specialized retrieval process is performed (predefined process 2070, see FIG. 31 for processing details).

If the request is not for specialized retrieval options, decision 2060 branches to "no" branch 2075 whereupon some other type of data retrieval request is processed (step 2080). After the request is processed, processing returns at 2095.

Figure 21:
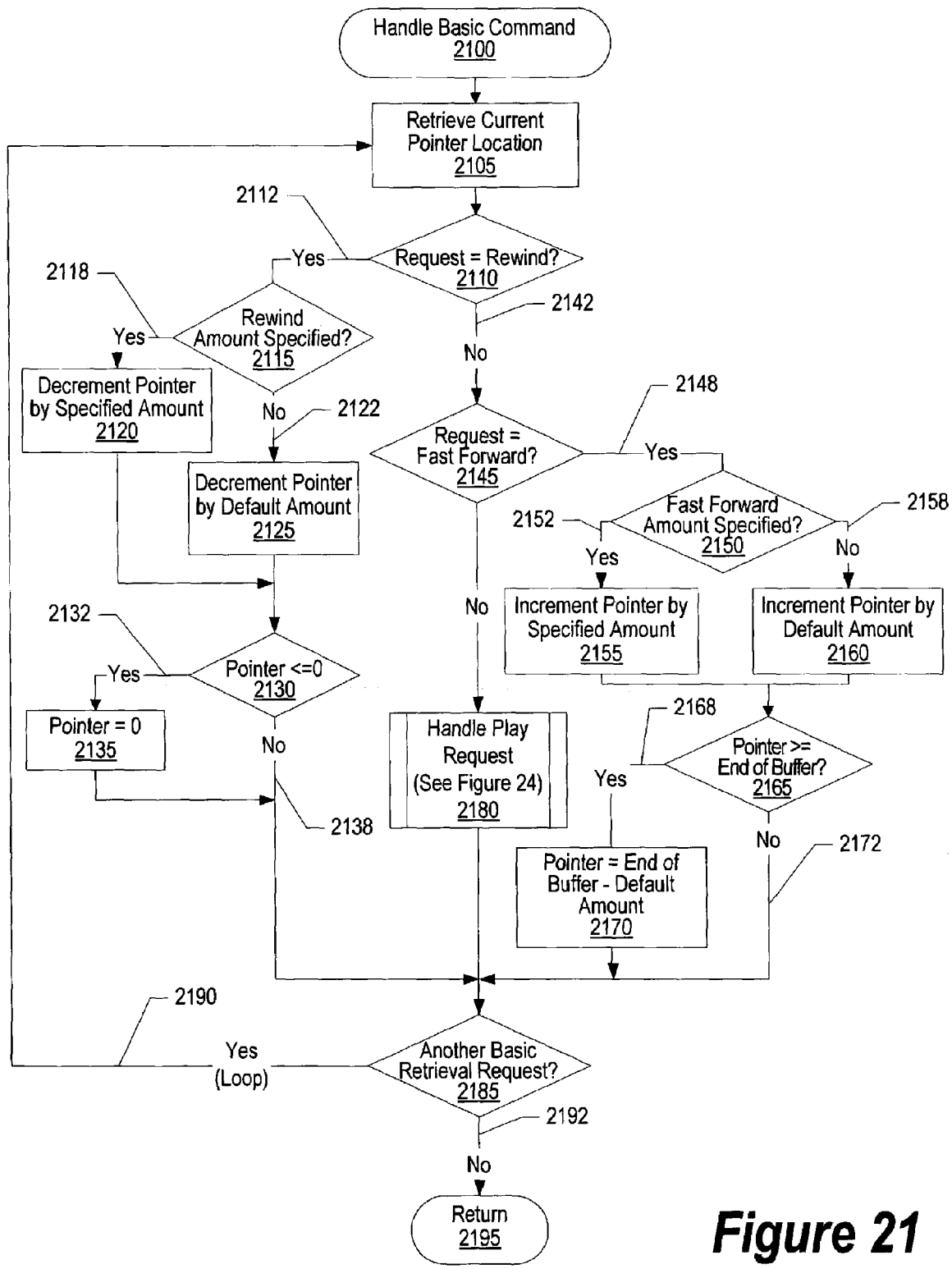
FIG. 21 is a flowchart showing steps taken to handle a basic personal telephony recorder request received from a user.

FIG. 21 is a flowchart showing steps taken to handle a basic personal telephony recorder request received from a user. Processing commences at 2100 whereupon the current buffer pointer within the call buffer is retrieved (step 2105). The current buffer pointer indicates the location to which voice data is currently being stored in the call buffer. A copy of the pointer is maintained by the routine so that the user can rewind and replay portions of the call buffer without interfering in operations of the personal telephony recorder storing incoming voice data in the call buffer.

A determination is made as to whether the user has requested to "rewind" from the current pointer location (decision 2110). If the request is a rewind request, decision 2110 branches to "yes" branch 2112 whereupon a determination is made as to whether a specific rewind amount has been specified by the user (decision 2115). If a specific rewind amount has been specified, decision 2115 branches to "yes" branch 2118 whereupon the address pointed to by the pointer is decremented by the specific amount (step 2120). The user may indicate a rewind amount in a time unit, such as seconds. The time unit is converted to an address and applied to the pointer. On the other hand, if a rewind amount is not specified, decision 2115 branches to "no" branch 2122 whereupon the pointer is decremented by a default amount (step 2125). Another determination is made as to whether the decremented pointer points to a location before the beginning of the call buffer (decision 2130). If the decremented pointer points above the top of the call buffer, decision 2130 branches to "yes" branch 2132 whereupon the pointer is set to the top, or beginning, of the call buffer (step 2135). If the pointer falls within the call buffer range, decision 2130 branches to "no" branch 2138 bypassing step 2135.

Returning to decision 2110, if the request is not to rewind, decision 2110 branches to "no" branch 2142 whereupon a determination is made as to whether the user wishes to advance, or fast forward, the pointer (decision 2145). If the request is a fast forward request, decision 2145 branches to "yes" branch 2148 whereupon a determination is made as to whether a specific fast forward amount has been specified by the user (decision 2150). If a specific fast forward amount has been specified, decision 2150 branches to "yes" branch 2152 whereupon the address pointed to by the pointer is incremented by the specific amount (step 2155). The user may indicate a fast forward amount in a time unit, such as seconds. The time unit is converted to an address and applied to the pointer. On the other hand, if a fast forward amount is not specified, decision 2150 branches to "no" branch 2158 whereupon the pointer is incremented by a default amount (step 2160). Another determination is made as to whether the incremented pointer points to a location after the end of the call buffer (decision 2165). If the incremented pointer points after the end of the call buffer, decision 2165 branches to "yes" branch 2168 whereupon the pointer is set to a position before the end of the call buffer (step 2170). If the pointer falls within the call buffer range, decision 2165 branches to "no" branch 2172 bypassing step 2170.

Figure 24:
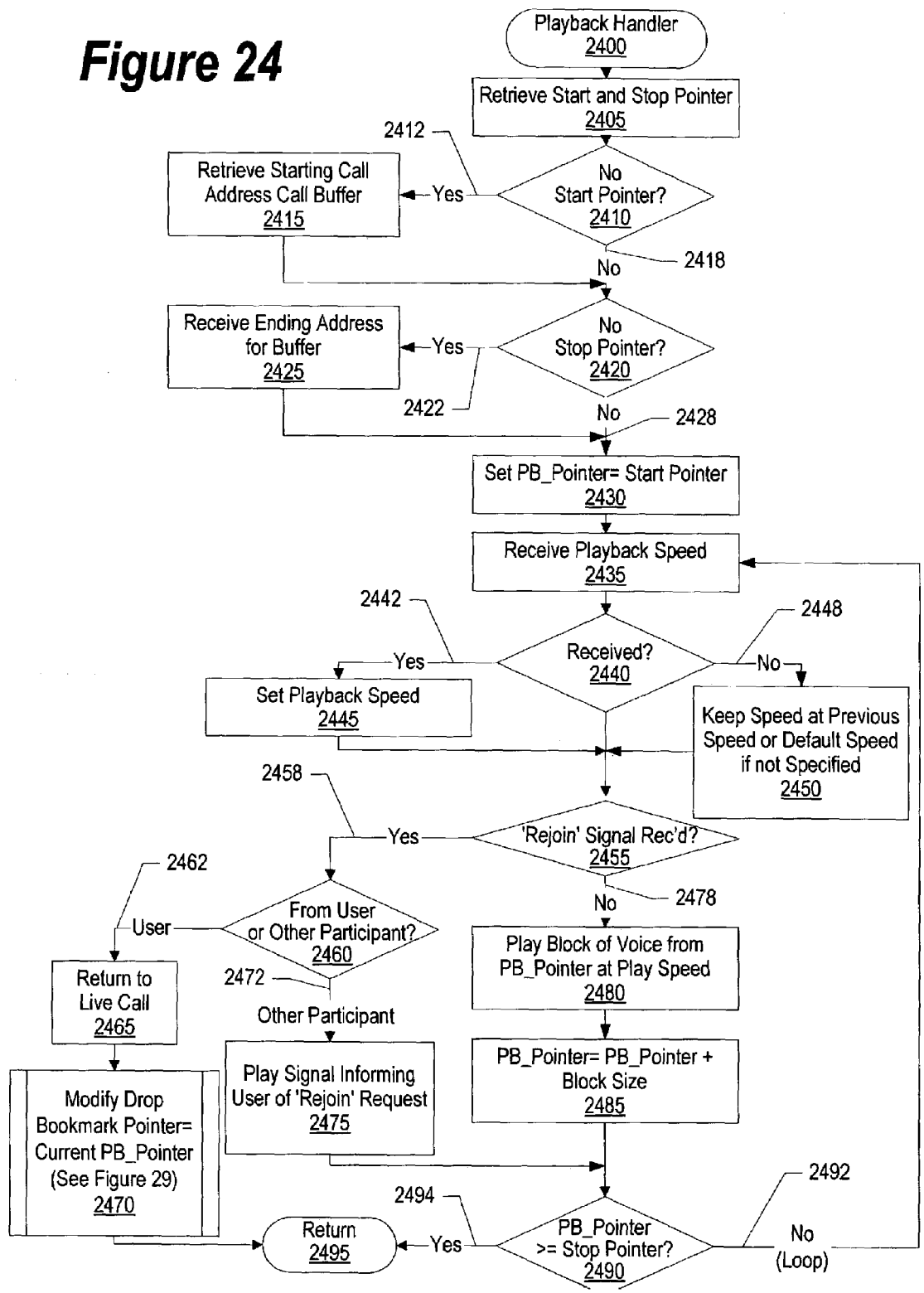
FIG. 24 is a flowchart showing steps taken to playback voice data using a personal telephony recorder.

If the request is not a rewind or a fast forward request, then the call buffer is replayed to the user starting at the current buffer location (predefined process 2180, see FIG. 24 for processing details). A determination is made as to whether the user has another basic retrieval request (decision 2185). If the user has another basic retrieval request, decision 2185 branches to "yes" branch 2190 which loops back to handle the next request. This looping continues until the user indicates that he wishes to stop performing retrieval requests and return to the telephone call At that point, decision 2185 branches to "no" branch 2192 and processing returns at 2195.

Figure 22:
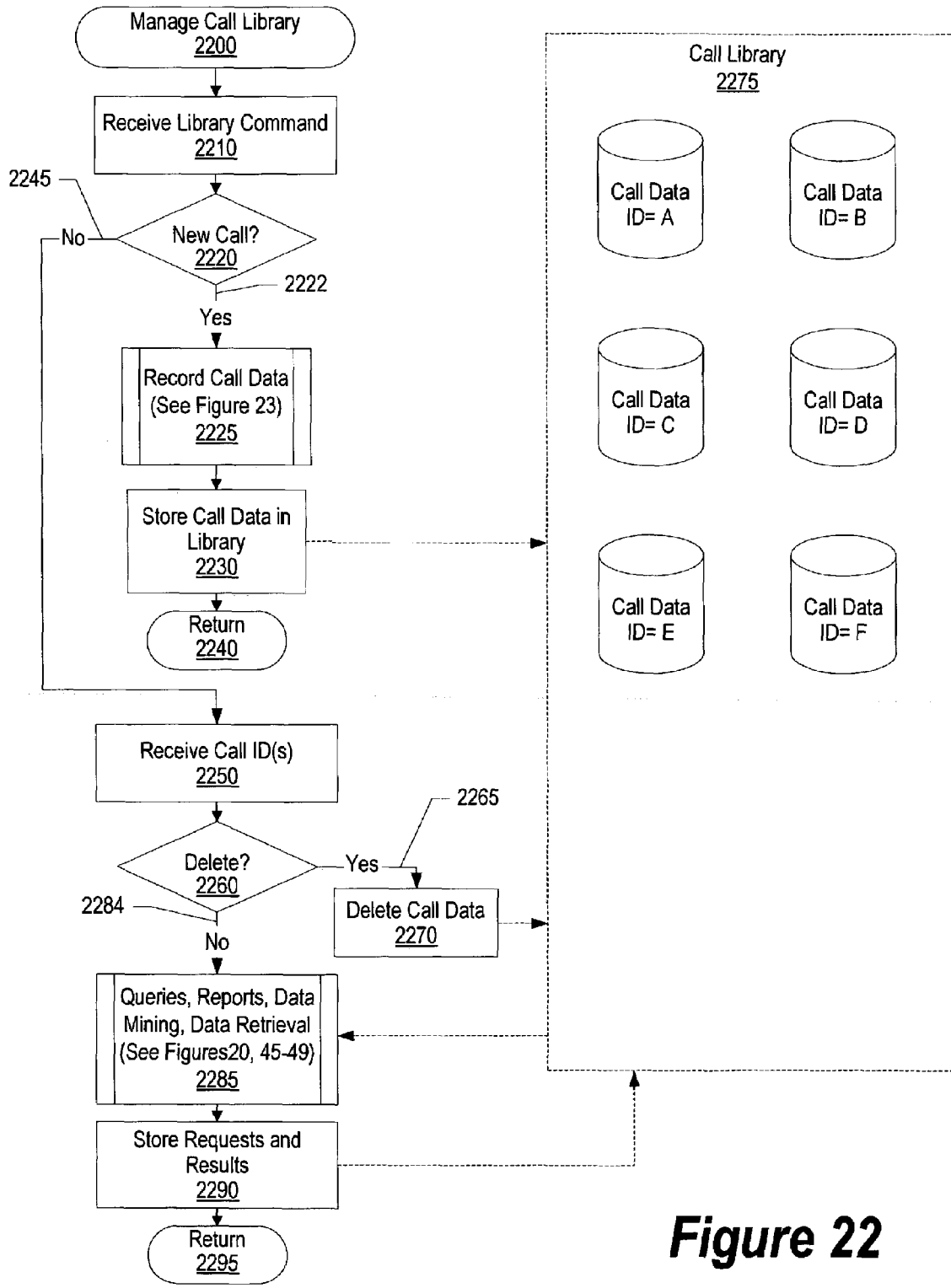
FIG. 22 is a flowchart showing steps taken to manage a call library using a personal telephony recorder.

FIG. 22 is a flowchart showing steps taken to manage a call library using a personal telephony recorder. Processing commences at 2200 whereupon a telephone library command is received (step 2210). A determination is made as to whether a new call is being recorded (decision 2220). If the personal telephony recorder is recording a new call, decision 2220 branches to "yes" branch 2222 whereupon the voice data is recorded (predefined process 2225, see FIG. 23 for processing details). The recorded call is then stored in call library 2275 (step 2230). Call library 2275 includes recorded calls that the personal telephony recorder user can replay, query, or analyze. In the example shown, call library 2275 includes six calls that were recorded (identifiers A through F).

Returning to decision 2220, if the personal telephony recorder is not recording a new call, decision 2220 branches to "no" branch 2245 whereupon call identifiers are received that correspond with calls stored in call library 2275 (step 2275). A determination is made as to whether the user wants to delete the call data (decision 2260). If the user requests the deletion of one or more calls, decision 2260 branches to "yes" branch 2265 whereupon the identified calls are deleted (step 2270) from call library 2275. On the other hand, if the user does not wish to delete the calls, decision 2260 branches to "no" branch 2284 whereupon queries, reports, data mining, or data retrieval processes are performed in response to the user's request (predefined process 2285, see FIGS. 20, and 45 through 49 for processing details). The requests and results are stored (step 2290) in call library 2275 so that the user can analyze the results and the corresponding requests. Processing thereafter returns at 2295.

Figure 23:
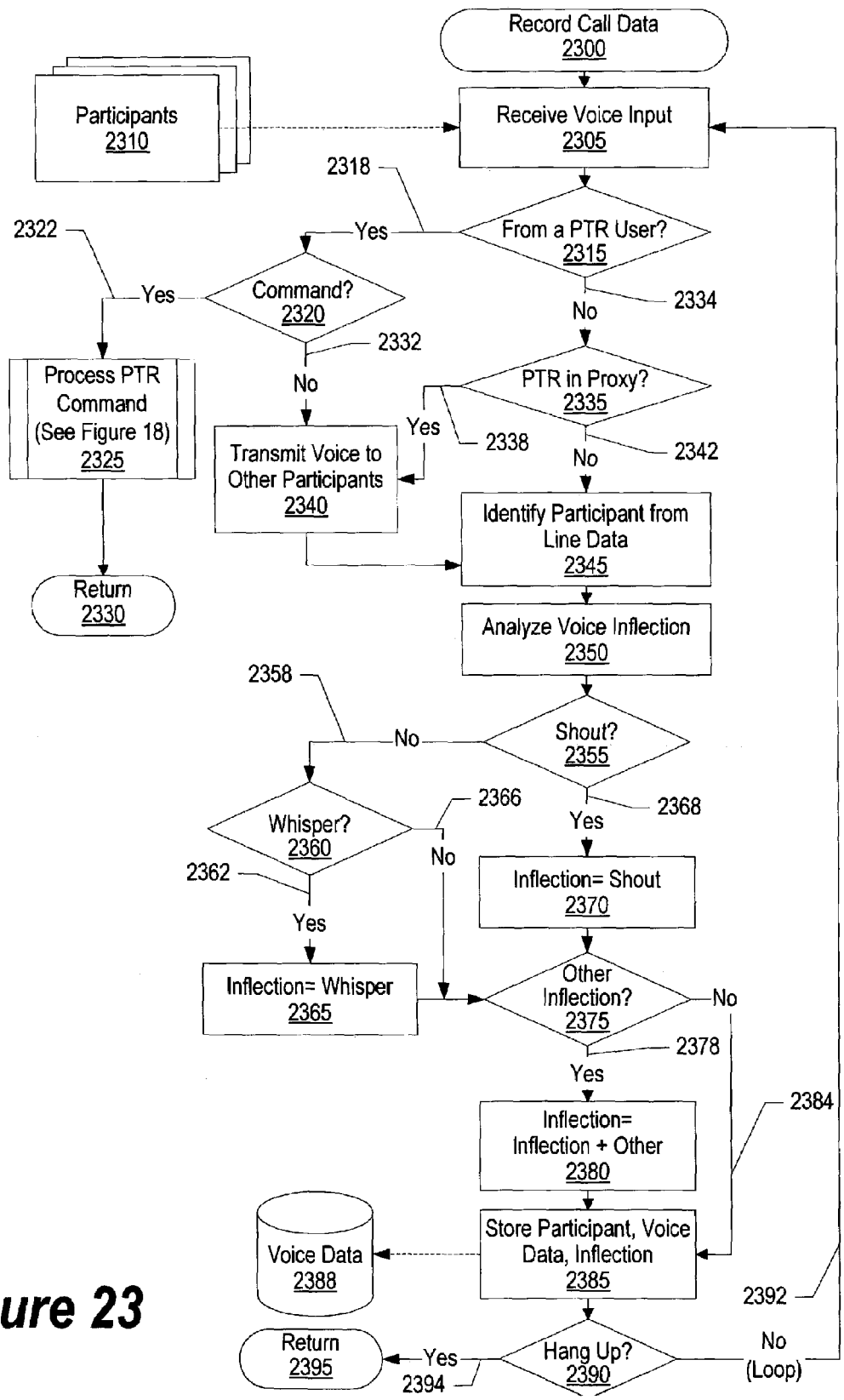
FIG. 23 is a flowchart showing steps taken to record voice and voice metadata using a personal telephony recorder.

FIG. 23 is a flowchart showing steps taken to record voice and voice metadata using a personal telephony recorder. Processing commences at 2300 whereupon voice input is received (step 2305) from two or more telephone call participants 2310. A determination is made as to whether the voice input is from a personal telephony recorder user or someone authorized to use the personal telephony recorder (decision 2315). If the request is from a personal telephony recorder user, decision 2315 branches to "yes" branch 2318 whereupon a determination is made as to whether the voice data includes a vocal command (decision 2320). If the voice data includes a vocal command, decision 2320 branches to "yes" branch 2322 whereupon the personal telephony recorder command is processed (predefined process 2325, see FIG. 18 for processing details) and processing returns at 2330. On the other hand, if the input from the personal telephony recorder user is not a command, decision 2320 branches to "no" branch 2332 whereupon the voice data is transmitted through the telephone network to the other participants (step 2340).

Returning to decision 2315, if the voice data was received from someone who is not authorized to use the personal telephony recorder, decision 2315 branches to "no" branch 2334 whereupon a determination is made as to whether the personal telephony recorder is operating in proxy mode, i.e., not connected to one of the participants' telephone systems (decision 2335). If the personal telephony recorder is connected to the network, rather than one of the participants' telephone systems, decision 2335 branches to "yes" branch 2338 whereupon the received voice input is transmitted to the other participants (step 2340), otherwise decision 2335 branches to "no" branch 2342.

The participant that provided the voice input is identified from the line from which the input was received (step 2345). In addition, voice recognition technology can be used in this step to identify the participant based on the characteristics of the voice input. Voice inflection included in the voice input is analyzed to determine if the participant was whispering, shouting, or had some other inflection in his or her voice (step 2350). A determination is made as to whether the participant was shouting (decision 2355). If the participant was shouting, decision 2355 branches to "yes" branch 2368 whereupon the inflection is set to "shout" (step 2370). If the participant was not shouting, decision 2355 branches to "no" branch 2358 whereupon another determination is made as to whether the participant was whispering (decision 2360). If the participant was whispering, decision 2360 branches to "yes" branch 2362 whereupon the inflection is set to "whisper" (step 2365), otherwise decision 2360 branches to "no" branch 2366 bypassing step 2365.

A determination is made as to whether other inflection(s) are detected in the voice input (decision 2375). If other inflections are detected, decision 2375 branches to "yes" branch 2378 whereupon the identified inflections are added to the inflection setting (step 2380), otherwise decision 2375 branches to "no" branch 2384 bypassing step 2380.

An identifier corresponding to the participant, the received voice data, and identified inflections are stored (step 2385) in voice data store 2388. A determination is made as to whether the call has ended (decision 2390). If the call has not ended, decision 2390 branches to "no" branch 2392 which loops back to receive and process more voice input. This looping continues until the call has ended, at which point decision 2390 branches to "yes" branch 2394 and processing returns at 2395.

FIG. 24 is a flowchart showing steps taken to playback voice data using a personal telephony recorder. Processing commences at 2400 whereupon a start and stop pointer are retrieved (step 2405) indicating the location within the call buffer to begin playback as well as the position to stop playback.

A determination is made as to whether a start pointer was provided (decision 2410). If no start pointer was provided, decision 2410 branches to "yes" branch 2412 whereupon the start pointer is initialized to the beginning of the call buffer (step 2415), otherwise decision 2410 branches to "no" branch 2418 bypassing step 2415.

Another determination is made as to whether a stop pointer was provided (decision 2420). If no stop pointer was provided, decision 2420 branches to "yes" branch 2422 whereupon the stop pointer is initialized to the end of the call buffer (step 2425), otherwise decision 2420 branches to "no" branch 2428 bypassing step 2425.

The playback pointer is initialized to the start pointer (step 2430). A playback speed is received (step 2435). During some operations, such as playing back voice when reconnecting to a conference call, it may be desirable for the user to play the stored voice data at a faster than normal pace so that the user can hear the portion of the call that the user missed and catch up to the other participants. A determination is made as to whether a playback speed was specified (decision 2440). If a playback speed was specified, decision 2440 branches to "yes" branch 2442 whereupon the playback speed is set as requested. On the other hand, if no playback speed was specified, decision 2440 branches to "no" branch 2448 whereupon the playback speed is kept at the previous playback speed or at a default speed if a playback speed has never been specified (step 2450).

When a participant is playing back portions of the call buffer, other participants can signal the participant that is listening to playback so that the user can disengage the playback and rejoin the other participants. A determination is made as to whether a "rejoin" signal has been sent by one of the participants (decision 2455). If a rejoin signal has been received, decision 2455 branches to "yes" branch 2458 whereupon another determination is made as to whether the signal came from the user listening to playback or from one of the other participants (decision 2460). If the signal came from the user, decision 2460 branches to branch 2462 whereupon the user is returned to the live conference call (step 2465) and a bookmark is set marking the user's playback position so that the user can resume playback at a later time (predefined process 2470, see FIG. 29 for processing details) and processing returns at 2495. If the rejoin signal was received from another participant, decision 2460 branches to 2472 whereupon an audible signal is played to the user informing him that other participants wish for him to rejoin the call (step 2475).

Returning to decision 2455, if a rejoin signal was not received, decision 2455 branches to "no" branch 2478 whereupon a block of voice data is retrieved starting at the playback pointer and played to the user at the playback speed (step 2480). The playback is incremented by the block size (step 2485). A determination is made as to whether the playback pointer has reached the ending address (decision 2490). If the pointer has not reached the ending address, decision 2490 branches to "no" branch 2492 which loops back to play additional voice data and detect various commands issued by the user or other participants. This looping continues until the playback pointer has reached the ending address, at which time decision 2490 branches to "yes" branch 2494 and processing returns at 2495.

Figure 25:
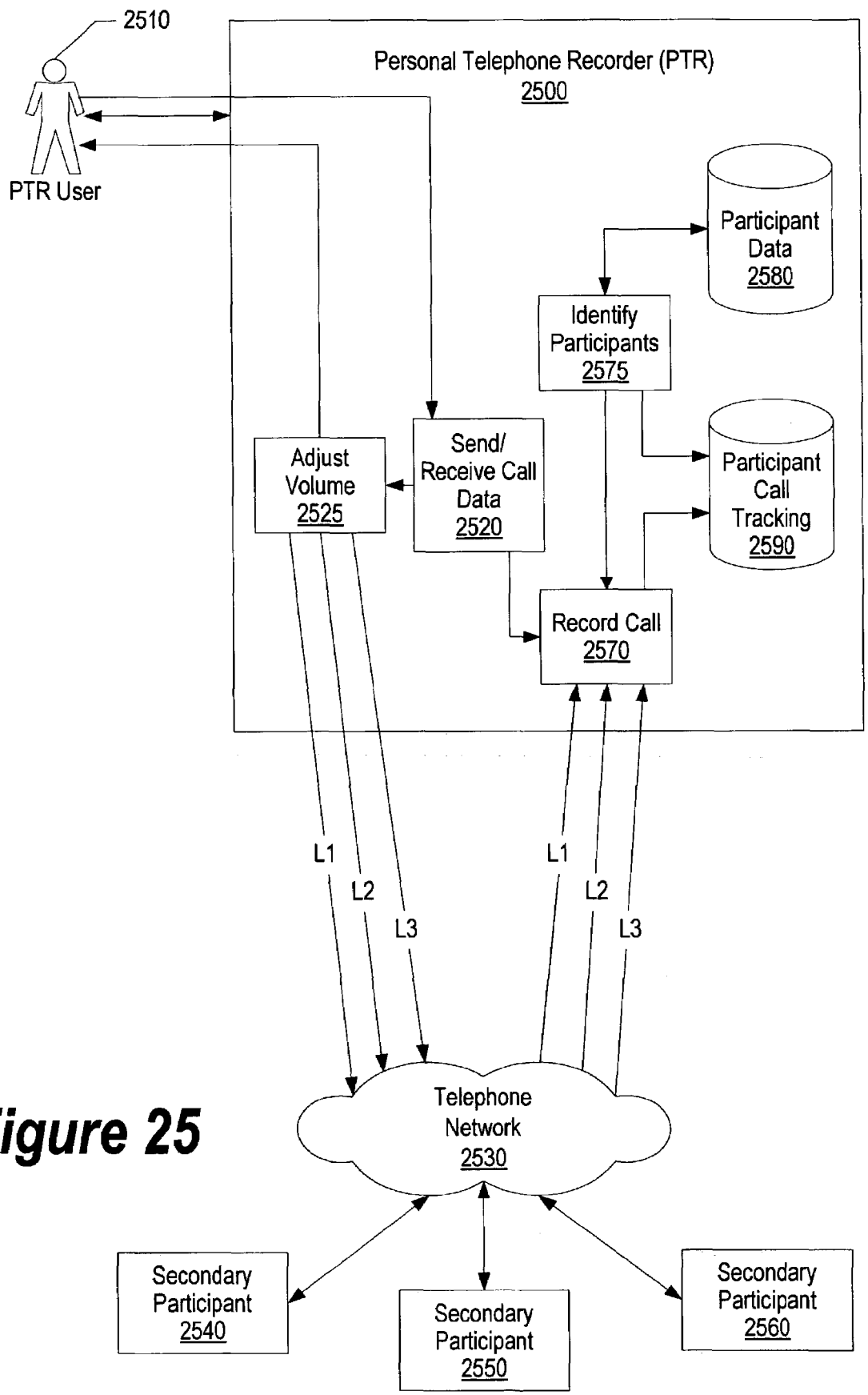
FIG. 25 is a high level system diagram identifying participants in a personal telephony recorder call and handling participant-oriented adjustments.

FIG. 25 is a high level system diagram identifying participants in a personal telephony recorder call and handling participant-oriented adjustments. Personal telephony recorder receives voice data from personal telephony recorder user 2510 over a computer with telephony capabilities or over a telephone as well as from participants 2040, 2050, and 2060 over telephone network 2530. In the example shown, three communication lines are maintained between the personal telephony recorder and the three secondary participants (L1, L2, and L3).

Personal telephony recorder components are used to record call data, identify participants, send and receive voice data, and adjust the volume of voice data received from and sent to participants. Record call component 2570 receives voice data from personal telephony recorder user 2510 and from the secondary participants and stores the voice data along with an identifier that corresponds to the participant or user from which the voice data was received. Identify participants component 2575 is used to uniquely identify the participants using voice recognition technology and line data. The participant data is stored in data store 2580, including the name, phone number, and other identifying characteristics of the participants. The identify participants component works in conjunction with the record call participant to track the voice data provided by participants and store the tracking information in data store 2590.

If the volume of voice data being received by or being sent to a participant needs to be adjusted, the adjust volume component keeps track of the requested volume. For data transmitted from the user to the participants, the adjust volume component determines if the volume should be adjusted for one or more of the participants. If the volume needs adjustment, component 2525 adjusts the volume before transmitting to the participant. Adjust volume component performs the same function to increase or decrease the volume from one or more of the participants before transmitting the voice data to user 2510.

Figure 26:
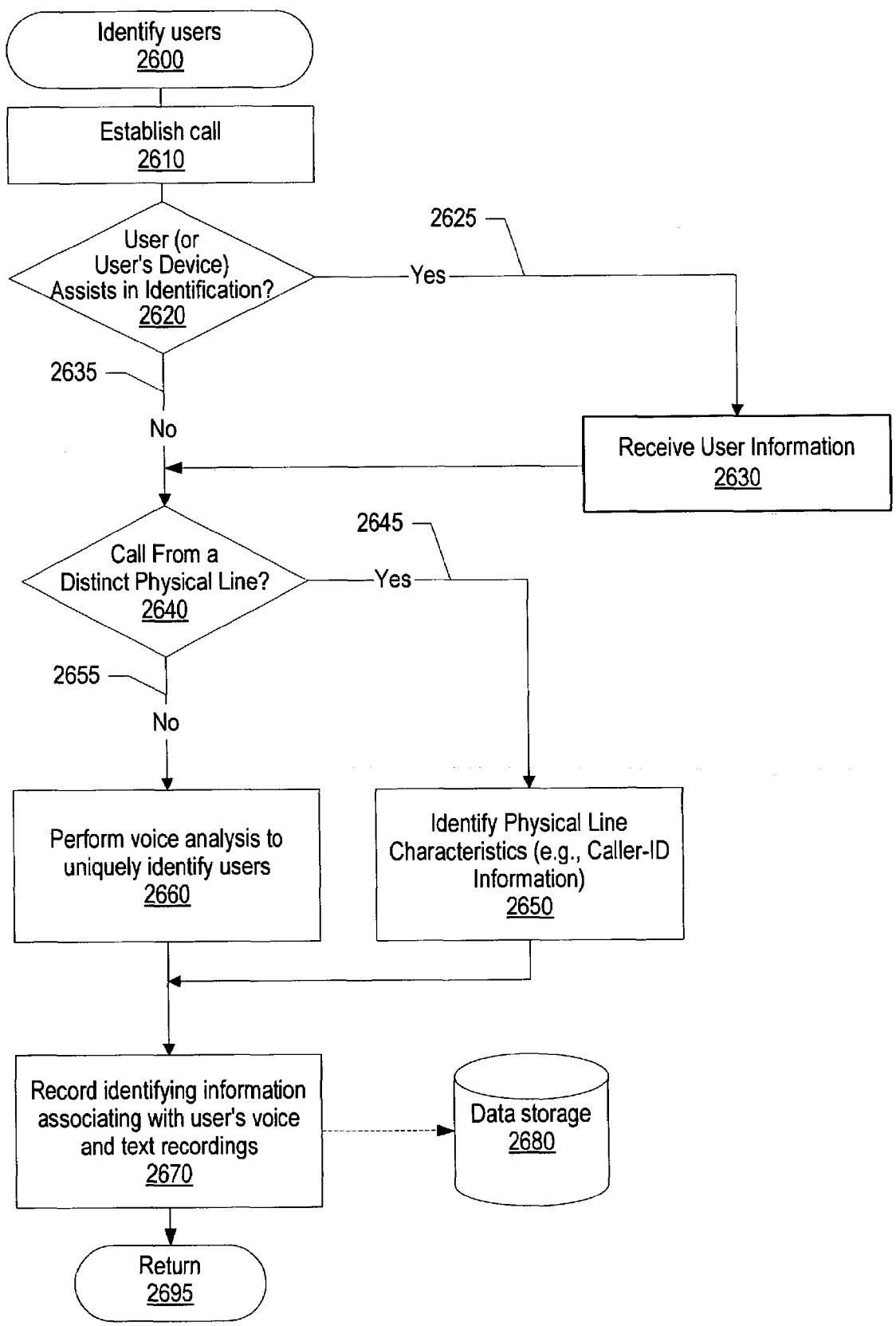
FIG. 26 is a flowchart showing steps taken to identify users participating in a personal telephony recorder conference call.

FIG. 26 is a flowchart showing steps taken to identify users participating in a personal telephony recorder conference call. Processing commences at 2600 whereupon the telephone call is established (step 2610). A determination is made as to whether the user or a device used by the user assists in identifying the user (decision 2620). If the user or the user's device identifies the user, decision 2620 branches to "yes" branch 2625 whereupon the user information is received from the user or the user's device (step 2630). For example, a user's telephone can send a digital signal identifying the user with a digital signature or can send the user's name, telephone number, and other identifying information. Otherwise, if the user or user's device is not identifying the user, decision 2620 branches to "no" branch 2635 bypassing step 2630.

A determination is made as to whether the user is calling from a distinct line (decision 2640). If the caller is calling from a distinct line, decision 2640 branches to "yes" branch 2645 whereupon data about the user's physical line are retrieved (step 2650). Otherwise, decision 2640 branches to "no" branch 2655 whereupon voice recognition technology is used to analyze the participant's voice and identify the user based on the user's voice characteristics (step 2660). The information gathered that identifies the user is stored (step 2670) in storage area 2680. Processing then returns at 2695.

Figure 27:
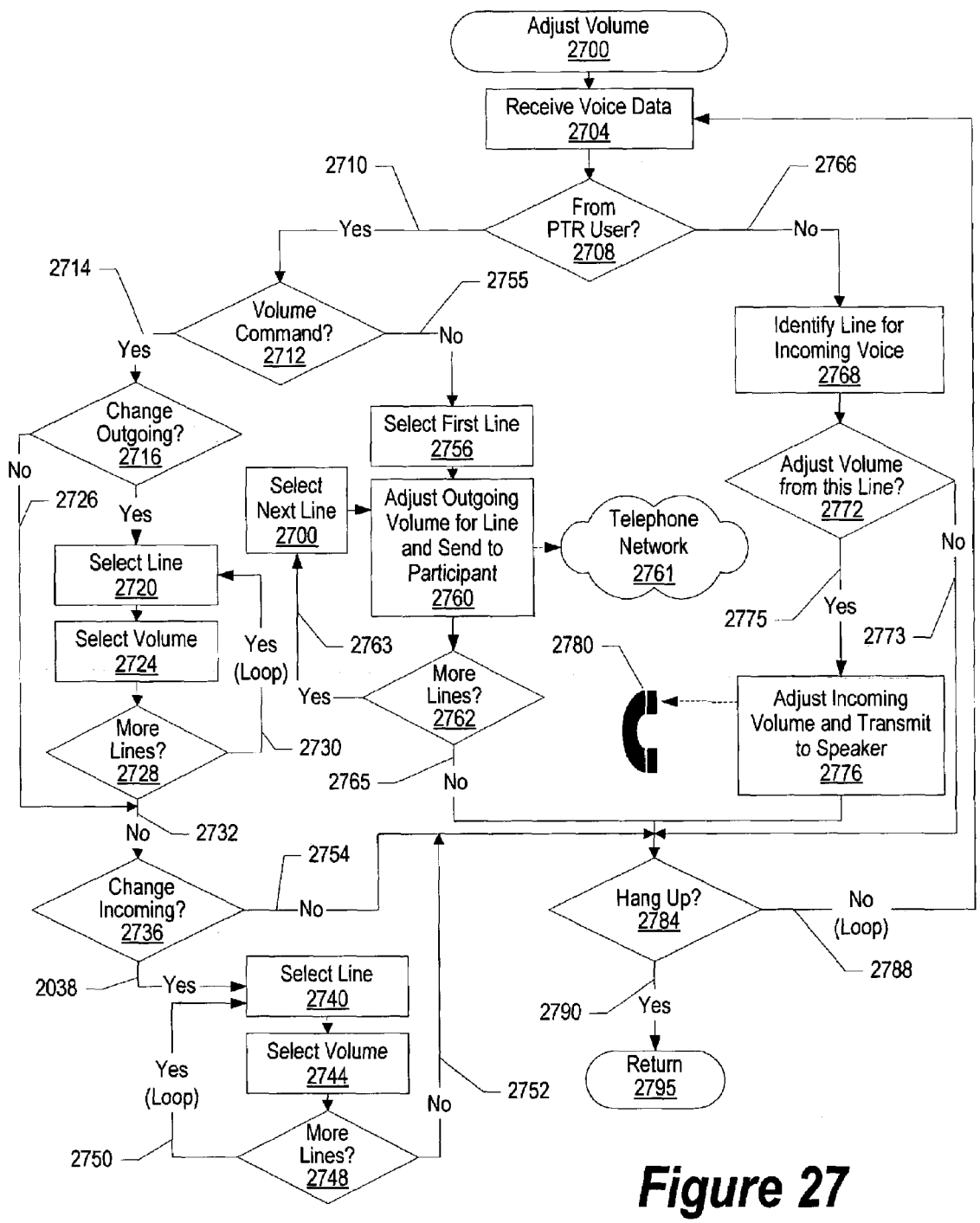
FIG. 27 is a flowchart showing steps taken to adjust the volume of voice data received from or sent to individual participants.

FIG. 27 is a flowchart showing steps taken to adjust the volume of voice data received from or sent to individual participants. Processing commences at 2700 whereupon voice data is received by the personal telephony recorder (step 2704). A determination is made as to whether the data is from a locally connected personal telephony recorder user (decision 2708). If the voice data is from a locally connected personal telephony recorder user, decision 2708 branches to "yes" branch 2710 to adjust the volume sent to the other participants.

A determination is made as to whether the personal telephony recorder user is making a volume change request (decision 2712). If the user is changing an incoming or outgoing volume, decision 2712 branches to "yes" branch 2714 whereupon another determination is made as to whether the user wants to change an outgoing volume (decision 2716). If the user wants to change an outgoing volume, decision 2716 branches to "yes" branch 2718 whereupon the outgoing line is selected (step 2720) and the volume for the line is selected (step 2724). A determination is made as to whether the user wants to change the outgoing volume of other lines (decision 2728). If the user want to adjust outgoing volumes on other lines, decision 2728 branches to "yes" branch 2730 which loops back to adjust the volume for another outgoing line. When all the outgoing lines that the user wants to adjust have been adjusted, decision 2728 branches to "no" branch 2732. Returning to decision 2716, if the user is not changing outgoing volumes, decision 2716 branches to "no" branch 2726 bypassing steps used to alter outgoing volumes.

A determination is made as to whether the user wants to change an incoming volume (decision 2736). If the user wants to change an incoming volume, decision 2736 branches to "yes" branch 2738 whereupon the incoming line is selected (step 2740) and the volume for the line is selected (step 2744). A determination is made as to whether the user wants to change the incoming volume of other lines (decision 2748). If the user want to adjust incoming volumes on other lines, decision 2748 branches to "yes" branch 2750 which loops back to adjust the volume for another incoming line. When all the incoming lines that the user wants to adjust have been adjusted, decision 2748 branches to "no" branch 2752. Returning to decision 2736, if the user is not changing incoming volumes, decision 2736 branches to "no" branch 2754 bypassing steps used to alter incoming volumes.

Returning to decision 2712, if the voice data is from a personal telephony recorder user but is not a volume command, decision 2712 branches to "no" branch 2755 whereupon the first outgoing line is selected (step 2756) and the volume of the voice input is adjusted according to the volume selected for the selected outgoing line and set to the participant connected to the first line (step 2760) through telephone network 2761. A determination is made as to whether there are more outgoing lines to which to send the voice data (decision 2762). If there are more lines, decision 2762 branches to "yes" branch 2763 which loops back to select the next line (step 2764) and adjust the volume for this line and send to the participant over the telephone network. This looping continues until there are no more outgoing lines to process, at which time decision 2762 branches to "no" branch 2765.

Returning to decision 2708, if the voice data was received by one of the other participants (not a locally connected personal telephony recorder user), decision 2708 branches to "no" branch 2766 whereupon the line from which the voice data was received is identified (step 2768). A determination is made as to whether to adjust the volume of voice data received from the identified incoming line (decision 2772). If the volume is not adjusted, decision 2772 branches to "no" branch 2773 bypassing the steps used to adjust the volume. Otherwise, decision 2772 branches to "yes" branch 2775 whereupon the incoming volume is adjusted and transmitted to the personal telephony recorder user (step 2776) through the speaker located on telephone 2780.

A determination is made as to whether the call has ended (decision 2784). If the call has not ended, decision 2784 branches to "no" branch 2788 which loops back to receive and process the next voice data. This looping continues until the call ends, at which point decision 2784 branches to "yes" branch 2790 and processing returns at 2795.

Figure 28:
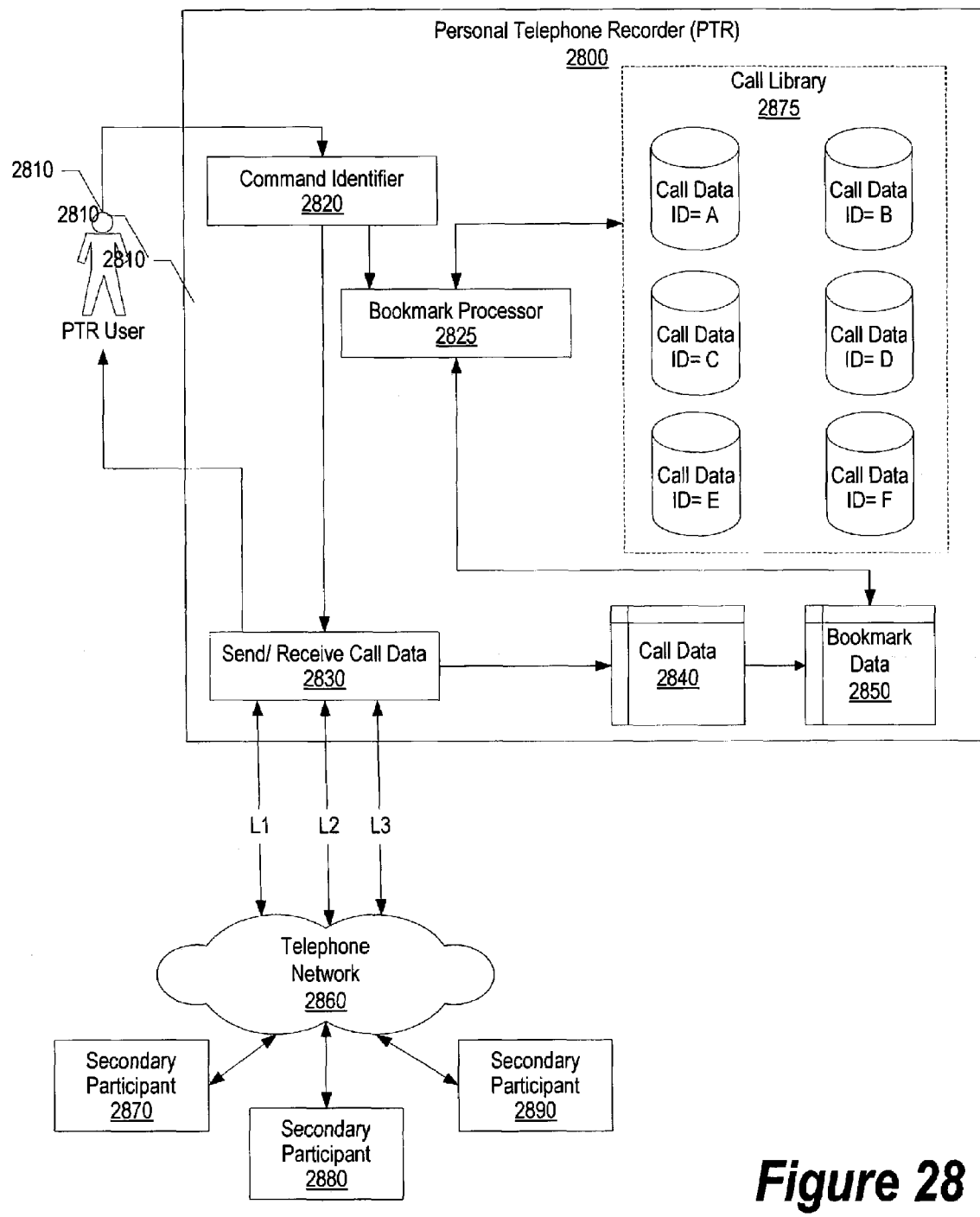
FIG. 28 is a high level system diagram of setting and maintaining bookmarks corresponding to voice data recorded using a personal telephony recorder.

FIG. 28 is a high level system diagram of setting and maintaining bookmarks corresponding to voice data recorded using a personal telephony recorder. Personal telephony recorder 2800 connects personal telephony recorder user 2810 and call participants (2870, 2880, and 2890) through telephone network 2860. Call data is transmitted between the parties using component 2830. A copy of the call data is maintained in call data memory area 2840. When a call is completed, it can be stored for an indefinite period in call library 2875.

Bookmarks are used to mark locations within call data so that the identified call data can be retrieved expeditiously. The personal telephony recorder user issues commands to add, delete, and modify bookmarks pertaining to either a live call between the user and the participants, or pertaining to a call stored in the call library. Command identifier 2820 receives commands from the personal telephony recorder user, including bookmark commands. Bookmark commands are sent to bookmark processor 2825 to add, delete, and modify bookmarks. Bookmark data for calls is maintained in bookmark data area 2850. Bookmarks are associated with a particular call, such as Call Data ID=A, so that the bookmarks are available after the call for querying, running reports, data mining, forwarding portions of the call (in voice or text format), and the like.

Figure 29:
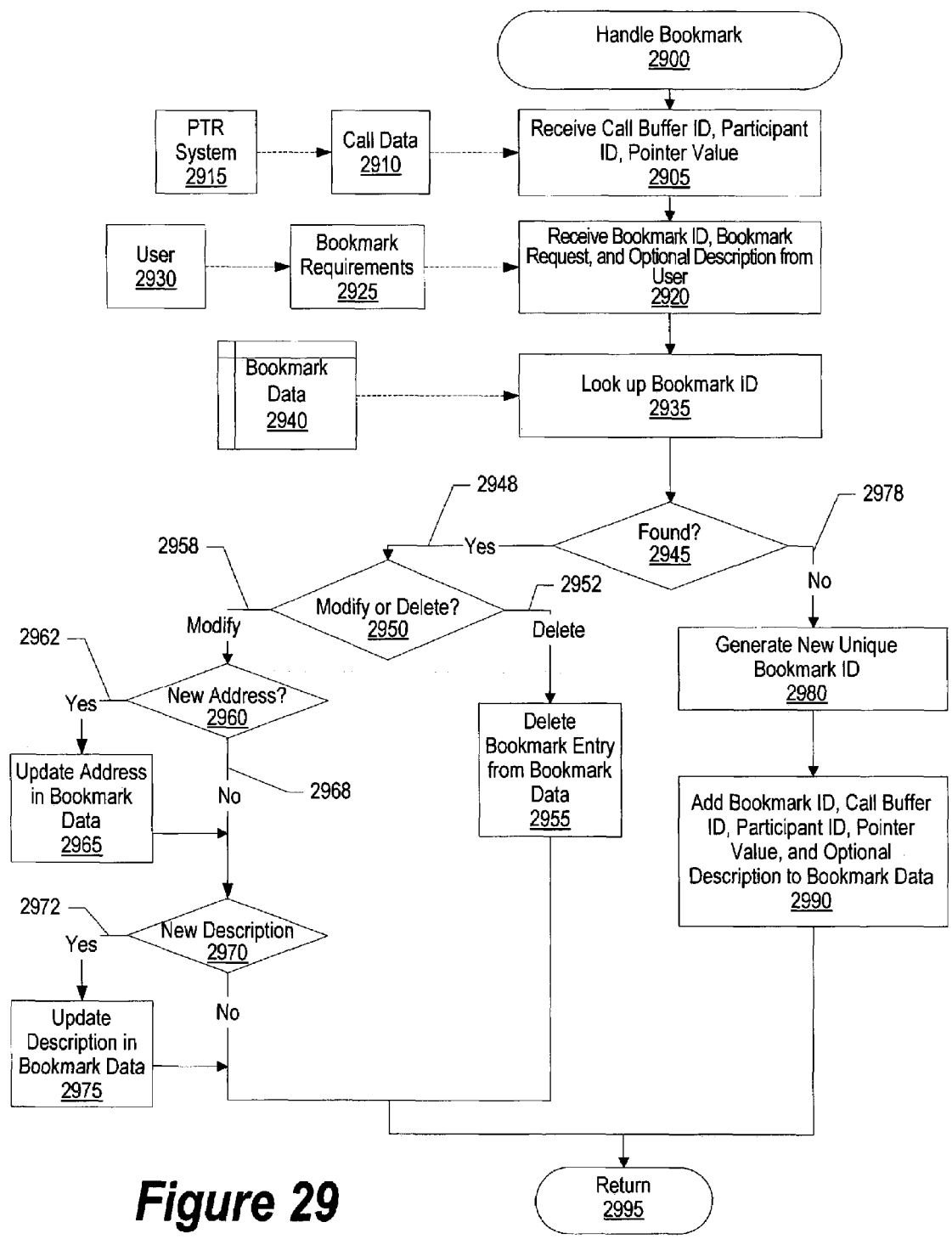
FIG. 29 is a flowchart showing steps taken in setting and maintaining bookmarks corresponding to recorded voice data.

FIG. 29 is a flowchart showing steps taken in setting and maintaining bookmarks corresponding to recorded voice data. Processing commences at 2900 whereupon call data 2910 is retrieved (step 2905) from personal telephony recorder system 2915. The call data includes a pointer or identifier corresponding to the call buffer, an identifier corresponding to the personal telephony recorder user making the request, and a pointer value corresponding to a location within the call buffer.

Bookmark request data 2925 is received (step 2920) from the personal telephony recorder user making the request 2930. The bookmark request data includes a bookmark identifier if the user is modifying an existing bookmark, the type of bookmark request that the user is making, and an optional description corresponding to the bookmark. The data corresponding to the bookmark is retrieved (step 2935) from bookmark data memory area 2940.

A determination is made as to whether the bookmark data was located within the bookmark data memory area (decision 2945). If the bookmark data was located and retrieved, decision 2945 branches to "yes" branch 2948 whereupon another determination is made as to whether the request is to modify or delete the bookmark (decision 2950).

If the user is modifying a bookmark, decision 2950 branches to branch 2958 whereupon a determination is made as to whether the user is updating the location of the bookmark within the call data (decision 2960). If the user is modifying the bookmark's location, decision 2960 branches to "yes" branch 2962 and the bookmark's pointer value is updated with the new address (step 2965). Otherwise, decision 2960 branches to "no" branch 2968 bypassing step 2965. Another determination is made as to whether the user is updating the description that corresponds to the bookmark (decision 2970). If the description is being changed, decision 2970 branches to "yes" branch 2972 whereupon the description of the bookmark is updated (step 2975). Returning to decision 2950, if the user is deleting a bookmark, decision 2950 branches to branch 2952 whereupon the bookmark data is deleted from the bookmark data memory area (step 2955).

Returning to decision 2945, if the bookmark identifier was not found in the bookmark data (or a bookmark identifier was not provided), then decision 2945 branches to "no" branch 2978 whereupon a new unique bookmark identifier is generated for the new bookmark (step 2980). The generated bookmark identifier, the call buffer identifier, the participant identifier, a pointer (location) of the bookmark, and a bookmark description are stored in the bookmark data memory area (step 2990).

After the bookmark has been handled (added, deleted, or modified), processing returns to the calling routine at 2995.

Figure 30:
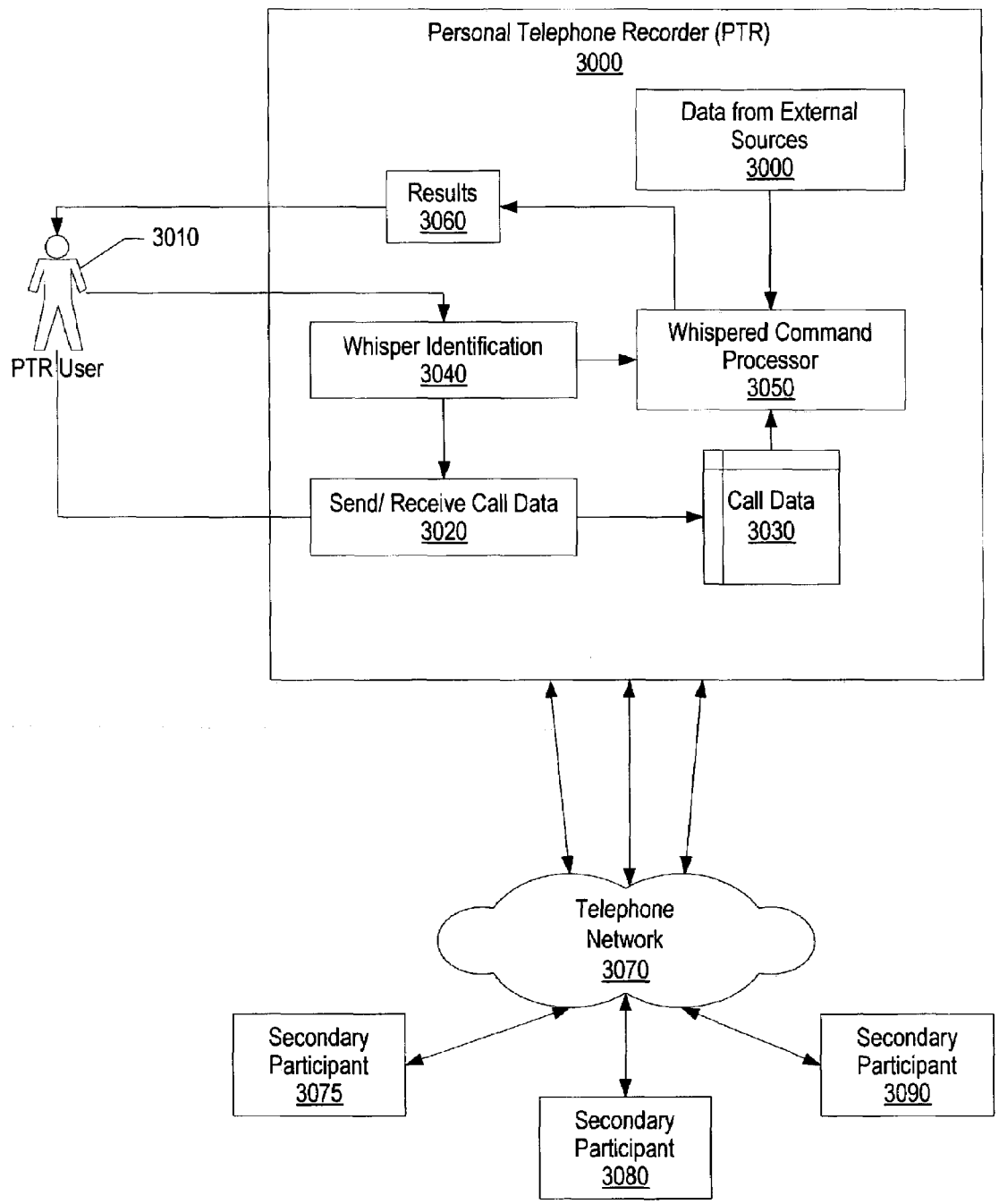
FIG. 30 is a high level diagram of a personal telephony recorder processing voice commands received from a user.

FIG. 30 is a high level diagram of a personal telephony recorder processing voice commands received from a user. Personal telephony recorder 3000 includes a number of components to manage calls between personal telephony recorder user 3010 and one or more participants through telephone network 3070. In the example shown in FIG. 30, the personal telephony recorder user is having a conference call with three participants (3075, 3080, and 3090). Send/receive component 3020 sends and receives data from the personal telephony recorder user and the participants. In addition, component 3020 saves the voice data in call data memory area 3030.

The personal telephony recorder user can issue vocal commands that are identified by the inflection of the user's voice. In the example shown in FIG. 30, commands are whispered by the user. Whisper identification component 3040 identifies commands based upon whether the user is whispering. If the user is whispering, the whisper identification component passes the voice data to whisper command processor 3050 for processing. If the user is not whispering, the whisper identification component transmits the voice data to component 3020 for transmission to the other participants.

Whisper command processor 3050 identifies the particular command requested by the user. Commands may involve searching call data memory area 3030 for recorded voice data and transmitting results 3060 back to the user. Commands may also involve searching data from external sources, such as previously recorded calls, the user's computer system, a public computer system such as the Internet, or a private computer system such as an intranet or LAN. These results are also transmitted back to personal telephony recorder user 3010. If the user's device is capable of displaying text, such as a computer system with telephony capabilities, the results can be displayed in textual form. Otherwise, the results are converted to synthesized speech and played to the user through the telephone speaker.

Figure 31:
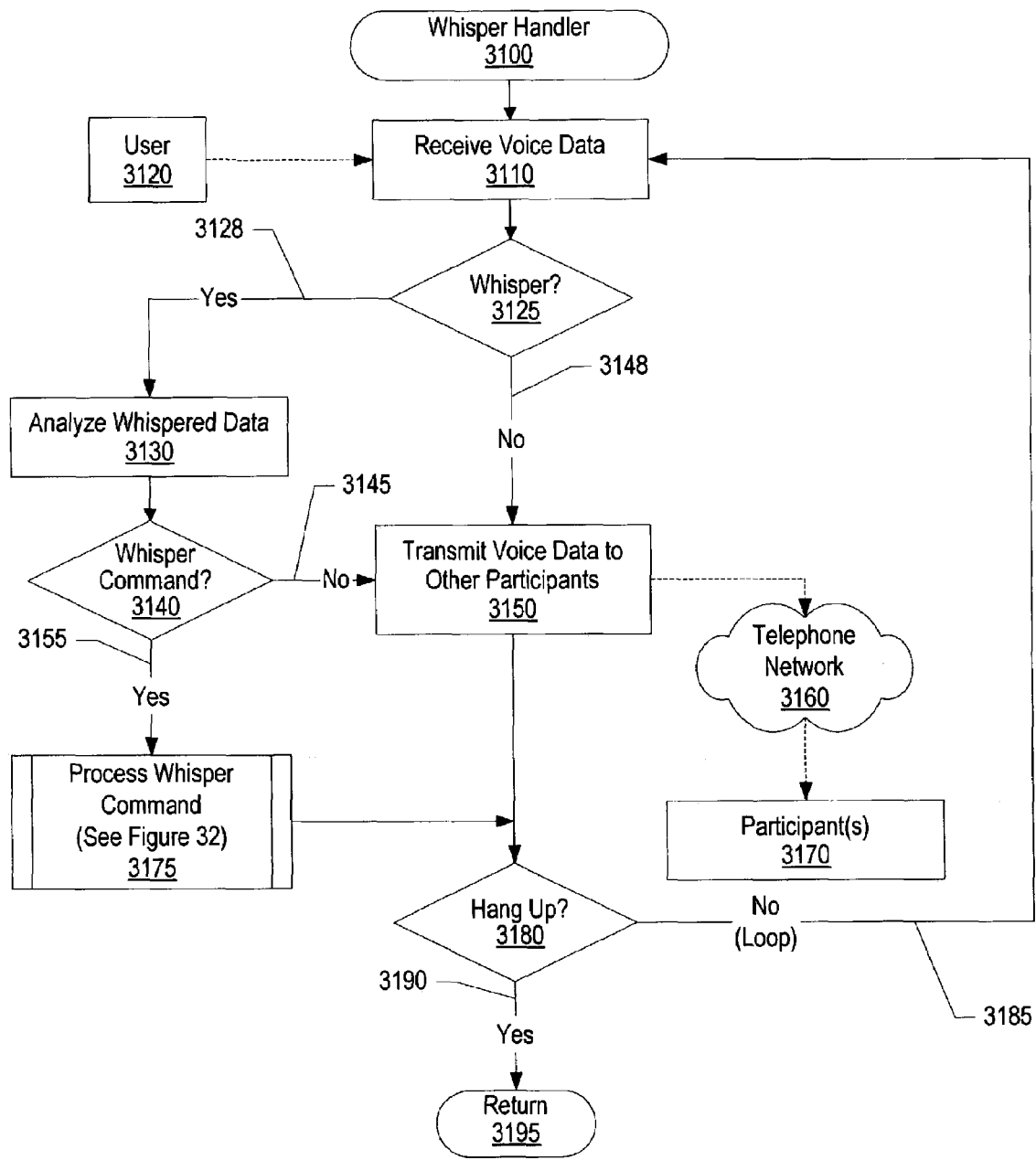
FIG. 31 is a flowchart showing steps taken by a personal telephony recorder receiving and filtering voice commands received from a user.

FIG. 31 is a flowchart showing steps taken by a personal telephony recorder receiving and filtering voice commands received from a user. Processing commences at 3100 whereupon voice data is received (step 3110) from personal telephony recorder user 3120.

A determination is made as to whether the received voice data was spoken in a whisper (decision 3125). If the received voice data was spoken in a whisper, decision 3125 branches to "yes" branch 3128 whereupon the whispered voice data is analyzed to identify any commands that may be included in the whispered data (step 3130). A determination is made as to whether the user issued a whisper command (decision 3140). If a whisper command was not identified, decision 3140 branches to "no" branch 3145 whereupon the whispered voice data is transmitted (step 3150) through telephone network 3160 to the other participants 3170. On the other hand, if a whispered command was identified, decision 3140 branches to "yes" branch 3155 whereupon the whispered command is processed (predefined process 3175, see FIG. 32 for processing details).

Returning to decision 3125, if the received voice was not spoken in a whisper, decision 3125 branches to "no" branch 3148 whereupon the voice is transmitted (step 3150) through telephone network 3160 to the other participants 3170.

A determination is made as to whether the call has ended (decision 3180). If the call has not ended, decision 3180 branches to "no" branch 3185 which loops back to receive more voice data and process any whispered commands. This looping continues until the call ends, at which point decision 3180 branches to "yes" branch 3190 and processing returns at 3195.

While a "whisper" is used to describe one method of detecting voice commands, other types of voice detection can be used in place of a user whispering commands. In an alternative embodiment, the user says a "magic word," such as "abracadabra." When the magic word is received, the personal telephony recorder system detects the magic word and identifies it as the beginning of a voice command. The magic word can be a word that is seldom spoken during normal conversations so that a regularly spoken word is not mistaken for a magic word. In addition, the system can be programmed to allow the user to configure the personal telephony recorder and provide user-defined magic words. Magic words can also be used to indicate the end of the voice command so that the personal telephony recorder recognizes the end of the command and the resuming of regular voice conversation. A command such as "end abracadabra" or "shazam" can be used as magic words to indicate the end of a voice command that commenced with the word "abracadabra." Moreover, the whispering of commands can be identified by a tone or tone sequence, such as that received by the user pressing a button on the telephone. For example, the user could press the star key ("*") to indicate the beginning of a voice command and the pound sign key ("#") to indicate the ending of the voice command.

Figure 32:
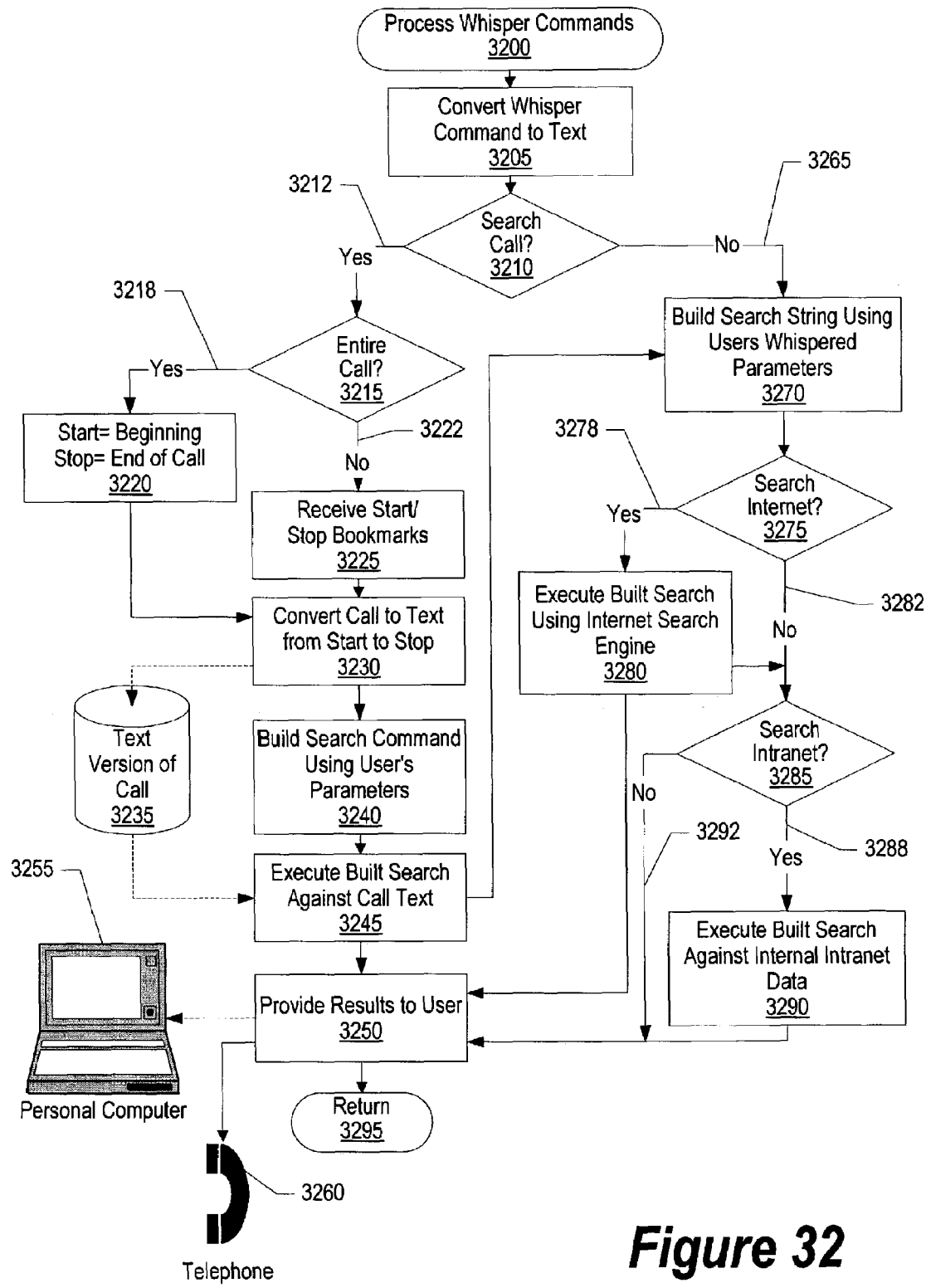
FIG. 32 is a flowchart showing steps taken by a personal telephony recorder processing voice commands received from a user.

FIG. 32 is a flowchart showing steps taken by a personal telephony recorder processing voice commands received from a user. Processing commences at 3200 whereupon the identified whispered command is converted to text (step 3205). A determination is made as to whether the user wants to search the call data for a particular word or phrase (decision 3210). If the user want to search the call data, decision 3210 branches to "yes" branch 3212 whereupon another determination is made as to whether the user wants to search the entire call or a portion of the call (decision 3215). If the user wants to search the entire call, decision 3215 branches to "yes" branch 3218 whereupon the starting location is set to the beginning of the call buffer and the ending location is set to the end of the call buffer (step 3220). Otherwise, if a portion of the call is being searched bookmarks corresponding to the portion of the call are retrieved marking the search boundaries (step 3225).

The call data in the call buffer is converted to text from the starting location to the ending location (step 3230) and stored in text buffer 3235. A search command is built using the user's parameters included with the search request (step 3240). Complex searches can be built based on the user's request to locate "who," "when," "where," "what," and "how" data within the call buffer. For example, if the user issued the whisper command "who said 'unbelievable'?", then a search would be built to scan backwards through the call data for the word "unbelievable" and, upon finding the word, return the participant's name that said the word. Moreover, if a user issued the command "when is the meeting in Atlanta," the system would scan backwards through the call data and locate the words surrounding "Atlanta" and "meeting" and retrieve probable statements that were made regarding the timing of the meeting. The built command is executed against the text version of the call data (step 3245) and results are retained in a memory buffer.

Returning to decision 3210, if the call data is not being searched, decision 3210 branches to "no" branch 3265 whereupon a network search string is built, again using the search parameters provided by the user's whispered command (step 3270). A determination is made as to whether to search a public network, such as the Internet (decision 3275). If a public network is being searched, decision 3275 branches to "yes" branch 3278 whereupon the search is executed on the public network using a search engine, such as the Google™ search engine (step 3280) and the results are retained in a buffer area. Otherwise, if a public network is not being searched, decision 3275 branches to "no" branch 3282 bypassing step 3280. Another determination is made as to whether a non-public computer or network, such as the user's computer system, local area network, or an intranet, are being searched (decision 3285). If a non-public computer or network is being searched, decision 3285 branches to "yes" branch 3288 whereupon the search is executed on the non-public computer(s) and/or network(s) (step 3290) and the results are retained in a buffer area. Otherwise, if non-public locations are not being searched, decision 3285 branches to "no" branch 3292 bypassing step 3290.

Results are retrieved from the buffer areas and provided to the user (step 3250). The results can be returned to connected personal computer 3255 connected to the personal telephony recorder or can be converted into voice data and transmitted to the user through telephone 3260 in a manner that does not transmit the results to the other participants. Processing thereafter returns at 3295.

Figure 33:
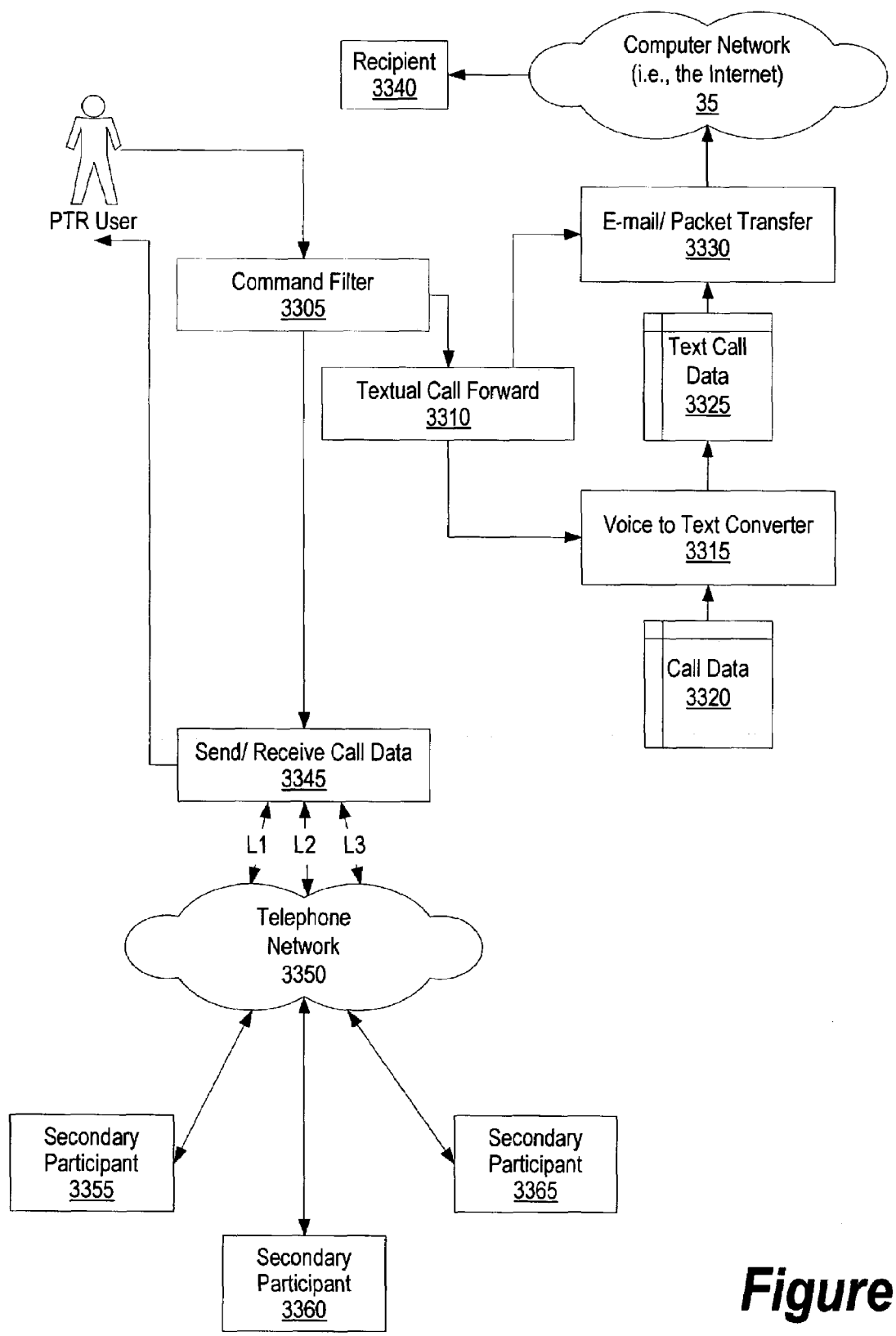
FIG. 33 is a high level diagram of a personal telephony recorder forwarding portions of a telephone call.

FIG. 33 is a high level diagram of a personal telephony recorder forwarding portions of a telephone call. Command filter 3305 is capable of receiving requests from personal telephony recorder users through command filter 3305. Command filter separates received both call data (such as the voice contribution of each user to the conference) from commands issued by the users. In this case, any commands the users issue for forwarding a portion of the call in text format is sent to textual call forward module 3310. After receiving a signal from textual call forward module 3310, voice-to-text converter 3315 requests call data 3320, converts the voice data to text, and finally transfers the text data to text call data storage 25. When a user requests transfer to an email address, the e-mail/packet transfer module 3330, after receiving a signal from textual call forward module 3310, accesses the text data from text call data storage 3325 and then transmits the appropriate portion to the recipient 3340 through the Internet, a local area network, or any other type of network.

The call data generated by the personal telephony recorder user is sent by send/receive call data 3345 through telephone network 3350 to any other secondary participants such as participants 3355, 3360, and 3365. Each of these users may be connected to the send/receive call data 3345 by separate lines L1, L2, and L3. At the same time, call data from each of the three users is transmitted to the send/receive call data 3345 and then transmitted to all the other users, including the primary personal telephony recorder user.

Figure 34:
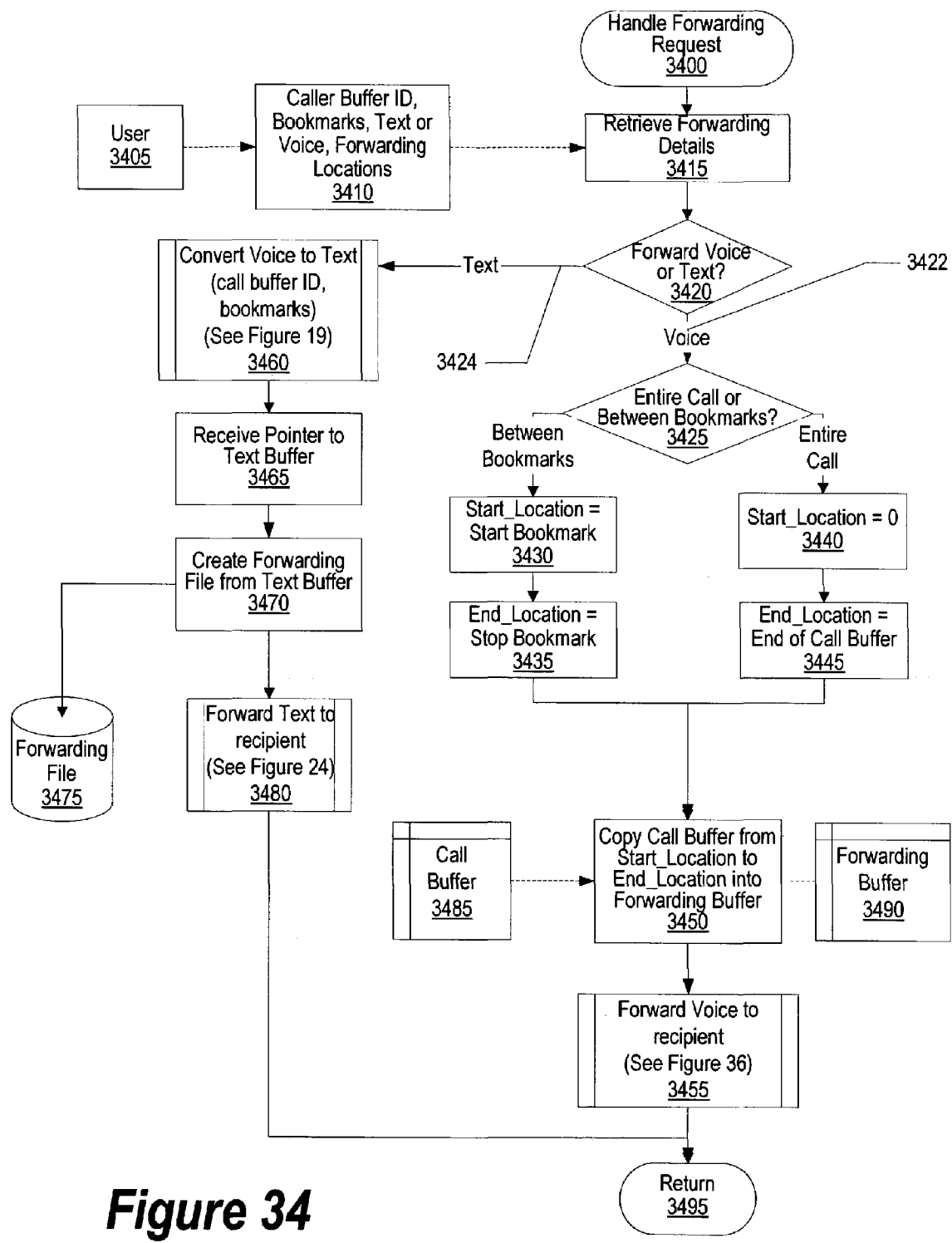
FIG. 34 is a higher level flowchart showing steps taken by a personal telephony recorder handing forwarding requests received from a user.

FIG. 34 is a higher level flowchart showing steps taken by a personal telephony recorder handing the forwarding of text to one or more location for one or more recipients.

Processing commences at 3400 whereupon forwarding details 3410 provided by user 3405 are retrieved (step 3415). The forwarding details may include caller buffer ID associating the user to the user's call contribution, bookmarks set by the users, text or voice forwarding locations, etc. A determination is made as to whether call data is to be forwarded as voice or text (decision 3420). If voice is to be forwarded, decision 3420 branches to "yes" branch 3422. A determination is then made as to whether the entire call data or only a portion of the data indicated by bookmarks is to be forwarded. If the entire call data is to be forwarded, decision 3425 branches to "yes" branch 3425 whereupon the start_location pointer is set to zero, the beginning of the recording (step 3440). The end_location pointer is set to the end of the call buffer (step 3445). On the other hand, if only the portion between bookmarks is to be forwarded, decision 3425 branches to "no" branch 3427 whereupon the start_location pointer is set to the start bookmark, which the user had previously set (step 3430) and the end_location pointer is set to the stop bookmark, which the user had also previously set (step 3435). After both step 3435 and step 3445, the appropriate portion of call buffer 3485 (between the start_location and the end_location pointers is copied to forwarding buffer 3490. A request to forward the voice data is then generated (step 3455 and see FIG. 36) and the processing subsequently ends at 3495.

If text is to be forwarded, decision 3420 branches to "text" branch 3424 whereupon a request is issued to convert the voice to text (step 3465). At step 3465, the pointer to the text buffer is received, and at step 3470, a forwarding file is created from the text buffer. The forwarding file at storage 3475. At step 3480, a request is made to forward the text to whomever is interested. Processing subsequently ends at 3495.

Figure 35:
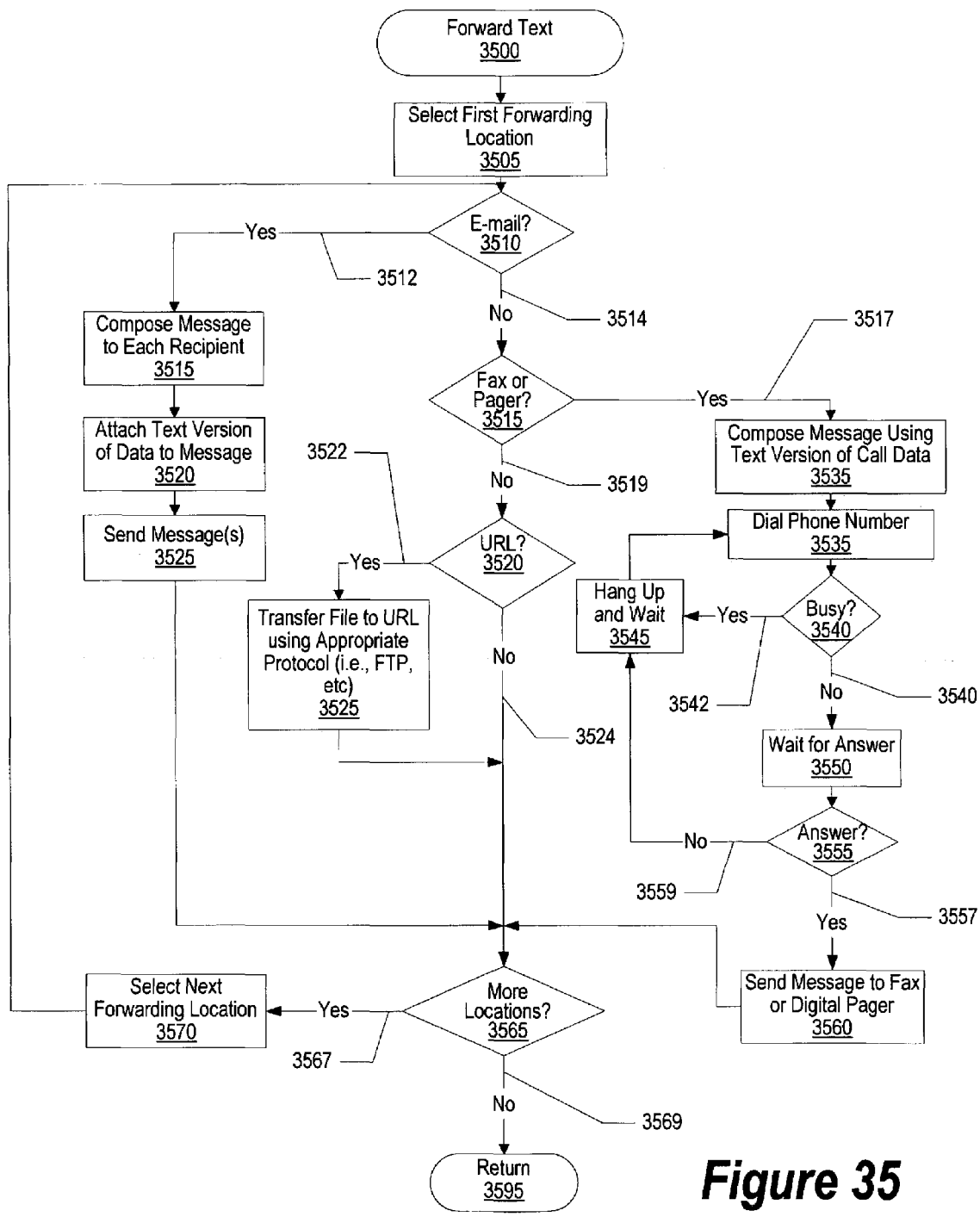
FIG. 35 is a flowchart showing steps taken by a personal telephony recorder in forwarding text data.

FIG. 35 is a flowchart showing steps taken by a personal telephony recorder in forwarding text data. Processing commences at step 3500 whereupon the first forwarding location is selected (step 3505). The forwarding location may be one or more e-mail addresses, one or more fax numbers, one or more pager numbers, etc. A determination is made as to whether the location is an e-mail address (decision 3510). If the location is an email address, decision 3510 branches to "yes" branch 3512 whereupon, at step 3515, a message is composed to the recipient. In one embodiment, a standard greeting is included in the message providing the recipient with information such as when the conference took place, who participated, the corresponding length in time, etc. At step 3520, a text version of the message is attached to the e-mail message, and at step 3525, the e-mail message is sent. A determination is then made as to whether more forwarding locations exist (decision 3565). If more forwarding locations exist, decision 3565 branches to "yes" branch 3567 whereupon the next forwarding location is selected (step 3570) and the whole process is repeated until no forwarding locations exist. If no more locations exist, decision 3565 branches to "no" branch 3569 and processing subsequently ends at 3595.

If the location is not an email message, decision 3510 branches to "no" branch 3514 whereupon a determination is made as to whether the location is a fax machine or a pager (decision 3515). If the location is a fax machine or a pager, decision 3515 branches to the "yes" branch 3517 whereupon, at step 3530, a message is composed using the text version of the call data. At step 3535, the phone number is dialed. A determination is made as to whether the line is busy (decision 3540). If the line is busy, decision 3540 branches to "yes" branch 3542 whereupon, at step 3545, the line is hang up and the system waits for a certain period before, at step 3530, the number is redialed (step 39 3535). If the number is not busy, decision 3540 branches to "no" branch 3544 whereupon the system waits for an answer by the recipient's machine. A determination is then made as to whether the fax or pager (or the pager's service) answers (decision 3555). If there is an answer, decision 3555 branches to "yes" branch 3557 whereupon the system establishes communication with and then sends the message to the fax or digital pager (step 3560). A determination is then made as to whether more forwarding locations exist (decision 3565). If more forwarding locations exist, decision 3565 branches to "yes" branch 3567 whereupon the next forwarding location is selected (step 3570) and the whole process is repeated until no forwarding locations exist. If no more locations exist, decision 3565 branches to "no" branch 3569 and processing subsequently ends at 3595.

If the forwarding location is not a fax or pager, decision 3595 branches to "no" branch 3519 whereupon a determination is made as to whether the forwarding location is a URL (decision 3520). If the forwarding location is a URL, decision 3520 branches to "yes" branch 3522 whereupon the text file to be forwarded is transferred to the URL (step 3525). The file transfer may take place using the appropriate protocol such as FTP, HTTP, etc. The transfer may take place over a variety of networks such as the Internet, a local area network, or any other type of network. On the other hand, if the forwarding location is not a URL, decision 3520 branches to "no" branch 3524 whereupon a determination is made as to whether more forwarding locations exist (decision 3565). If no more locations exist, decision 3565 branches to "no" branch 3569 and processing subsequently ends at 3595.

Figure 36:
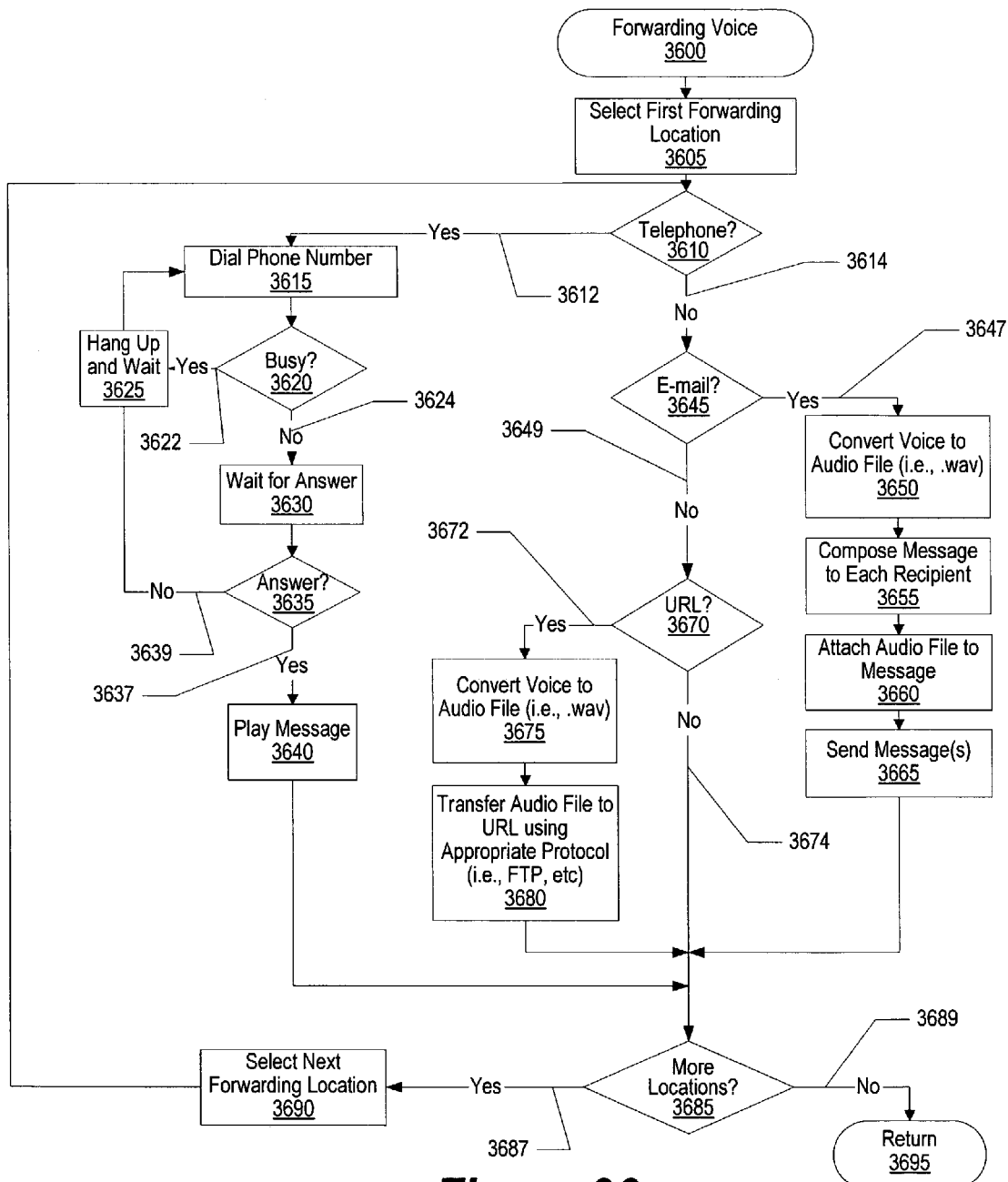
FIG. 36 is a flowchart showing steps taken by a personal telephony recorder in forwarding voice data.
Figure 37:
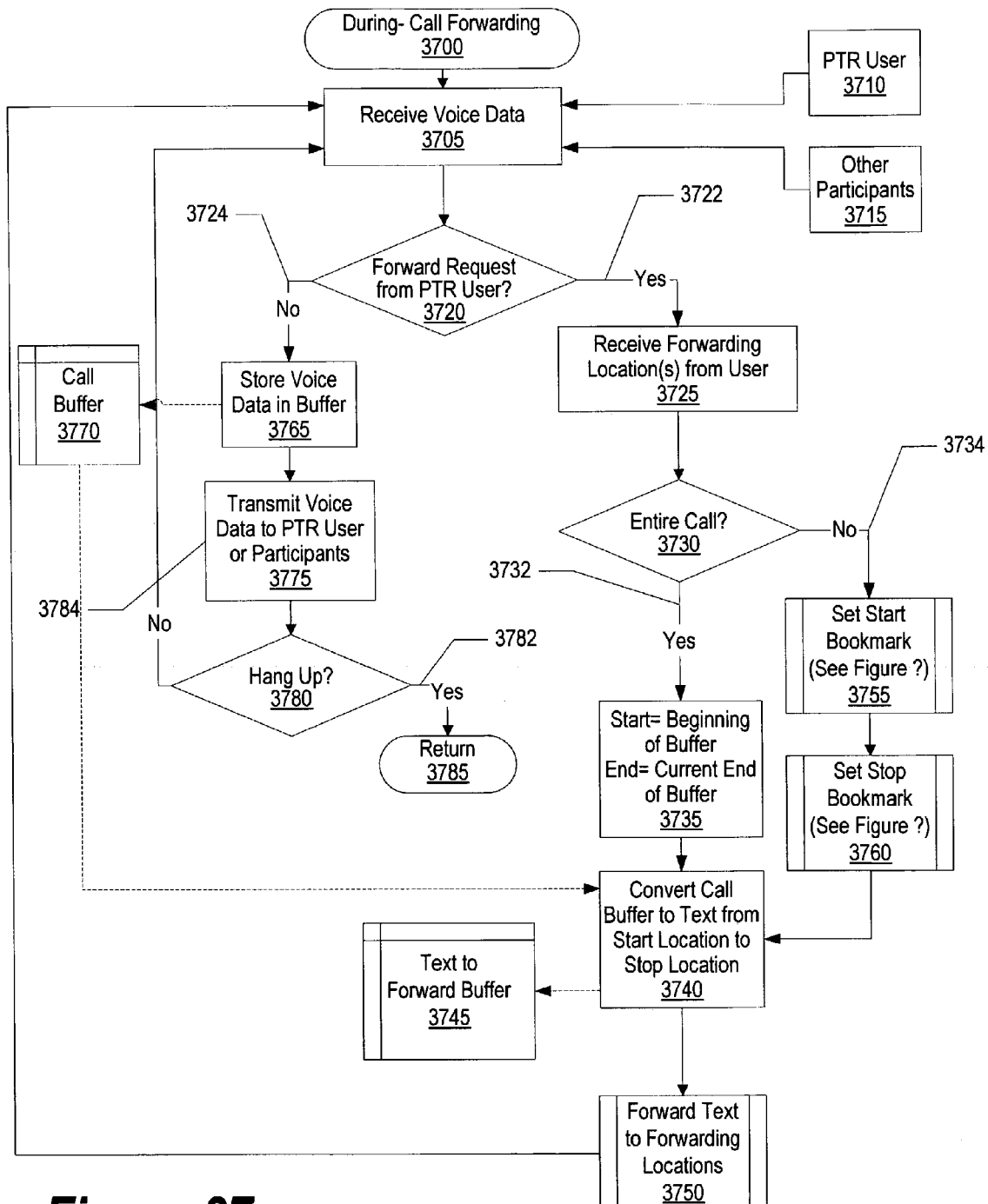
FIG. 37 is a flowchart showing steps taken by a personal telephony recorder in forwarding portions of a call during the telephone call.

FIG. 36 is a flowchart showing steps taken by a personal telephony recorder in forwarding voice data to one or more forwarding locations. Processing commences at step 3600 whereupon the first forwarding location is selected at step 3605. A determination is made as to whether the voice data is to be forwarded to a conventional telephone (decision 3610). If the voice data is to be forwarded to a telephone, decision 3610 branches to "yes" branch 3612 whereupon, at step 3615, the telephone number of the forwarding location is called. A determination is made as to whether the forwarding location is busy (decision 3620). If the location is busy, decision 3620 branches to "yes" branch 3622 whereupon, at step 3625, the telephone call is terminated, and after a short wait, the phone number of the forwarding location is dialed again (step 3615). If the forwarding location is busy, decision 3620 branches to "no" branch 3624 whereupon the system waits for the phone to be answered (step 3630). A determination is made as to whether the telephone call is answered (decision 3635). If the telephone call is not answered, decision 3635 branches to "no" branch 3639 whereupon the system again hangs up the call and waits (step 3625). On the other hand, if the call is answered, decision 3635 branches to "yes" branch 3637 whereupon the voice message is played over the telephone line (step 3640). A determination is made as to whether more locations On the other hand, if the forwarding location is not a telephone, decision 3610 branches to "no" branch 3610 whereupon a determination is made as to whether the forwarding location is an e-mail address (decision 3645). If the forwarding location is an e-mail address, decision 3645 branches to "yes" branch 3647 whereupon the voice is converted to an audio file (for example, to a .wav file). A message is then composed to each of the recipients (step 3655). A default text message may be included in the e-mail message conveying information on the forwarded voice data and the conference from which the voice portion was extracted. At step 3660, the audio file is attached to the e-mail message, and at step 3665, the e-mail is sent to the recipients. Again, a determination is made as to whether more forwarding locations exist (decision 3685). If more locations exist FIG. 37 is a flowchart showing steps taken by a personal telephony recorder in forwarding portions of a call during the telephone call. Processing commences at step 3700 whereupon voice data is received by the personal telephony recorder (step 3705). The voice data may be received from the primary personal telephony recorder user 3710 or any of the other participants 3715.

A determination is made as to whether the forward originated from the primary personal telephony recorder user (decision 3720). If the forward request came from the primary user, decision 3720 branches to "yes" branch 3722 whereupon the forwarding locations are received by the users at step 3725. a determination is made as to whether the entire call is to be forwarded (decision 3730). If the entire call is to be forwarded, decision 3730 branches to "yes" branch 3732 whereupon starting position for the forwarded portion is set to the beginning of the buffer and the ending position is set to the current end of the buffer (step 3740). The voice data is then retrieved from call buffer 3700 according to the above starting and ending points. At step 3740, the retrieved voice data is converted to text, which is then placed in text buffer 3745 for subsequent forwarding. Subsequently, at step 3700, the text from forward buffer 3745 is forwarded to the designated forwarding locations. The personal telephony recorder subsequently loops back to step 3705 where the system waits for more forwarding commands. The looping continuous until the end of the conference or until the personal telephony recorder is turned off.

On the other hand, if only a portion of the call is to be forwarded, decision 3730 branches to "no" branch 3734 whereupon, at step 3755, the start bookmark is set, and at step 3760, the stop bookmark according to the parameters set by the user. At step 3740, the retrieved voice data is converted to text, which is then placed in text buffer 3745 for subsequent forwarding. Subsequently, at step 3700, the text from forward buffer 3745 is forwarded to the designated forwarding locations. The personal telephony recorder subsequently loops back to step 3705 where the system waits for more forwarding commands. The looping continuous until the end of the conference or until the personal telephony recorder is turned off.

If the forwarding request is not from a personal telephony recorder user, decision 3720 branches to "no" branch 3724 whereupon, at step 3765, the voice data is stored in call buffer 3770. Subsequently, a determination is made as to whether the personal telephony recorder is to hang up. If the personal telephony recorder is to hang up, decision 3780 branches to "yes" branch 3782 whereupon processing subsequently ends at step 3795. On the other hand, if the personal telephony recorder is not to hang up, decision 3780 branches to "no" branch 3784 whereupon the processing loops back to receiving voice data (step 3705).

Figure 38:
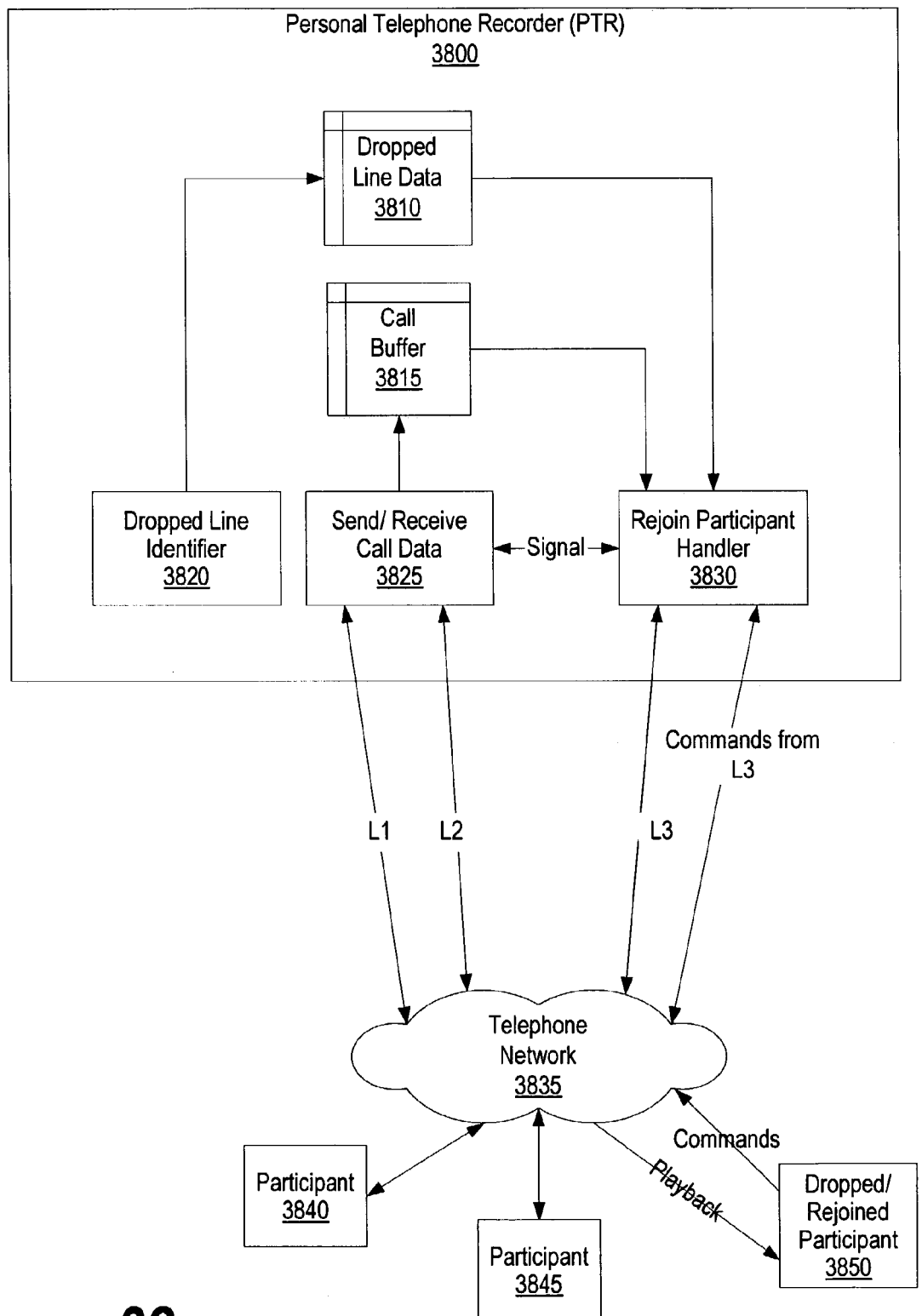
FIG. 38 is a network diagram showing a personal telephony recorder rejoining a participant that was dropped from a telephone conference.

FIG. 38 is a network diagram showing a personal telephony recorder rejoining a participant that was dropped from a telephone conference. Participants 3840 and 3845 are connected to personal telephony recorder 3800 through telephone network 3835 using lines L1 and L2. Call data from Participants 3840 and 3845 is received by send/receive call data 3825 and then stored in call buffer 3815. Dropped line identifier 3820 is capable of detecting when and which user is dropped from the conference. After a user is dropped from the conference, the dropped line identifier begins accumulating data missed by the dropped user by storing such data in dropped line data storage 3810.

When a user (such as user 3850) re-establishes communication with personal telephony recorder 3800, the user is connected to rejoin participant handler 3830. In one embodiment, user 3850 may be connected to personal telephony recorder 3800 by a voice line (L3) for transmitting call data as well as by a data line for sending commands to and from personal telephony recorder 3800. Rejoin participant handler 3830 receives information from send/receive call data module 3825 regarding the dropped user. The information may include the identity of the user (which the handler may verify), the time when the user was dropped, etc. In one embodiment, the handler asks whether the user would like to rejoin the conference or whether the user would like to review any of the missed call data. If the user wishes to rejoin the on-going conference, rejoin participant handler 3830 hands-off the user to send/receive call data module 3825. If the user wishes to review missed data, rejoin participant handler 3830 request data from the dropped line data storage 3810 and transmits that data to the dropped user at the user's request. That is, the user has the capability to play, stop, pause, rewind, fast forward, etc. though the data. In one embodiment, the user may even have the ability to playback the data at double speed without a pitch change.

Figure 39:
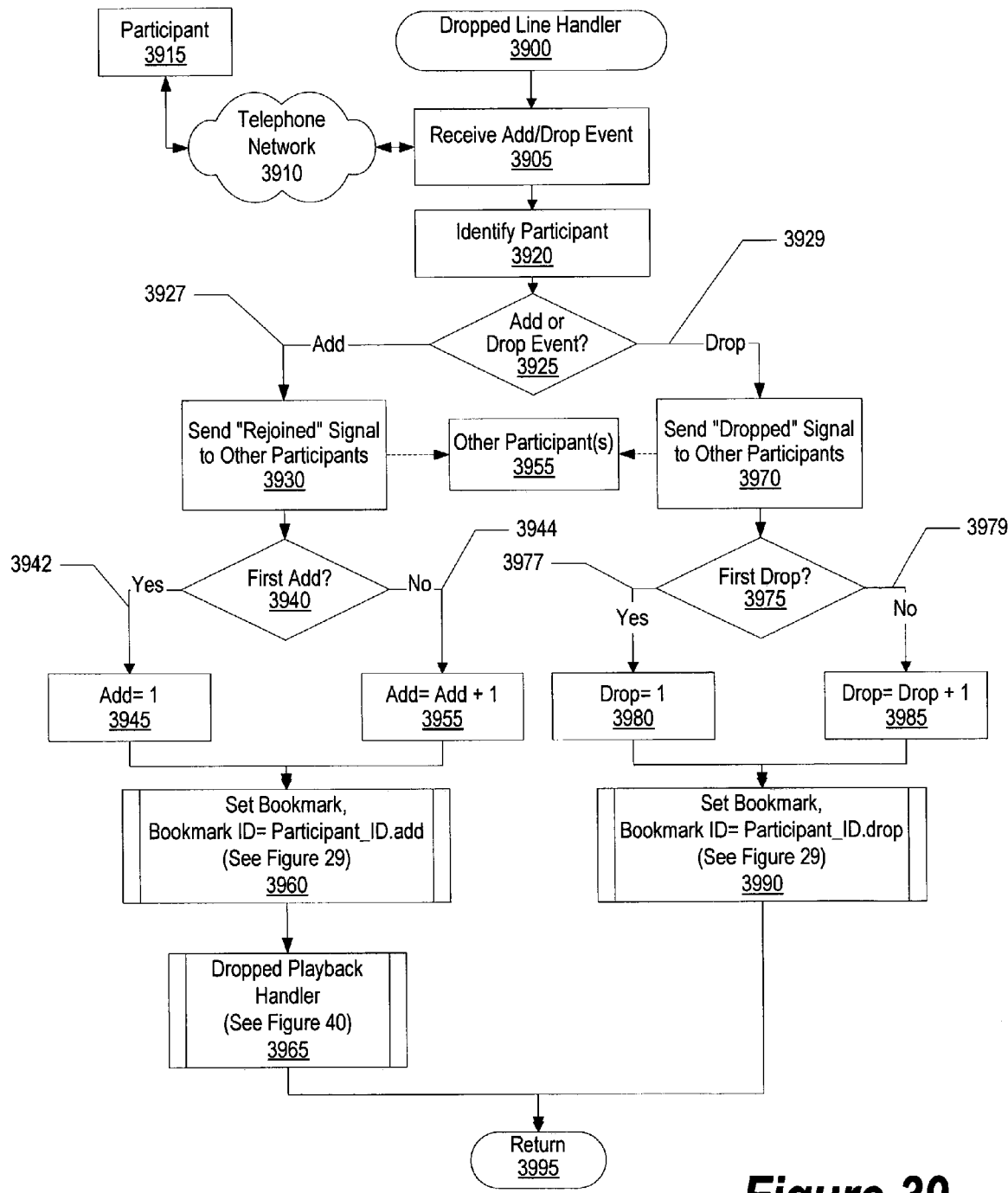
FIG. 39 is a flowchart of steps taken by a personal telephony recorder in handling participants dropped from a telephone conference.

FIG. 39 is a flowchart of steps taken by a personal telephony recorder in handling participants dropped from a telephone conference. Processing commences at 3900 whereupon an add or dropped event is received (step 3905). For example, participant 3915 may be dropped due to a bad connection due to problems with telephone network 3910. At step 3920, the particular participant who got dropped from or who was added to the conference is identified by the personal telephony recorder.

A determination is made as to whether the user was dropped or whether a user is to be added to the conference (decision 3927). If the participant is to be added to the conference, decision 3930 branches to "add" branch 3927 whereupon, at step 3930, special "rejoined" signal is transmitted to other participants 3935 to alert them to the participant's addition to the conference.

A determination is made as to whether this was the first time a participant joins the conference (decision 3940). If the participant joins the conference for the first time, decision 3940 branches to "yes" branch 3942 whereupon a counter corresponding to the particular user and signifying the number of times a user has joined the conference is set to 1 (step 3945). On the other hand, if this is not the user's first time to join the conference, decision 3940 branches to "no" branch 3944 whereupon the pointer is increased by 1 (step 3955). After either step 3945 or step 3955, at step 3960, a bookmark is set identifying the participant and the position the participant entered the conference. The participant is then routed to the dropped playback handler where the participant is given the option of listening to the portion of the conversation the participants missed during their absence (step 3965 which is further detailed in FIG. 40). Processing subsequently ends at 3995.

If the user is dropped, decision 3925 branches to "drop" branch 3925 whereupon a "dropped" special signal is transmitted to other participants 3935 to alert them to the participant's dropping from the conference (step 3929). A determination is made as to whether this was the user's first drop from the conference (decision 3975). If this is the user's first time to be dropped, decision 3975 branches to "yes" branch 3977 whereupon a counter identifying the user and how many times a user has been dropped is set to 1 (step 3980). On the other hand, if decision 3975 branches to "no" branch 3979 whereupon a counter identifying the user and how many times a user has been dropped is increased by 1 (step 3985). After either step 3980 or step 3985, a bookmark is set indicating the identity of the user and the position when the user was dropped from the conference (step 3990). This information may be used to assist the user if the user rejoins the conference at a later time. Processing subsequently ends at 3995.

Figure 40:
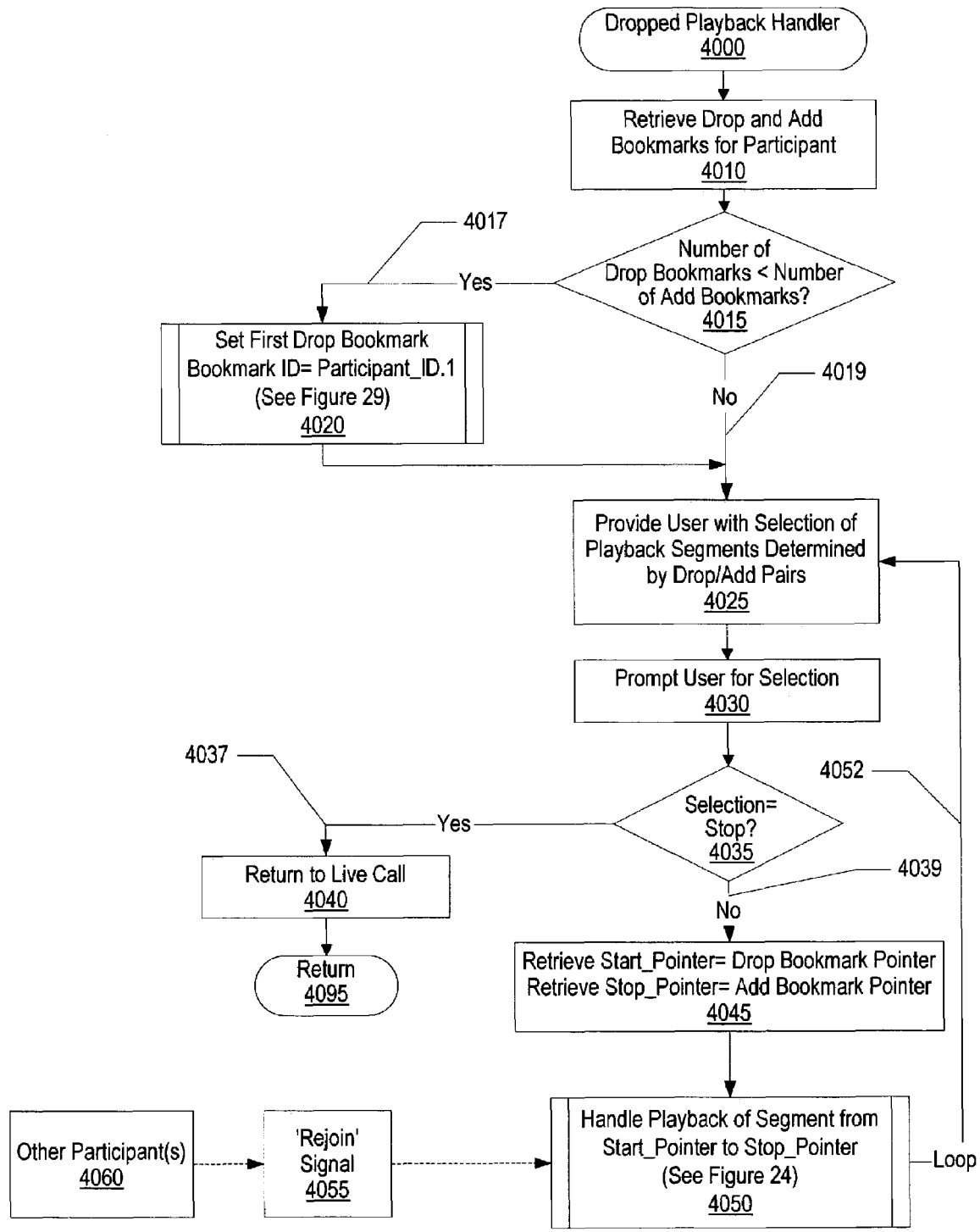
FIG. 40 is a flowchart of steps taken by a personal telephony recorder in playing back prior voice recordings for a user joining a conference call.

FIG. 40 is a flowchart of steps taken by a personal telephony recorder in playing back prior voice recordings for a user joining a conference call. Processing commences at 4000 whereupon bookmarks are retrieved, dropped, and added for a user (step 4010). A determination is made as to whether the number of dropped bookmarks is less than the number of add bookmarks (decision 4015). If the number of drop bookmarks is less than the number of add bookmarks, decision 4015 branches to "yes" branch 4017 whereupon the first drop bookmark is set (step 4020). The bookmark may include information as to the identity of the user, the location of the bookmark, etc.

After the above step, and if decision 4015 branches to "no" branch 4019 whereupon the user is provided with a selection of drop/add pairs for playback (step 4025). At step 4030, the user is prompted for a selection. A determination is made as to whether the selection is a "stop" command (decision 4035). If the selection is a "stop" command, decision 4035 branches to "yes" branch 4037 whereupon the user is returned to the live call (step 4040). Processing subsequently ends at 4095.

On the other hand, if the selection is not a "stop" command, decision 4035 branches to "no" branch 4039 whereupon, at step 4045, the personal telephony recorder retrieves the start_pointer and sets it equal to the drop bookmark pointer, and the stop_pointer and sets it equal to the add bookmark pointer. At step 4050, the personal telephony recorder handles the playback of a segment between the start_pointer and the stop_pointer (see figure). A "rejoin" signal 4055 is also sent to other participants 4060 to alert them that a user may have rejoined. After step 4050, the processing is returned to step 4025 by using loop 4052.

Figure 41:
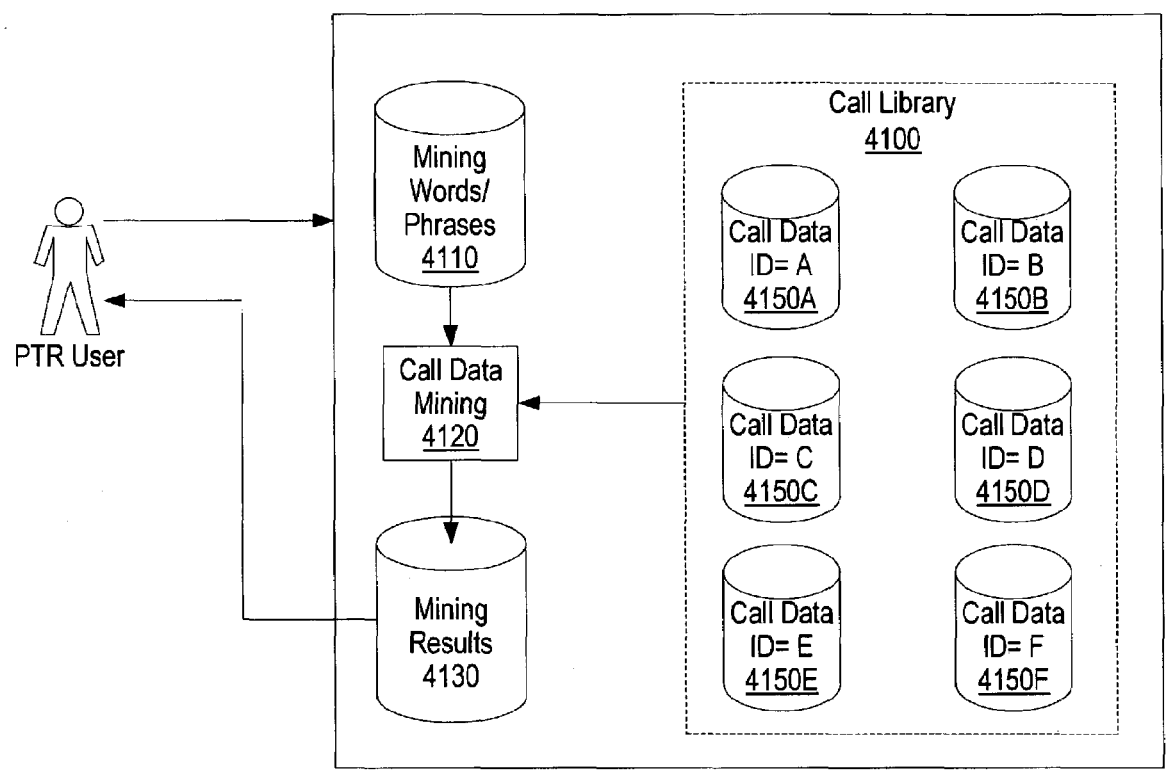
FIG. 41 is a system diagram of a user data mining words and phrases from call data recorded using a personal telephony recorder.

FIG. 41 is a system diagram of a user data-mining words and phrases from call data recorded using a personal telephony recorder. Personal telephony recorder user 4100 may at a time before, during, or after a conference call define and edit mining words/phrases to be used during the processing of the recorded call data. Processing of the recorded call data may involve, for example, creating an index, annotating the call data, etc. Annotating the data may involve searching the call data for keywords and phrases, searching the call data for voice inflections, and further providing hyperlinks from the keywords, for example, to places (on the Internet, for example) where related information to the keywords is located.

Call data mining processor 4120 is capable of accessing the mining words and phrases as well as the call data from call library 4135. Call library 4135 contains call data 4150A–F. Each of the six areas contains the contribution to the call from each one of the users in the conference.

Figure 42:
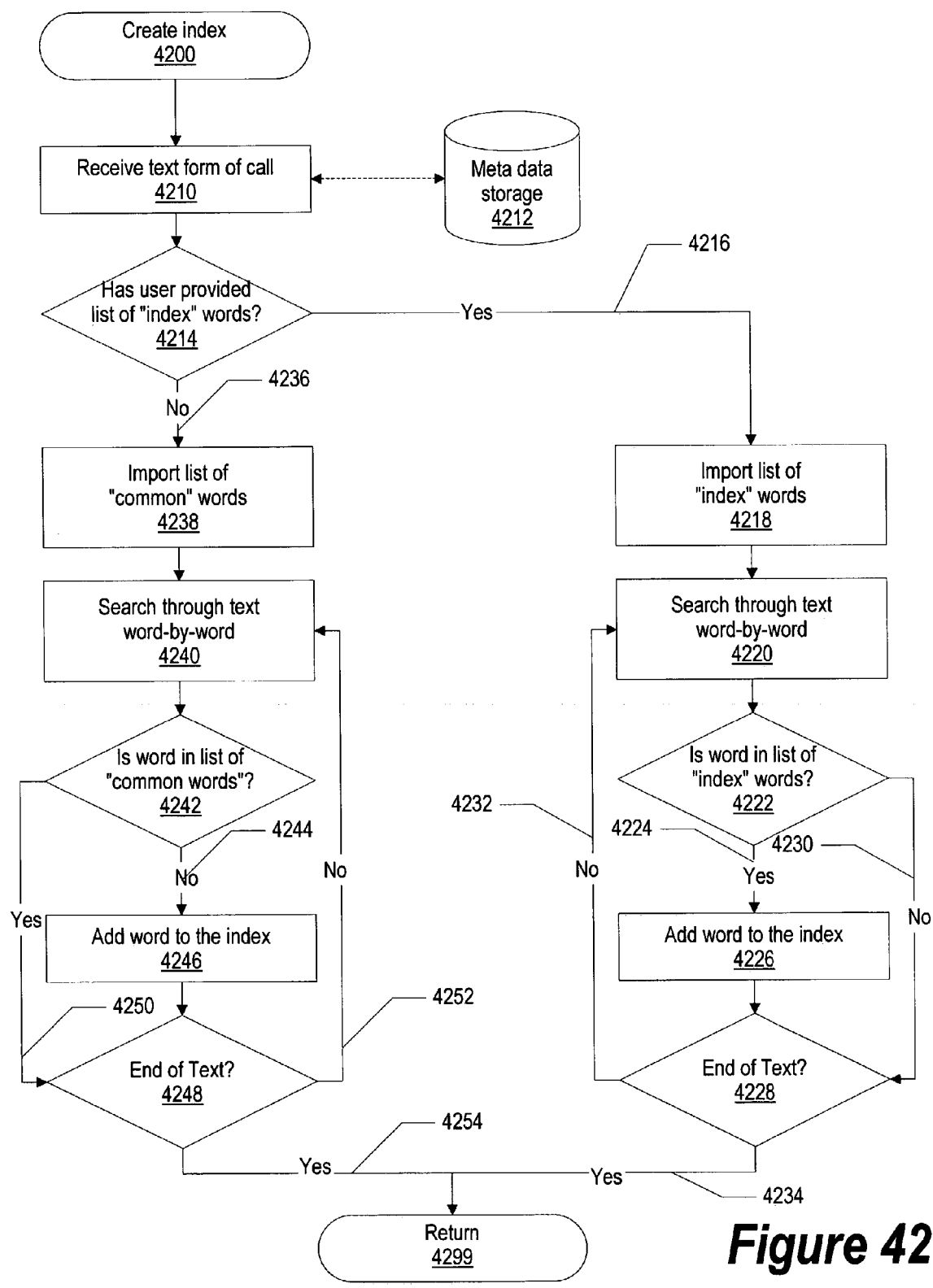
FIG. 42 is a flowchart of steps taken in creating an index of words and phrases during a call data mining operation.

FIG. 42 is a flowchart of steps taken in creating an index of words and phrases during a call-data mining operation. Processing commences at 4200 whereupon call data is received in textual format from meta data storage 4212 (step 4210). The text data was created by converting the voice call data to text. A determination is made as to whether the user requesting the index has provided a list of index words (decision 4214). If the user has provided a list of index words, decision 4214 branches to "yes" branch 4216 whereupon the provided list of index words is accessed (step 4218). At step 4220, the personal telephony recorder searches through the call text word-by-word. A determination is made as to whether a word from the call textual data matches one of the words in the provided list of index words (decision 4222). If there is a match between the words, decision 4222 branches to "yes" branch 4224 whereupon the matched word is added to the index to be created (step 4226). Other information relating to the word may also be saved, such as the position in the text data where the word was found. A determination is made as to whether the search has reached the end of the text data (decision 4228). If the end of the text data is reached, decision 4228 branches to "yes" branch 4234 whereupon processing ends at 4295. If the end of the text data is not reached, decision 4228 branches to "no" branch 4232 whereupon the word search is repeated at step 4220. If there is no word much, decision 4222 branches to "no" branch 4230 whereupon a determination is made again as to whether the end of the text data has been reached (decision 4228). If the end of the text data is reached, decision 4228 branches to "yes" branch 4234 whereupon processing subsequently ends at 4295. If the end of the text data is not reached, decision 4228 branches to "no" branch 4232 whereupon the word search is continued at step 4220.

If a list of index words is not provided by the user, decision 4214 branches to "no" branch 4236 whereupon the imported list of common words is accessed (step 4238). When common words are excluded, it may be an easier way to form the index by eliminating these common words. At step 4240, the personal telephony recorder searches through the call text word-by-word. A determination is made as to whether a word from the call textual data matches one of the words in a list of common words (decision 4242). If there is a match between the words, decision 4242 branches to "yes" branch 4244 whereupon the matched word is added to the index to be created (step 4246). Other information relating to the word may also be saved, such as the position in the text data where the word was found. A determination is made as to whether the search has reached the end of the text data (decision 4248). If the end of the text data is reached, decision 4248 branches to "yes" branch 4234 whereupon processing ends at 4295. If the end of the text data is not reached, decision 4248 branches to "no" branch 4252 whereupon the word search is repeated at step 4220. If there is no word match, decision 4252 branches to "yes" branch 4250 whereupon a determination is made again as to whether the end of the text data has been reached (decision 4248). If the end of the text data is reached, decision 4248 branches to "yes" branch 4254 whereupon processing subsequently ends at 4295. If the end of the text data is not reached, decision 4248 branches to "no" branch 4252 whereupon the word search is continued at step 4240.

Figure 43:
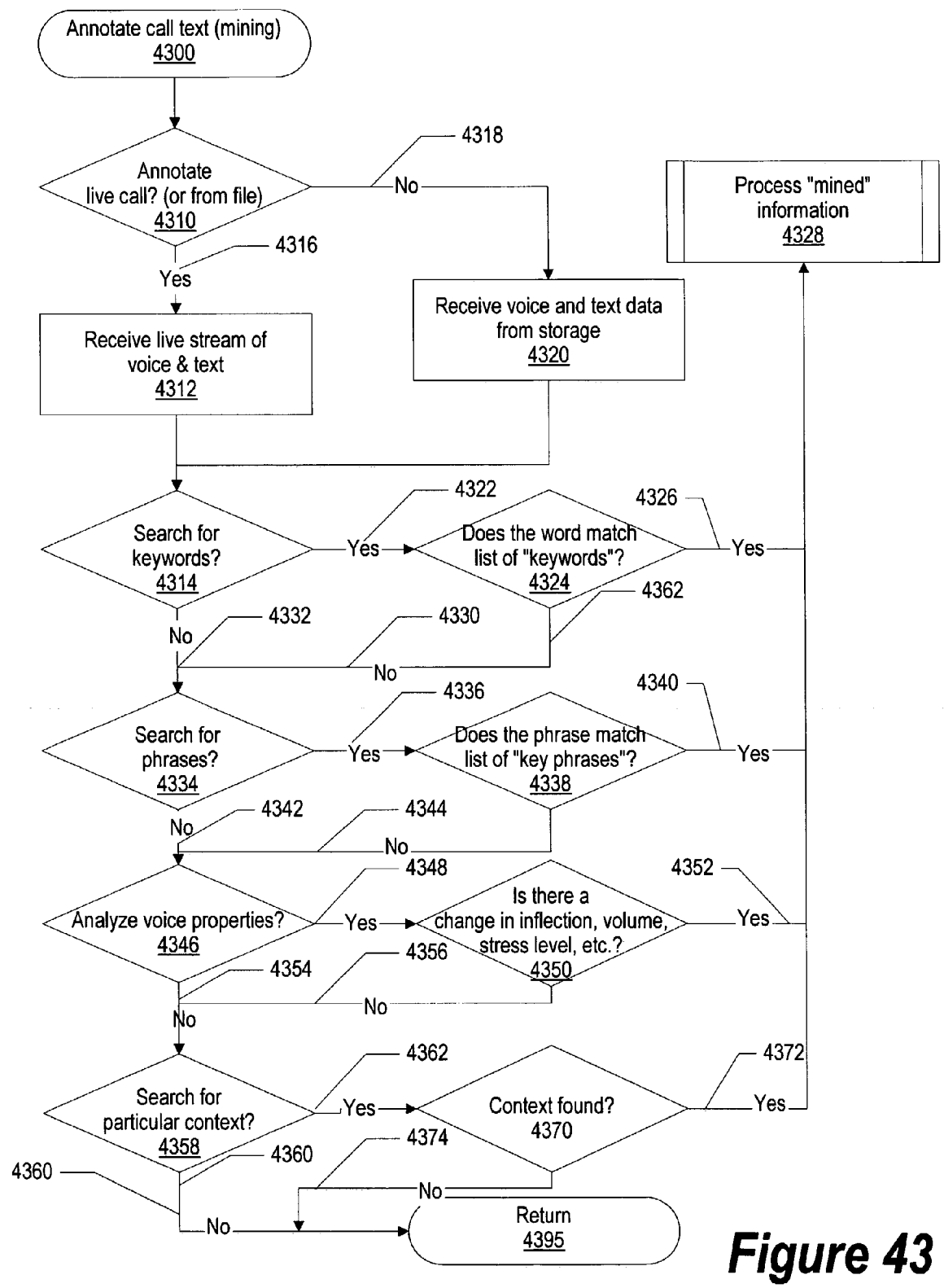
FIG. 43 is a flowchart of steps taken annotating call text during a call data mining operation.

FIG. 43 is a flowchart of steps taken annotating call text during a call data mining operation. Processing commences at 4300. A determination is first made as to whether the annotation is to be performed on a live call or from a saved call. If the call is presently taking place, decision 4310 branches to "yes" branch 4316 whereupon, at step 4312, a live stream of the voice and text are received. On the other hand, if the call is not live, decision 4310 branches to "no" branch 4318 whereupon, at step 4620, the appropriate voice and text data are received from storage.

After both step 4312 and step 4320, a determination is made as to whether to search the call data for particular keywords (decision 4314). If the system is to perform a keyword search, decision 4314 branches to "yes" branch 4322 whereupon another determination is made as to whether words from the call textual data match one of the provided words (decision 4324). If there is a match, at step 4328, the word is received, and "mined" information relating to the matched word is processed. If there is no match, decision 4324 branches to "no" branch 4330. If a keyword search is not to be performed, decision 4514 branches to "no" branch 4332.

Both branch 4330 and branch 4332 lead to decision 4342 whereupon a determination is made as to whether to search the incoming text for particular phrases (decision 4514). If the system is to perform a phrase search, decision 4342 branches to "yes" branch 4336 whereupon another determination is made as to whether phrases from the call textual data match one of the provided phrases (decision 4338). If there is a match, at step 4328, the phrase is received, and "mined" information relating to the matched phrase is processed. If there is no match, decision 4338 branches to "no" branch 4344. If a phrase search is not to be performed, decision 4534 branches to "no" branch 4334.

Both branch 4342 and branch 4344 lead to decision 4346 whereupon a determination is made as to whether to analyze the voice properties of the users in the conference (decision 4546). If the system is to perform voice analysis, 4346 branches to "yes" branch 4348 whereupon another determination is made as to whether changes in volume, inflection, stress level, etc. have occurred (decision 4350). If a change has occurred, at step 4328, the relevant information from the search is received and processed. If there no changes are found in the voice, decision 4350 branches to "no" branch 4356. If voice analysis is not to be performed, decision 4346 branches to "no" branch 4354.

Both branch 4356 and branch 4354 lead to decision 4358 whereupon a determination is made as to whether to search the call data for particular context (decision 4358). If the system is to search, 4346 branches to "yes" branch 4348 whereupon another determination is made as to whether changes in volume, inflection, stress level, etc. have occurred (decision 4350). If a change has occurred, at step 4350, the relevant information from the search is received and processed. If no changes are found in the voice, decision 4350 branches to "no" branch 4362. If voice analysis is not to be performed, decision 4358 branches to "no" branch 4354.

Figure 44:
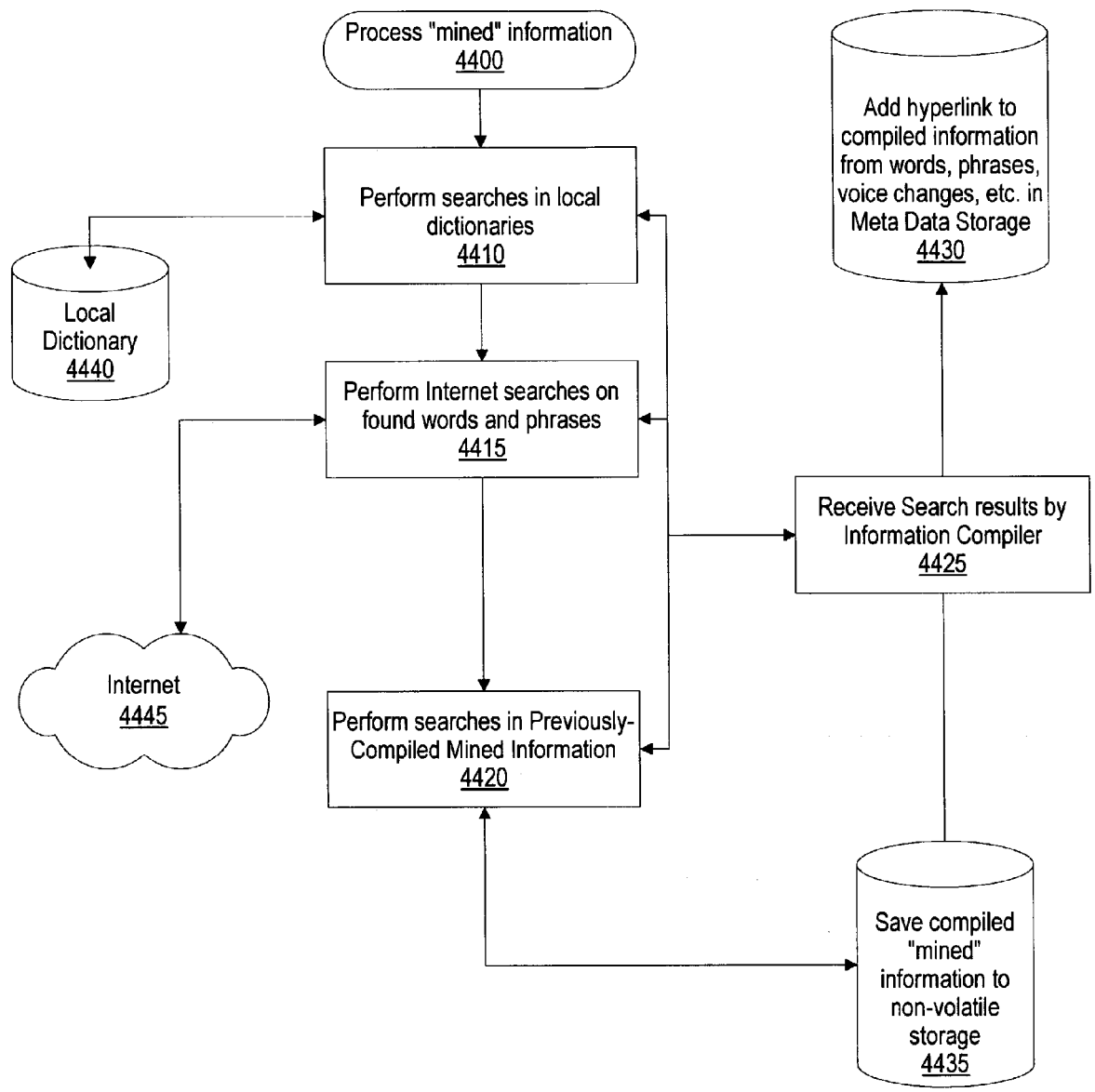
FIG. 44 is a flowchart of steps taken processing information mined from recorded telephone calls.

FIG. 44 is a flowchart of steps taken to receive and process information mined from recorded telephone calls. Processing commences at 4400 whereupon, at step 4410, searches are performed in local dictionaries to obtain definitions of the mined information. At this step, data from local dictionary 4440, for example, may be received. Any data obtained from successful searches, at step 4425, are received by the information compiler.

In addition to searching local dictionaries, Internet searches using the obtained mined information are also performed (step 4415). At this step, data from the Internet (4445), for example, may be received. Any data obtained from successful searches, at step 4425, are received by the information compiler.

Another place to perform searches for the mined information is previously recorded call data from similar calls/conferences (step 4420). Information obtained during a successful search are also received by the information compiler (step 4420).

At step 4425, any information obtained about the call from the above searches, with some limitations, is hyperlinked from the call data to this information. The resulting hyperlinked data is stored in meta data storage 4430. the compiled "mined" information is saved to non-volatile memory 4435.

Figure 45:
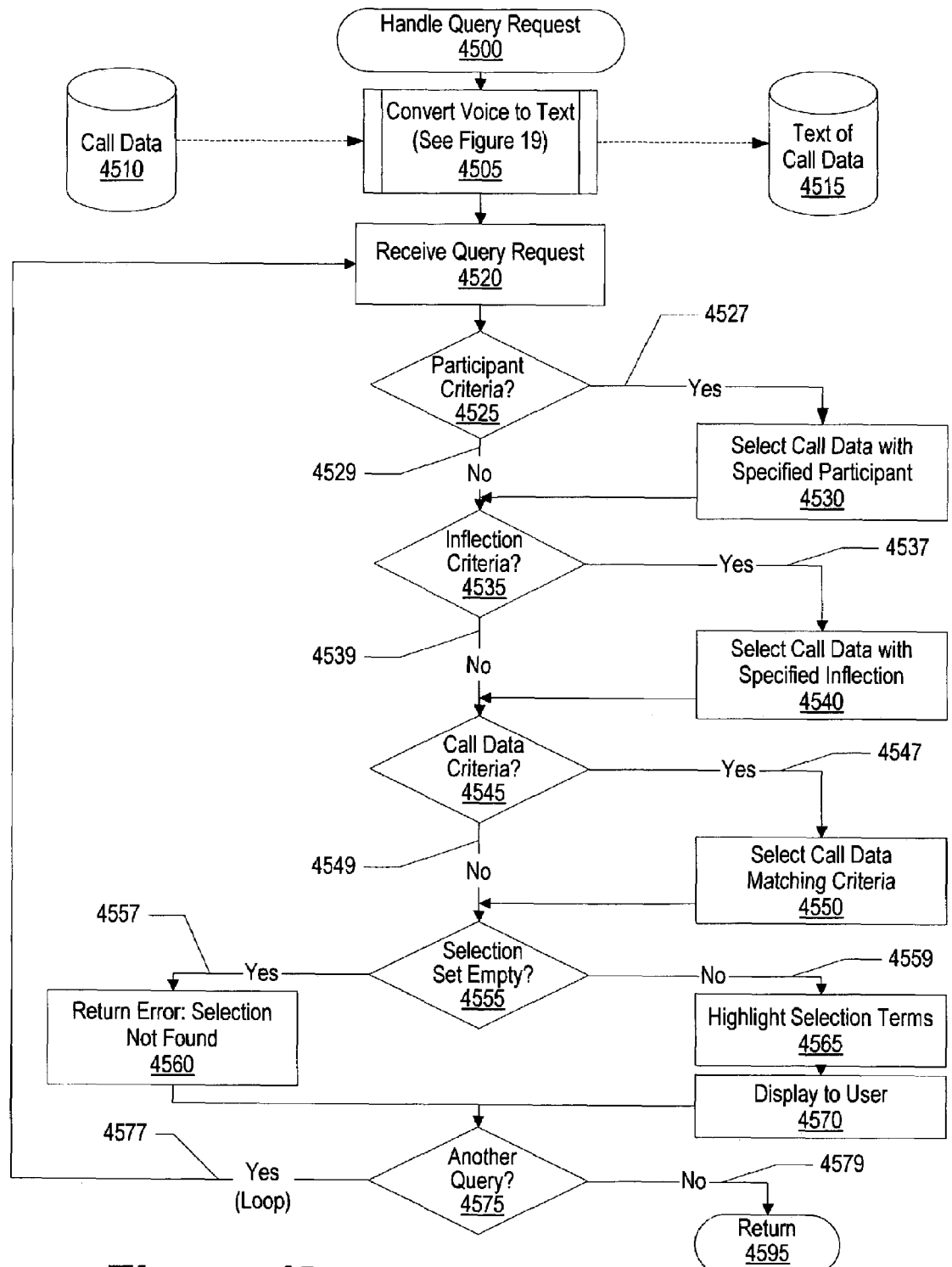
FIG. 45 is a flowchart showing steps taken in searching call data for a query request.

FIG. 45 is a flowchart showing steps taken in searching call data for a query request. Processing commences at 4500 whereupon, at step 4505 (see FIG. 19), voice call data from call data storage 4510 is retrieved, converted to text, and then stored in text format in text of call data storage 4515. At step 4520, a query request is received whereupon a determination is made as to whether the request was related to a particular user (decision 4525). If the request is participant-particular, decision 4525 branches to "yes" branch 4527 whereupon, at step 4530, call data contributed by the particular participant is selected. After step 4530, processing continues at decision 4535. On the other hand, if the request is not participant-particular, decision 4525 branches to "no" branch 4529.

A determination is then made as to whether the request was related to a particular user (decision 4535). If the request is participant-particular, decision 4535 branches to "yes" branch 4537 whereupon, at step 4540, call data contributed by the particular participant is selected. After step 4540, processing continues at decision 4545. On the other hand, if the request is not participant-particular, decision 4535 branches to "no" branch 4539. On the other hand, if the request is not participant-particular, decision 4535 branches to "no" branch 4539.

A determination is made as to whether the query request was related to call data meeting certain criteria (decision 4545). If the request is related to call data meeting certain criteria, decision 4545 branches to "yes" branch 4537 whereupon, at step 4550, call data with appropriate criteria is selected. After step 4550, processing continues at decision 4555. On the other hand, if the request is not related to call data having particular criteria, decision 4545 branches to "no" branch 4549. On the other hand, if the request is not for call data meeting certain criteria, decision 4545 branches to "no" branch 4549.

A determination is made as to whether the request was related to portions of the voice data having particular inflection criteria (decision 4555). If the request is related to inflections, decision 4545 branches to "yes" branch 4547 whereupon, at step 4550, call data with particular inflections is selected. After step 4560, processing continues at decision 4555. On the other hand, if the request is not participant-particular, decision 4545 branches to "no" branch 4549. On the other hand, if the request is not participant-particular, decision 4535 branches to "no" branch 4539.

Figure 46:
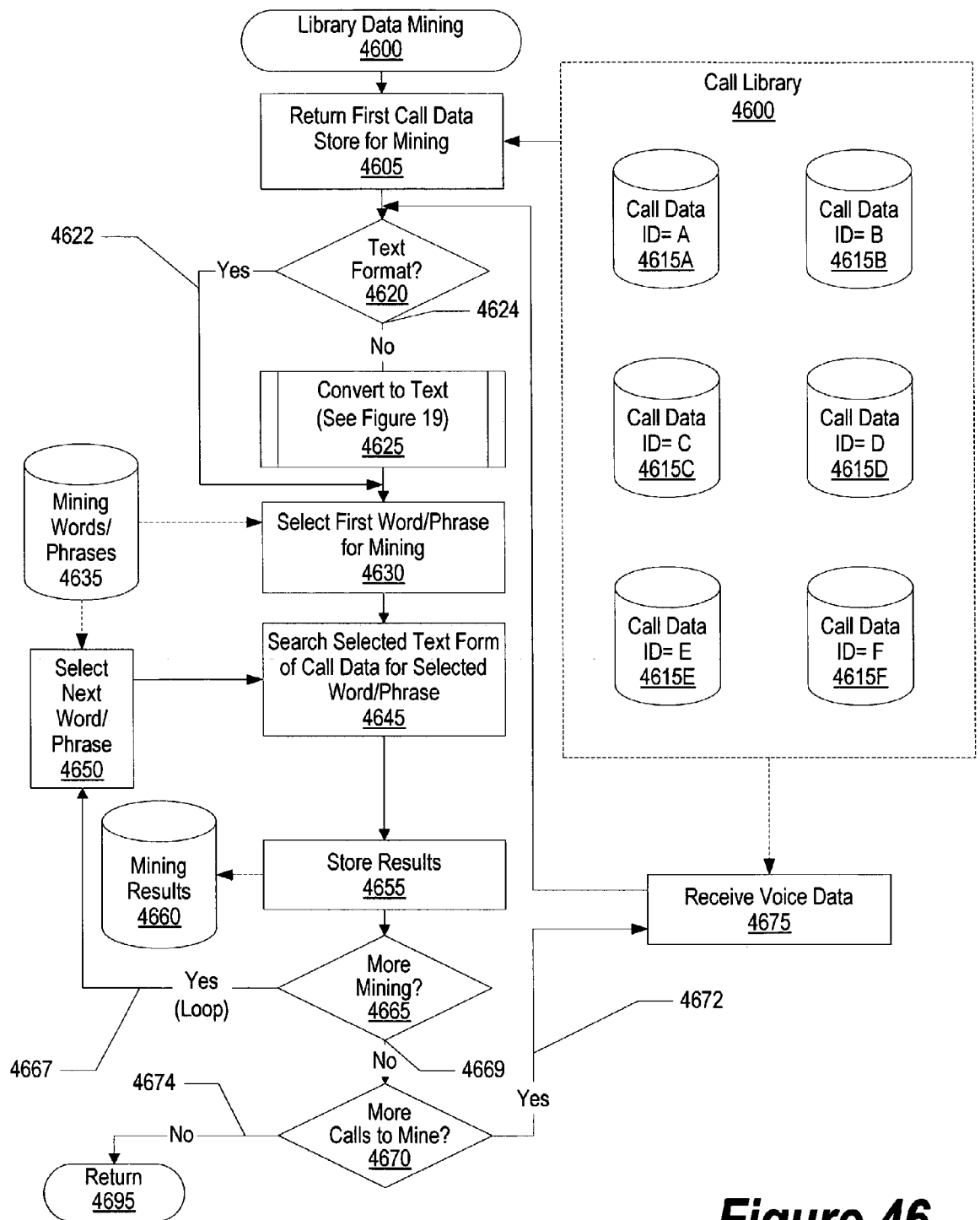
FIG. 46 is a flowchart showing steps taken in data mining words and phrases from a call library that includes numerous call recordings.

FIG. 46 is a flowchart showing steps taken in data mining words and phrases from a call library that includes numerous call recordings. Processing commences at 4600 whereupon, at step 4605, call data from the first call data stored in call library 4610. Call library 4610 contains user-specific call data 4615A–F representing the contribution of each user to the conference.

A determination is made as to whether a text version of the call data exists (decision 4620). If the text format already exists, decision 4620 branches to "yes" branch 4620 whereupon the next step of converting the voice data to text is skipped. If the text format does not exist, decision 4620 branches to "no" branch 4624 whereupon, at step 4625, the voice data is converted to text.

At step 4630, a word/phrase is selected from the words and phrases obtained from mining words/phrases 4635, and at step 4645, the selected call data is searched for that word/phrase. At step 4655, any successful search results are stored in mining results storage 4660.

A determination is made as to whether more mining information exists that requires processing (decision 4670). If so, the next word/phrase is selected and the searching the selected text is repeated at step 4630. This looping continuous until there are no more mining words/phrases. If there is no more mining information, decision 4665 branches to "no" branch 4669 whereupon a determination is made as to whether there are more sets of call data to search (decision 4670). If more such calls exist, decision 4670 branches to "yes" branch 4672 whereupon more voice data may be received (step 4675) or obtained from the home. If there are no more calls to search through, decision 4670 branches to "no" branch 4674 whereupon the processing subsequently ends at 4695.

Figure 47:
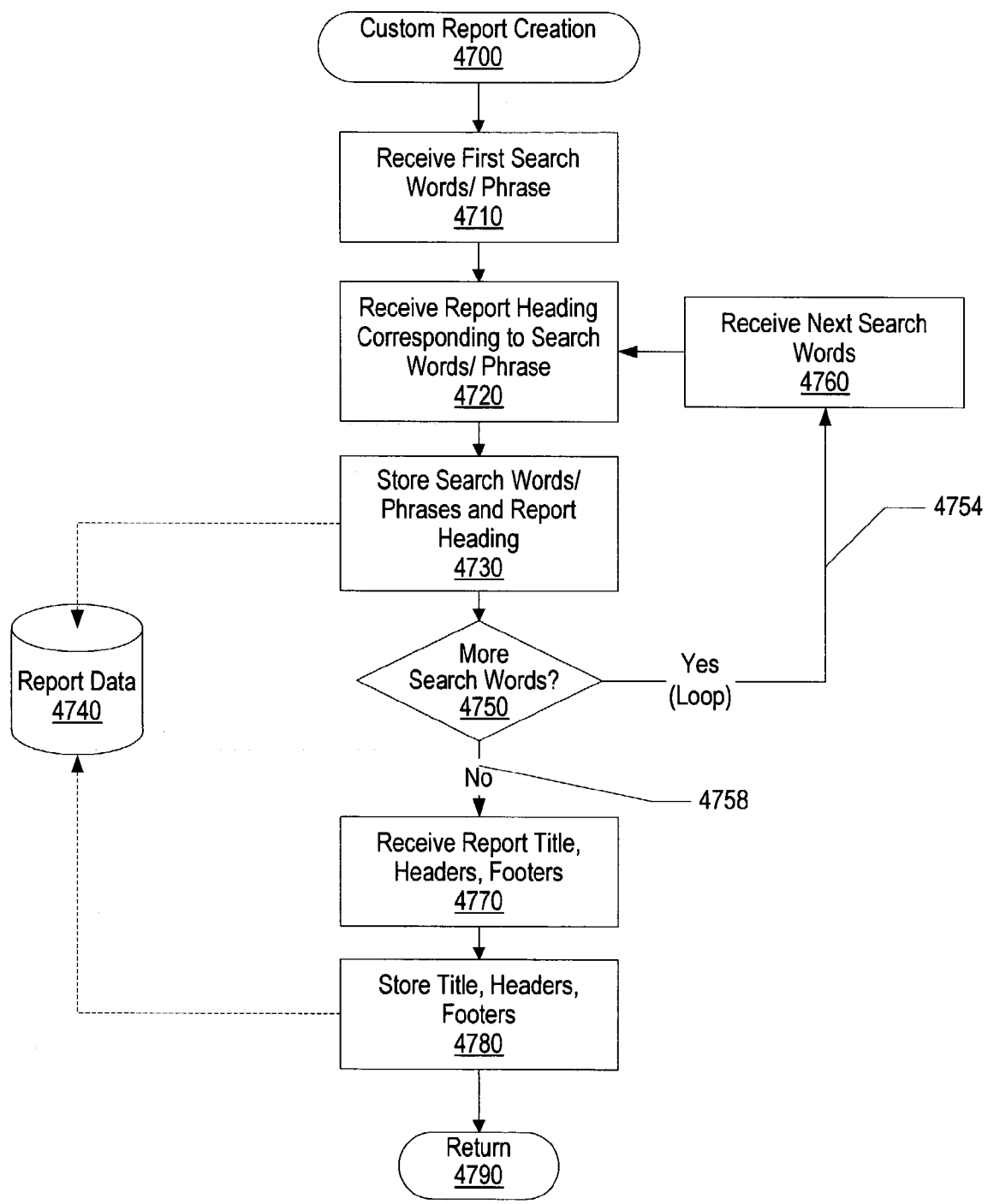
FIG. 47 is a flowchart showing steps taken in creating a custom report specification used to retrieve data found in call data files.

FIG. 47 is a flowchart showing steps taken in creating a custom report specification used to retrieve data found in call data files. Processing commences at 4700 whereupon, at step 4710, the first search for words or phrases is received. At step 4720, a heading for the report to be prepared is received. The words, phrases, and report are stored for future reference in report data store 4740. If more search words exist, decision 4780 branches to "yes" branch 4754. At the next step (4760), the next search word is selected, and the data is introduced. If there are no more words, decision 4750 branches to "no" branch 4758.

In step 4770, a report title, headers, and footers are received to customize the report and provide heading information for areas of the report. At step 4080, the titles, headers and footers are stored in report data store 4740. Processing subsequently ends at 4790.

Figure 48:
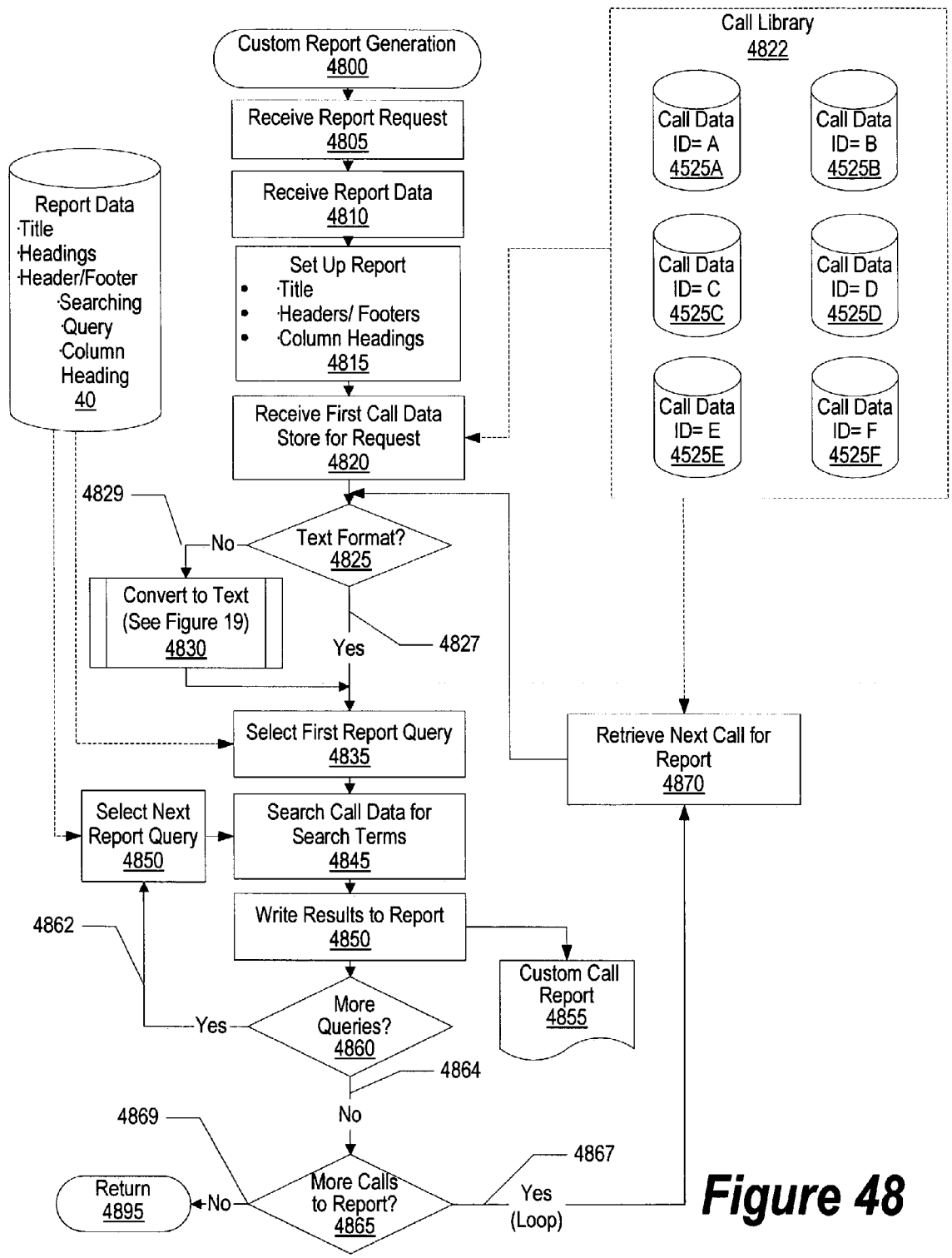
FIG. 48 is a flowchart showing steps taken in generating a custom report by retrieving data from call data files.

FIG. 48 is a flowchart showing steps taken in generating a custom report by retrieving data from call data files. Processing commences at 4800 whereupon, at step 4805, a report request is received. At step 4810, any data associated with the report is received as well. Such data may include title, headers, footers, etc. At step 4820, the report is formatted by selecting the title, the headers/footers, the column headings, etc. Call data associated with the first call for which a report is to be created is retrieved from call library 4822. Call library contains call data (4825A–F) stored by each user's contribution to the call.

A determination is made as to whether the call data already exists in text format (decision 4825). If the text format exists, decision 4825 branches to "yes" branch 4827. If the text format does not exist, decision 4825 branches to "no" branch 4829 whereupon, at step 4830, the voice call data is converted to text.

At step 4845, the first report query is selected from report data storage 4840, and at step 4845, the call data is searched for any occurrences of the search terms. The results of the search are stored in custom call report storage 4855.

A determination is made as to whether more queries exist (decision 4860). If more do exist, decision 4860 branches to "yes" branch 4862 whereupon at step 4850 the next query is selected and the search continuous at step 4845. If no queries exist, decision 4860 branches to "no" branch 4864.

A determination is made as to whether there are more calls to include in the report (decision 4865). If more calls exist, decision 4865 branches to "yes" branch 4867 whereupon, at step 4870, the next call is selected from call library 4822, and the search resumes at decision 4825. If no more calls exist, decision 4865 branches to "no" branch 4869 whereupon the processing subsequently ends at 4895.

Figure 49:
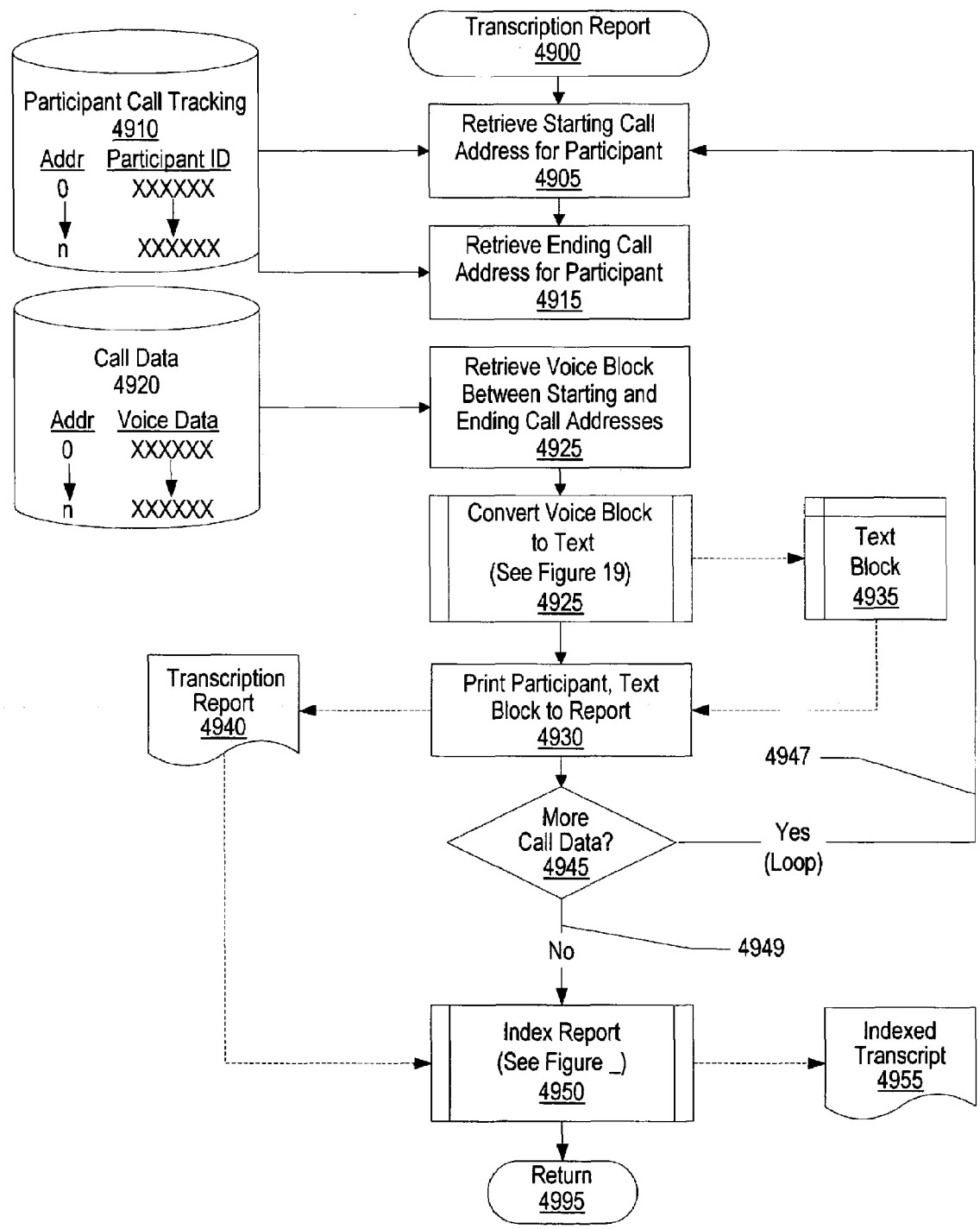
FIG. 49 is a flowchart showing steps taken in generating a transcription report from a call data file.

FIG. 49 is a flowchart showing steps taken in generating a transcription report from a call data file. Processing commences at 4900 whereupon a pointer to the address where the call data for a particular user begins is retrieved from participant call tracking table storage 4910 (step 4905). At step 4910, a pointer to the address where the call data for a particular user ends is retrieved from participant call tracking table storage 4910. The voice block corresponding to the beginning and end of the call are also retrieved (step 4915). At step 4925, the voice block is converted to text, which is stored in text block storage 4935.

At step 4930, the participant's ID and corresponding text are retrieved from text block storage 4935 and are added to the transcription report 4940.

A determination is made as to whether more call data exists for other participants (decision 4945). If more call data exists, decision 4945 branches to "yes" branch 4947 whereupon, at step 4905, the retrieval of call data resumes. This looping continuous until there is no more call data left. If no more call data exists, decision 4945 branches to "no" branch 4949 whereupon, at step 4950, an index report is created. The index report is a compilation of individual user data stored in transcription report 4940. Finally, the index report is stored in indexed transcript storage 4955, and the processing subsequently ends at 4995.

Figure 50:
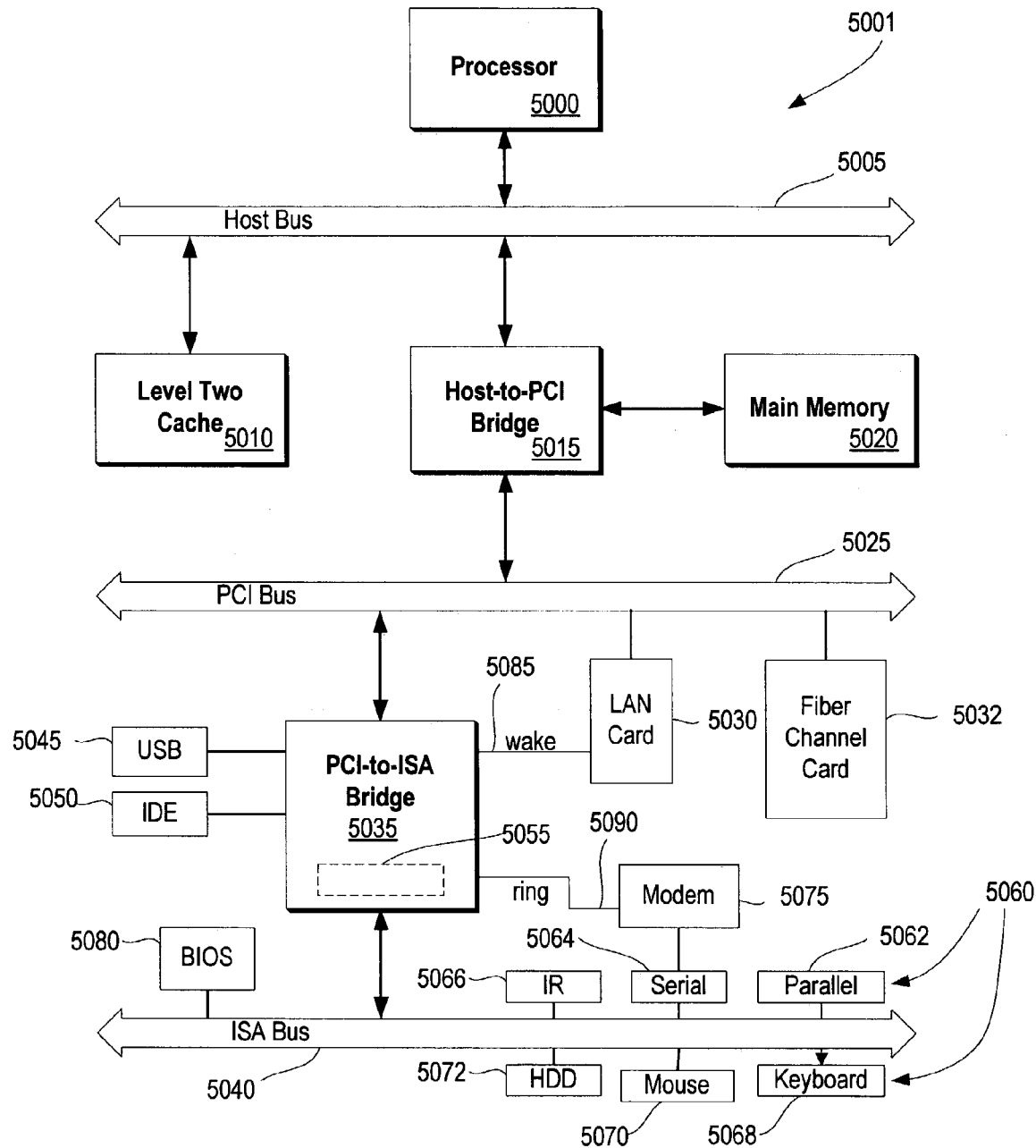
FIG. 50 is a block diagram of an information handling system capable of implementing the present invention.

FIG. 50 illustrates information handling system 5001 which is a simplified example of a computer system capable of performing the operations described herein. Computer system 5001 includes processor 5000 which is coupled to host bus 5005. A level two (L2) cache memory 5010 is also coupled to the host bus 5005. Host-to-PCI bridge 5015 is coupled to main memory 5020, includes cache memory and main memory control functions, and provides bus control to handle transfers among PCI bus 5025, processor 5000, L2 cache 5010, main memory 5020, and host bus 5005. PCI bus 5025 provides an interface for a variety of devices including, for example, LAN card 5030. PCI-to-ISA bridge 5035 provides bus control to handle transfers between PCI bus 5025 and ISA bus 5040, universal serial bus (USB) functionality 5045, IDE device functionality 5050, power management functionality 5055, and can include other functional elements not shown, such as a real-time clock (RTC), DMA control, interrupt support, and system management bus support. Peripheral devices and input20output (I20O) devices can be attached to various interfaces 5060 (e.g., parallel interface 5062, serial interface 5064, infrared (IR) interface 5066, keyboard interface 5068, mouse interface 5070, fixed disk (HDD) 5072 coupled to ISA bus 5040. Alternatively, many I20O devices can be accommodated by a super 1200 controller (not shown) attached to ISA bus 5040.

BIOS 5080 is coupled to ISA bus 5040, and incorporates the necessary processor executable code for a variety of low-level system functions and system boot functions. BIOS 5080 can be stored in any computer readable medium, including magnetic storage media, optical storage media, flash memory, random access memory, read only memory, and communications media conveying signals encoding the instructions (e.g., signals from a network). In order to attach computer system 5001 to another computer system to copy files over a network, LAN card 5030 is coupled to PCI bus 5025 and to PCI-to-ISA bridge 5035. Similarly, to connect computer system 5001 to an ISP to connect to the Internet using a telephone line connection, modem 5075 is connected to serial port 5064 and PCI-to-ISA Bridge 5035.

While the computer system described in FIG. 50 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of forwarding a text version of telephone call data, said method comprising:
    initiating a telephone call between a plurality of participants;
    receiving a plurality of voice inputs from the participants, wherein the voice inputs include voice data;
    storing the voice data in a memory area;
    receiving, during the telephone call, a forward request from one of the participants;
    converting, during the telephone call, a portion of the voice data stored prior to receiving the forward request to a textual form; and
    transmitting, during the telephone call, the textual form of the voice data to a third party through a computer network.

2. The method as described in claim 1 wherein the forwarding request is a vocal request included with the voice inputs, the method further comprising:
    distinguishing between the vocal request and the voice data; and
    identifying the vocal request as the forwarding request.

3. The method as described in claim 1 wherein the forwarding request is a keypad signal, the method further comprising:
    receiving the signal entered on a telephone keypad used by one of the participants;
    identifying the keypad signal as the forwarding request; and
    receiving a forwarding identifier entered on the keypad, the forwarding identifier corresponding to one or more forwarding addresses.

4. The method as described in claim 1 further comprising:
    receiving an email address corresponding to the forwarding address;
    creating an email message addressed to the email address; and
    inserting the converted portion of the voice data into the email address.

5. The method as described in claim 1 wherein the transmitting is directed to an information handling device and the information handling device is selected from the group consisting of a computer system, a mobile telephone, a personal digital assistant, a digital pager, and a fax machine.

6. The method as described in claim 1 further comprising:
    receiving one or more forwarding address identifiers from the user;
    retrieving an electronic address for each of the forwarding address identifiers, wherein the electronic addresses have a type and wherein the type is selected from the group consisting of an email address, a telephone number, and a web site address; and
    wherein the computer network includes one or more different types of networks, and wherein the transmitting is performed based on the type of network corresponding to the electronic address type.

7. The method as described in claim 1 wherein the computer network is selected from the group consisting of a public switched telephone network, a mobile telephone network, a packet based global computer network, a local area network, and a wide area network.

8. An information handling system comprising:
    one or more processors;
    a memory area accessible by the processors for storing telephone call data;
    a transmitter for transmitting voice input received over a computer network;
    a receiver for receiving voice data from the computer network; and
    a forwarding tool for forwarding a text version of telephone call data, the forwarding tool including:
        means for initiating a telephone call between a plurality of participants;
        means for receiving a plurality of voice inputs from the participants, wherein the voice inputs include voice data;
        means for storing the voice data in the memory area;
        means for receiving, during the telephone call, a forward request from one of the participants;
        means for converting, during the telephone call, a portion of the voice data stored prior to receiving the forward request to a textual form; and
        means for transmitting, during the telephone call, the textual form of the voice data to a third party through the computer network.

9. The information handling system as described in claim 8 wherein the forwarding request is a vocal request included with the voice inputs, the information handling system further comprising:
- means for distinguishing between the vocal request and the voice data; and
- means for identifying the vocal request as the forwarding request.

10. The information handling system as described in claim 8 wherein the forwarding request is a keypad signal, the information handling system further comprising:
- means for receiving the signal entered on a telephone keypad used by one of the participants;
- means for identifying the keypad signal as the forwarding request; and
- means for receiving a forwarding identifier entered on the keypad, the forwarding identifier corresponding to one or more forwarding addresses.

11. The information handling system as described in claim 8 further comprising:
- means for receiving an email address corresponding to the forwarding address;
- means for creating an email message addressed to the email address; and
- means for inserting the converted portion of the voice data into the email address.

12. The information handling system as described in claim 8 wherein the means for transmitting is directed to an information handling device and the information handling device is selected from the group consisting of a computer system, a mobile telephone, a personal digital assistant, a digital pager, and a fax machine.

13. The information handling system as described in claim 8 further comprising:
- means for receiving one or more forwarding address identifiers from the user;
- means for retrieving an electronic address for each of the forwarding address identifiers, wherein the electronic addresses have a type and wherein the type is selected from the group consisting of an email address, a telephone number, and a web site address; and
- wherein the computer network includes one or more different types of networks, and wherein the means for transmitting is performed based on the type of network corresponding to the electronic address type.

14. The information handling system as described in claim 8 wherein the computer network is selected from the group consisting of a public switched telephone network, a mobile telephone network, a packet based global computer network, a local area network, and a wide area network.

15. A computer program product stored on a computer operable media for forwarding a text version of telephone call data, said computer program product comprising:
- means for initiating a telephone call between a plurality of participants;
- means for receiving a plurality of voice inputs from the participants, wherein the voice inputs include voice data;
- means for storing the voice data in a memory area;
- means for receiving, during the telephone call, a forward request from one of the participants;
- means for converting, during the telephone call, a portion of the voice data stored prior to receiving the forward request to a textual form; and
- means for transmitting, during the telephone call, the textual form of the voice data to a third party through a computer network.

16. The computer program product as described in claim 15 wherein the forwarding request is a vocal request included with the voice inputs, the computer program product further comprising:
- means for distinguishing between the vocal request and the voice data; and
- means for identifying the vocal request as the forwarding request.

17. The computer program product as described in claim 15 wherein the forwarding request is a keypad signal, the computer program product further comprising:
- means for receiving the signal entered on a telephone keypad used by one of the participants;
- means for identifying the keypad signal as the forwarding request; and
- means for receiving a forwarding identifier entered on the keypad, the forwarding identifier corresponding to one or more forwarding addresses.

18. The computer program product as described in claim 15 further comprising:
- means for receiving an email address corresponding to the forwarding address;
- means for creating an email message addressed to the email address; and
- means for inserting the converted portion of the voice data into the email address.

19. The computer program product as described in claim 15 wherein the means for transmitting is directed to an information handling device and the information handling device is selected from the group consisting of a computer system, a mobile telephone, a personal digital assistant, a digital pager, and a fax machine.

20. The computer program product as described in claim 15 further comprising:
- means for receiving one or more forwarding address identifiers from the user;
- means for retrieving an electronic address for each of the forwarding address identifiers, wherein the electronic addresses have a type and wherein the type is selected from the group consisting of an email address, a telephone number, and a web site address; and
- wherein the computer network includes one or more different types of networks, and wherein the means for transmitting is performed based on the type of network corresponding to the electronic address type.

21. The computer program product as described in claim 15 wherein the computer network is selected from the group consisting of a public switched telephone network, a mobile telephone network, a packet based global computer network, a local area network, and a wide area network.

* * * * *